United States Patent
Yi et al.

(10) Patent No.: US 9,733,914 B2
(45) Date of Patent: *Aug. 15, 2017

(54) LOOP PARALLELIZATION ANALYZER FOR DATA FLOW PROGRAMS

(75) Inventors: Haoran Yi, Austin, TX (US); Mary E. Fletcher, Austin, TX (US); Robert E. Dye, Austin, TX (US); Adam L. Bordelon, Austin, TX (US)

(73) Assignee: NATIONAL INSTRUMENTS CORPORATION, Austin, TX (US)

( * ) Notice: Subject to any disclaimer, the term of this patent is extended or adjusted under 35 U.S.C. 154(b) by 2571 days.

This patent is subject to a terminal disclaimer.

(21) Appl. No.: 12/475,916

(22) Filed: Jun. 1, 2009

(65) Prior Publication Data

US 2010/0306753 A1    Dec. 2, 2010

(51) Int. Cl.
*G06F 9/45*        (2006.01)

(52) U.S. Cl.
CPC ............ *G06F 8/4452* (2013.01); *G06F 8/433* (2013.01); *G06F 8/443* (2013.01); *G06F 8/456* (2013.01)

(58) Field of Classification Search
None
See application file for complete search history.

(56) References Cited

U.S. PATENT DOCUMENTS

| | | | |
|---|---|---|---|
| 5,732,277 A | | 3/1998 | Kodosky et al. |
| 5,852,449 A * | | 12/1998 | Esslinger et al. ............. 345/473 |
| 6,247,173 B1 * | | 6/2001 | Subrahmanyam ............ 717/160 |
| 6,253,371 B1 | | 6/2001 | Iwasawa et al. |
| 6,865,441 B2 | | 3/2005 | Chandhoke |
| 6,996,788 B2 | | 2/2006 | Akiba et al. |
| 2002/0138700 A1 * | | 9/2002 | Holmberg ..................... 711/137 |
| 2005/0131865 A1 | | 6/2005 | Jones et al. |
| 2005/0273569 A1 * | | 12/2005 | Alba Pinto et al. .......... 711/203 |
| 2006/0101237 A1 * | | 5/2006 | Mohl et al. ................... 712/201 |
| 2006/0259163 A1 * | | 11/2006 | Hsiung et al. .................. 700/30 |
| 2009/0144228 A1 | | 6/2009 | Duffy et al. |
| 2009/0144232 A1 | | 6/2009 | Duffy et al. |
| 2009/0144346 A1 | | 6/2009 | Duffy et al. |

OTHER PUBLICATIONS

"Sisal Language Program—Chapter 8, Loops and Parallelism"; Aug. 7, 1991; http://www2.cmp.uea.ac.uk/~jrwg/Sisal/08.Loops.par.html.

* cited by examiner

*Primary Examiner* — Henry Tsai
*Assistant Examiner* — Christopher Bartels
(74) *Attorney, Agent, or Firm* — Meyertons Hood Kivlin Kowert & Goetzel, P.C.; Jeffrey C. Hood; Mark S. Williams

(57) ABSTRACT

System and method for automatically parallelizing iterative functionality in a data flow program. A data flow program is stored that includes a first data flow program portion, where the first data flow program portion is iterative. Program code implementing a plurality of second data flow program portions is automatically generated based on the first data flow program portion, where each of the second data flow program portions is configured to execute a respective one or more iterations. The plurality of second data flow program portions are configured to execute at least a portion of iterations concurrently during execution of the data flow program. Execution of the plurality of second data flow program portions is functionally equivalent to sequential execution of the iterations of the first data flow program portion.

36 Claims, 33 Drawing Sheets

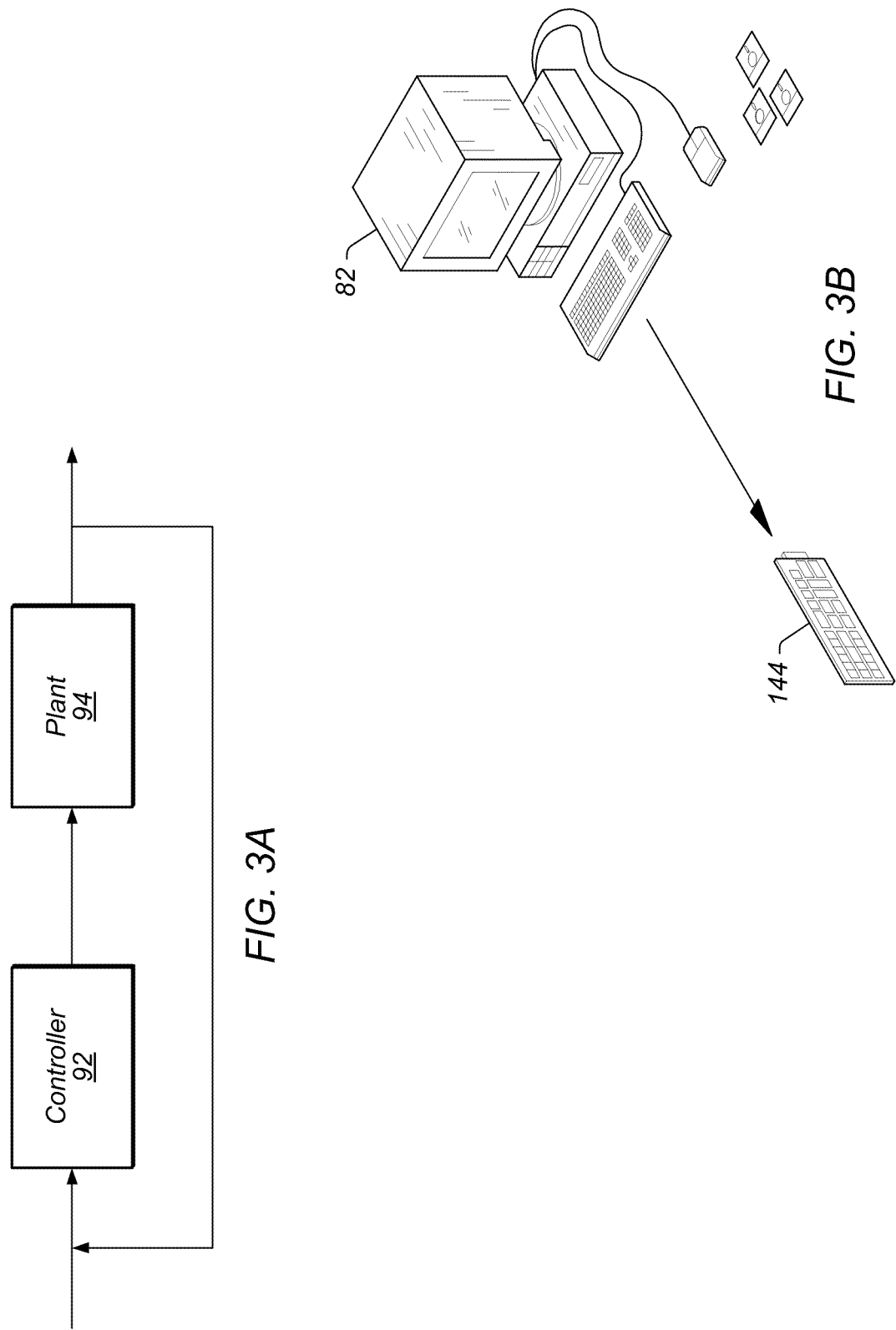

| 0 | 0 | 1 | 1 | 2 | 2 | 3 | 3 | 0 | 0 | 1 | 1 | 2 | 2 | 3 | 3 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

LOOP PARALLELIZATION ANALYZER FOR DATA FLOW PROGRAMS

FIELD OF THE INVENTION

The present invention relates to the field of data flow programming, and more particularly to automatically parallelizing iterative functionality in data flow programs.

DESCRIPTION OF THE RELATED ART

Data flow programming is a programming approach or protocol with many industrial (and other) applications. In data flow (or dataflow) programming, the program architecture is that of a directed graph specifying the flow of data through the program. In data flow programs functions execute whenever the necessary input data are available. Data flow programs can be contrasted with procedural programs, which specify an execution flow of computations to be performed.

Graphical programming has also become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

Graphical data flow programs or diagrams, such as LabVIEW, combine the above two paradigms. A graphical program or diagram includes a plurality of interconnected nodes (or blocks), where at least a subset of the connections among the nodes visually indicate that data produced by one node is used by another node. A LabVIEW VI is one example of a graphical data flow program; a Simulink block diagram is another example of a graphical data flow program.

Increasingly, computer systems include multiprocessing capabilities, e.g., computers with multiple processors, processors with multiple processing cores, networked computers, etc., that may be used to execute programs in a parallel manner, i.e., concurrently. However, implementing such parallelism in current graphical programming systems requires that a user analyze the graphical program code, the execution target (multi-core/multi-processor), and the data to be processed, and manually customize the graphical program, e.g., writing or rewriting graphical program code, which may be difficult, tedious, and error prone. For example, LabVIEW's dataflow layout naturally separates independent operations so that they may be efficiently executed in separate threads on a multi-core system. FOR loops, however, are currently treated as explicitly sequential. Users frequently place repetitive operations in a loop structure for easier expressibility, even if the operations do not need to be executed in a sequential order. Currently, if a user desires better multi-core performance from code that uses loops, the user must explicitly split the inputs and FOR loop operations into multiple copies of the operations to execute the code in parallel. There is no way to easily tune or test such transformations by hand.

Thus, improved systems and methods for parallelizing data flow program functionality are desired.

SUMMARY OF THE INVENTION

Various embodiments of a system and method for enabling a graphical program to automatically parallelize iterative graphical program code are presented below.

A data flow program may be stored, e.g., in a memory medium, where the data flow program has a first data flow program portion, and where the first data flow program portion is iterative. In other words, the first data flow program portion comprises an iterative processing structure or code that specifies or implements iterative execution of data flow program code. Note that in various embodiments, the data flow program may be a text-based data flow program, or may be a graphical data flow program. For example, in one embodiment, the first graphical data flow program portion may be or include a loop graphical program structure.

For example, in one embodiment, the data flow program is a graphical data flow program that may be displayed on a display device, e.g., a computer monitor of a computer system, and that includes a plurality of interconnected nodes that visually indicate functionality of the graphical data flow program. The graphical data flow program thus has a first graphical data flow program portion, where the first graphical data flow program portion is iterative. For example, the first graphical data flow program portion may be or include a loop graphical program structure.

In graphical data flow program embodiments, the first graphical data flow program portion, e.g., the graphical program loop structure preferably includes an interior, and is configured to iteratively execute graphical program code comprised in the interior. In some embodiments, the first graphical data flow program portion, e.g., the graphical program loop structure, may be a graphical program node, e.g., a graphical loop node. For example, the node may include an icon with a loop border that encloses the interior (and any graphical program code contained therein). The loop border, which may be referred to simply as the "loop", along with its contained code, may be referred to as the body of the loop node or structure. In preferred embodiments, the first graphical data flow program portion may be or include a FOR loop, and the node may be a FOR loop node, although other types of parallel iterative processing nodes are also contemplated. For example, in cases where the loop is a "while loop", but where the total number of iterations to be performed may be determined prior to runtime, the while loop may be automatically converted to a FOR loop node, according to embodiments described herein.

Moreover, in some embodiments, the FOR loop may be a parallel FOR loop, which denotes a FOR loop that is either marked for (attempted) automatic parallelization, or in some embodiments, that has already been parallelized. Similarly, the graphical FOR loop may be or include a parallel graphical FOR loop, e.g., a parallel graphical program loop structure. In some embodiments, a parallel FOR loop may include additional elements, structures, or configuration/interface functionality, e.g., border nodes, as described below.

For example, in some embodiments, the graphical data flow program may include a graphical indicator that specifies to a compiler that the compiler is to attempt to automatically generate data flow program code that parallelizes a specified portion of the graphical data flow program for concurrent execution, e.g., the first portion of the graphical data flow program. In some embodiments, the graphical indicator may be used by the developer to specify such parallelization. Further details regarding embodiments of the graphical indicator are presented below.

The data flow program may be deployable to a target execution platform with concurrent processing capabilities. For example, the target execution platform may include one or more of: one or more multi-core processors, one or more hardware multi-threaded processors, one or more multi-processor computers, or two or more networked computers.

The data flow program may automatically be analyzed. As noted above, it is important that there be no dependences between iterations, i.e., that the iterations may be performed independently of one another. Thus, in some embodiments, automatically analyzing the data flow program may include automatically performing dependence analysis of the first data flow program portion. Dependence analysis refers to analysis of dependences (or dependencies) between program elements, including dependences between iterations of iterative program code. In one embodiment, dependence analysis and reduction operation analysis of the data flow program may be automatically performed, e.g., via software executing on the computer system, i.e., programmatically. Reduction operation analysis refers to analysis regarding operations that collect and combine or merge results from separate processes, e.g., concurrent processes, program portions, etc., to generate reduced or merged results, and may include dependence analysis regarding the reduction operations. However, it should be noted that reduction operation analysis may involve more than just data/order dependence analysis. It may also require interpreting operations performed by particular program elements, e.g., data flow nodes, to determine if they are reduction operations, and to infer or otherwise determine the appropriate initialization values for particular reduction operations.

Performing dependence analysis and reduction operation analysis of the data flow program may include determining that the first data flow program portion cannot be parallelized as specified, and indicating one or more errors preventing parallelization or one or more warnings regarding parallelization. In one embodiment, indicating the one or more errors may include indicating data flow program code that caused the determined errors or warnings. For example, the data flow program code that caused the errors or warnings may be indicated by providing location or address information specifying the offending code, or the offending data flow program code may itself be displayed, among other indication means.

Program code implementing a plurality of second data flow program portions may be generated, e.g., automatically generated, based on the first data flow program portion, where each of the second data flow program portions is configured to execute a respective one or more iterations. In one embodiment, the program code implementing a plurality of second data flow program portions may be generated based on the first data flow program portion and the analysis (or analyses) described above. Note that as used herein, "automatic" means that the action is performed by software, i.e., programmatically, and thus does not require direct user involvement, although the action may (or may not) be invoked or configured by the user. In graphical data flow embodiments where the graphical data flow program includes a graphical indicator specifying that parallelization is to be attempted, the automatic generation of program code implementing the plurality of second data flow program portions may be performed based on the graphical indicator.

The plurality of second data flow program portions may be configured to execute at least a portion of iterations concurrently during execution of the data flow program. Moreover, execution of the plurality of second data flow program portions may be functionally equivalent to sequential execution of the iterations of the first (possibly graphical) data flow program portion. In other words, the cumulative results of executing the plurality of second data flow program portions may be the same as results that would have been produced by sequential iterative execution of the first data flow portion. Note that as used herein, "concurrently" means that at least a portion of the concurrent processes overlap in time, i.e., at least one of the instances must execute at least one iteration while another instance executes another iteration.

The method may further include executing the data flow program, including each of the second data flow program portions executing the respective one or more iterations, where the plurality of second data flow program portions collectively execute all iterations specified for the first data flow program portion.

Note that the program code implementing the plurality of second data flow program portions may be automatically generated in response to there being no detected conditions preventing parallelization of the first data flow program portion. In other words, the program code may be automatically generated contingent upon the parallelization being feasible, i.e., reliably implementable. The absence of such conditions (preventing parallelization) may be determined via analysis of the data flow program, as described in more detail herein.

In various embodiments, any of the techniques and functionalities disclosed herein may be implemented as part of a development environment. However, in some embodiments, the above analyses (and any other functionalities disclosed herein) may be performed by a separate tool, e.g., a stand-alone software program or tool, that may be used or invoked by or from within a development environment, or independent from such an environment. For example, in one embodiment, the tool may be provided by, or even executed on, a server. In one embodiment, the tool's functionality may be implemented as an API (application programming interface), which may be utilized or otherwise invoked or called by a GUI, e.g., of the separate tool, or, in other embodiments, of the development environment, or even another program. More generally, while in some embodiments, the tool may be specifically directed to analyzing data flow programs to determine whether they can be parallelized, in various embodiments, the tool may be further executable to perform any of the various techniques and functionalities disclosed herein.

BRIEF DESCRIPTION OF THE DRAWINGS

A better understanding of the present invention can be obtained when the following detailed description of the preferred embodiment is considered in conjunction with the following drawings, in which:

FIG. 3A is a high level block diagram of an exemplary system which may execute or utilize graphical programs;

FIG. 3B illustrates an exemplary system which may perform control and/or simulation functions utilizing graphical programs;

Figure 1A:
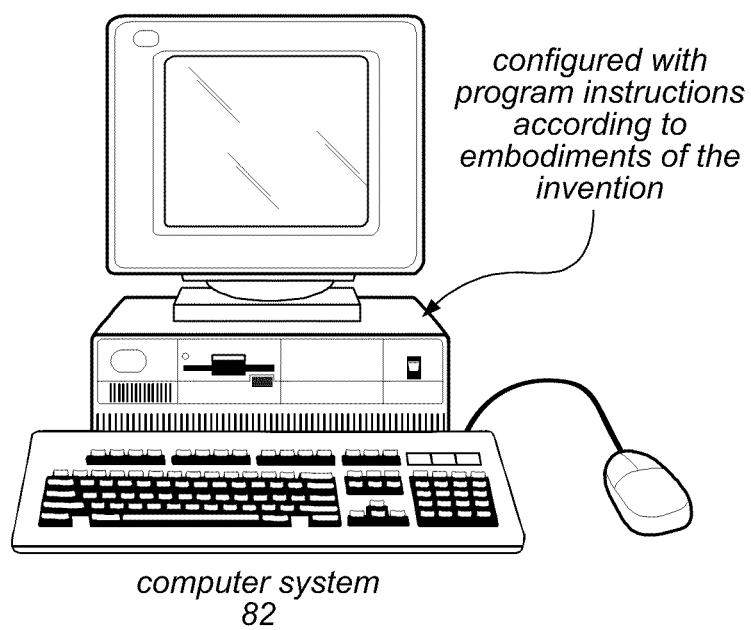
FIG. 1A illustrates a computer system configured to execute a graphical program according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference:

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Graphical Data Flow Program (or Graphical Data Flow Diagram)—A graphical program or diagram comprising a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input the by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Subset—in a set having N elements, the term "subset" comprises any combination of one or more of the elements, up to and including the full set of N elements. For example, a subset of a plurality of icons may be any one icon of the plurality of the icons, any combination of one or more of the icons, or all of the icons in the plurality of icons. Thus, a subset of an entity may refer to any single element of the entity as well as any portion up to and including the entirety of the entity. Note that a proper subset does not include the entirety of the entity. Moreover, disjoint subsets do not overlap in their membership.

Multiprocessor System—a computer system that includes multiple processing elements, i.e., processors, processing cores, or even networked computers, that may operate in a coordinated manner to execute program instructions concurrently.

FIG. 1A—Computer System

FIG. 1A illustrates a computer system 82 configured to implement embodiments of the present invention, i.e., configured with program instructions according to embodiments of the invention. More specifically, the computer system 82 is configured to automatically parallelize graphical program code for concurrent execution by multiple processing elements, which may include multiple processors, processing cores, or even networked computers. Various embodiments of a method for parallelizing graphical program code in a graphical program are described below.

As shown in FIG. 1A, the computer system 82 may include a display device configured to display the graphical program as the graphical program is created and/or executed. The display device may also be configured to display a graphical user interface or front panel of the graphical program during execution of the graphical program. The graphical user interface may comprise any type of graphical user interface, e.g., depending on the computing platform.

The computer system 82 may include at least one memory medium on which one or more computer programs or software components according to one embodiment of the present invention may be stored. For example, the memory medium may store one or more graphical programs which are executable to perform the methods described herein. Additionally, the memory medium may store a graphical programming development environment application used to create and/or execute such graphical programs. In some embodiments, the graphical programming development environment application may be configured to perform at least a portion of the methods described herein. The memory medium may also store operating system software, as well as other software for operation of the computer system. Various embodiments further include receiving or storing instructions and/or data implemented in accordance with the foregoing description upon a carrier medium.

Figure 1B:
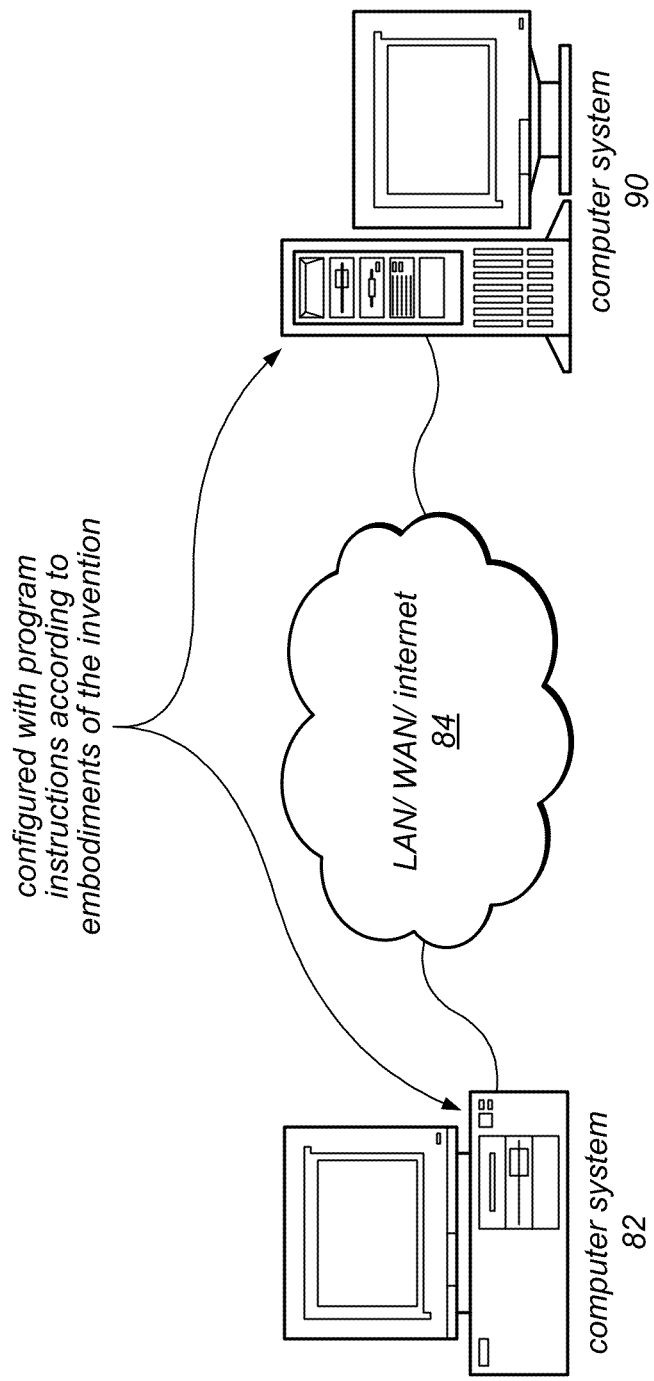
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90, where each of the computer systems is configured with program instructions according to embodiments of the invention. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a graphical program in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program. In some embodiments, the two networked computers (and/or possibly others) may be a distributed execution platform for parallelized graphical program code per embodiments of the present invention, as will be described in more detail below.

In one embodiment, the graphical user interface of the graphical program may be displayed on a display device of the computer system 82, and the block diagram may execute on a device coupled to the computer system 82. The device may include a programmable hardware element and/or may include a processor and memory medium which may execute a real time operating system. In one embodiment, the graphical program may be downloaded and executed on the device. For example, an application development environment with which the graphical program is associated may provide support for downloading a graphical program for execution on the device in a real time system.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
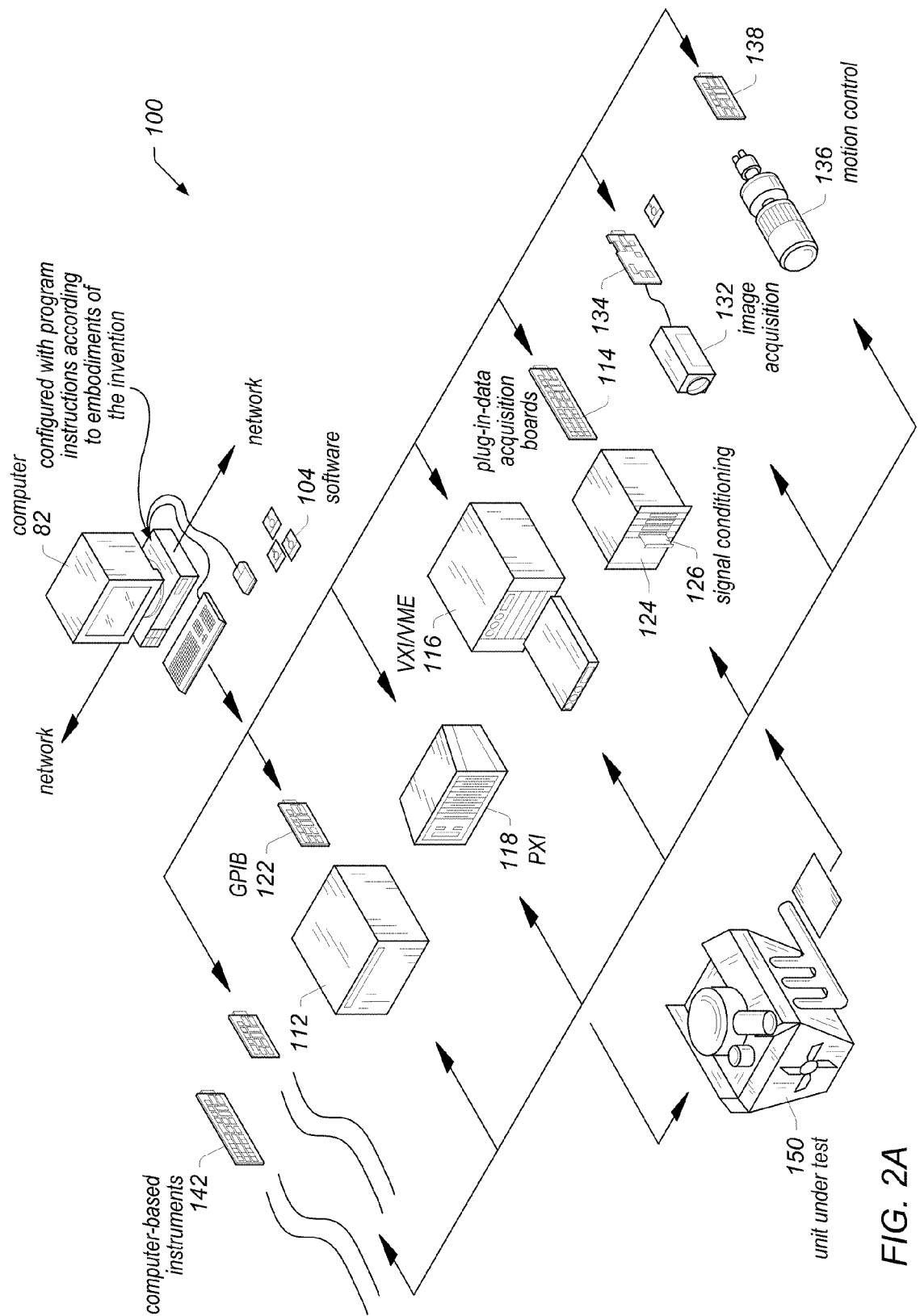
FIG. 2A illustrates an instrumentation control system according to one embodiment of the invention.

FIG. 2A illustrates an exemplary instrumentation control system 100 which may implement embodiments of the invention. The system 100 comprises a host computer 82 which couples to one or more instruments. The host computer 82 may comprise a central processing unit (CPU), a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
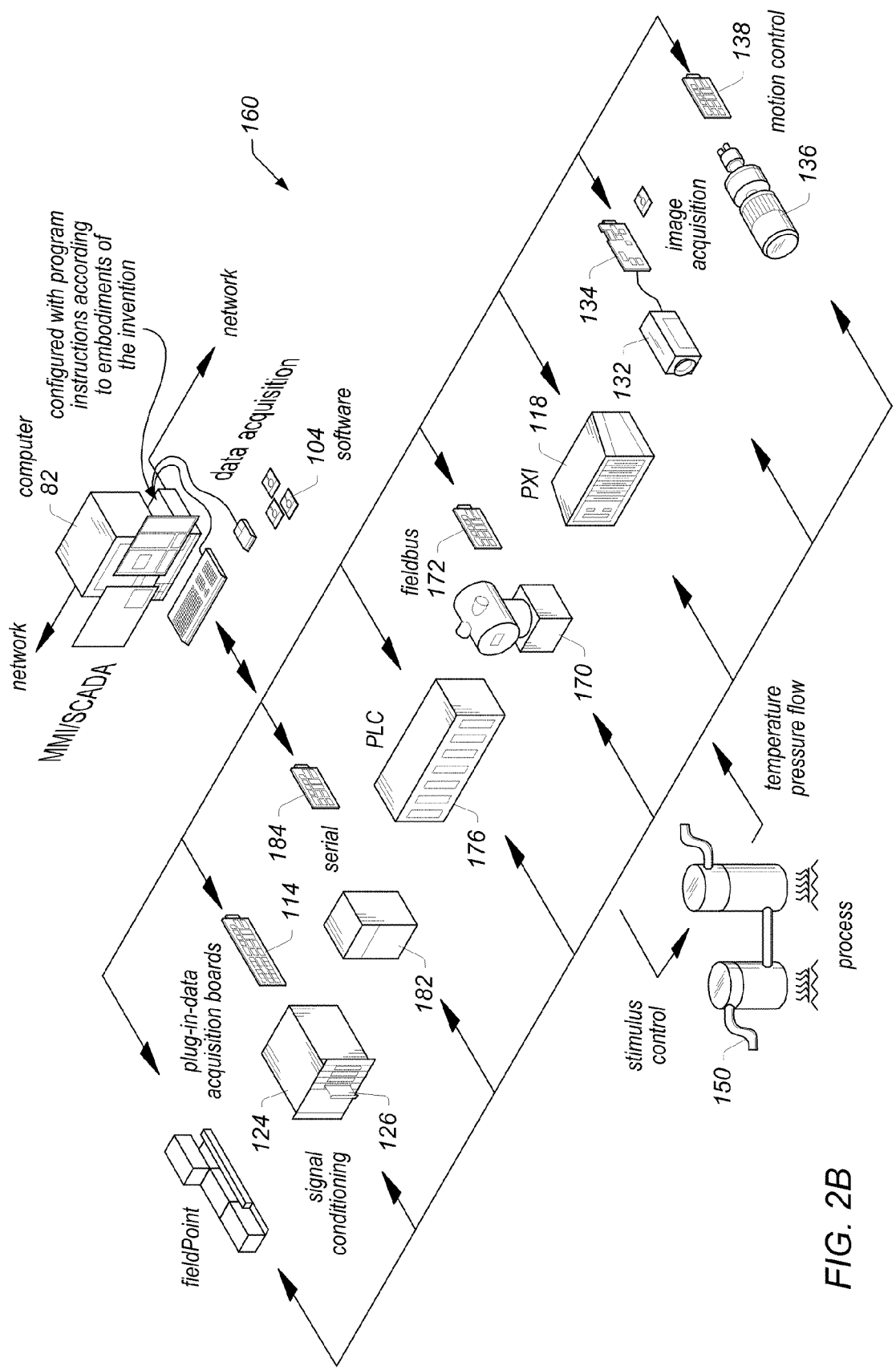
FIG. 2B illustrates an industrial automation system according to one embodiment of the invention.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which couples to one or more devices or instruments. The computer 82 may comprise a CPU, a display screen, memory, and one or more input devices such as a mouse or keyboard as shown. The computer 82 may operate with the one or more devices to perform an automation function with respect to a process or device 150, such as MMI (Man Machine Interface), SCADA (Supervisory Control and Data Acquisition), portable or distributed data acquisition, process control, advanced analysis, or other control, among others.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

FIG. 3A is a high level block diagram of an exemplary system which may execute or utilize graphical programs. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

Figure 4:
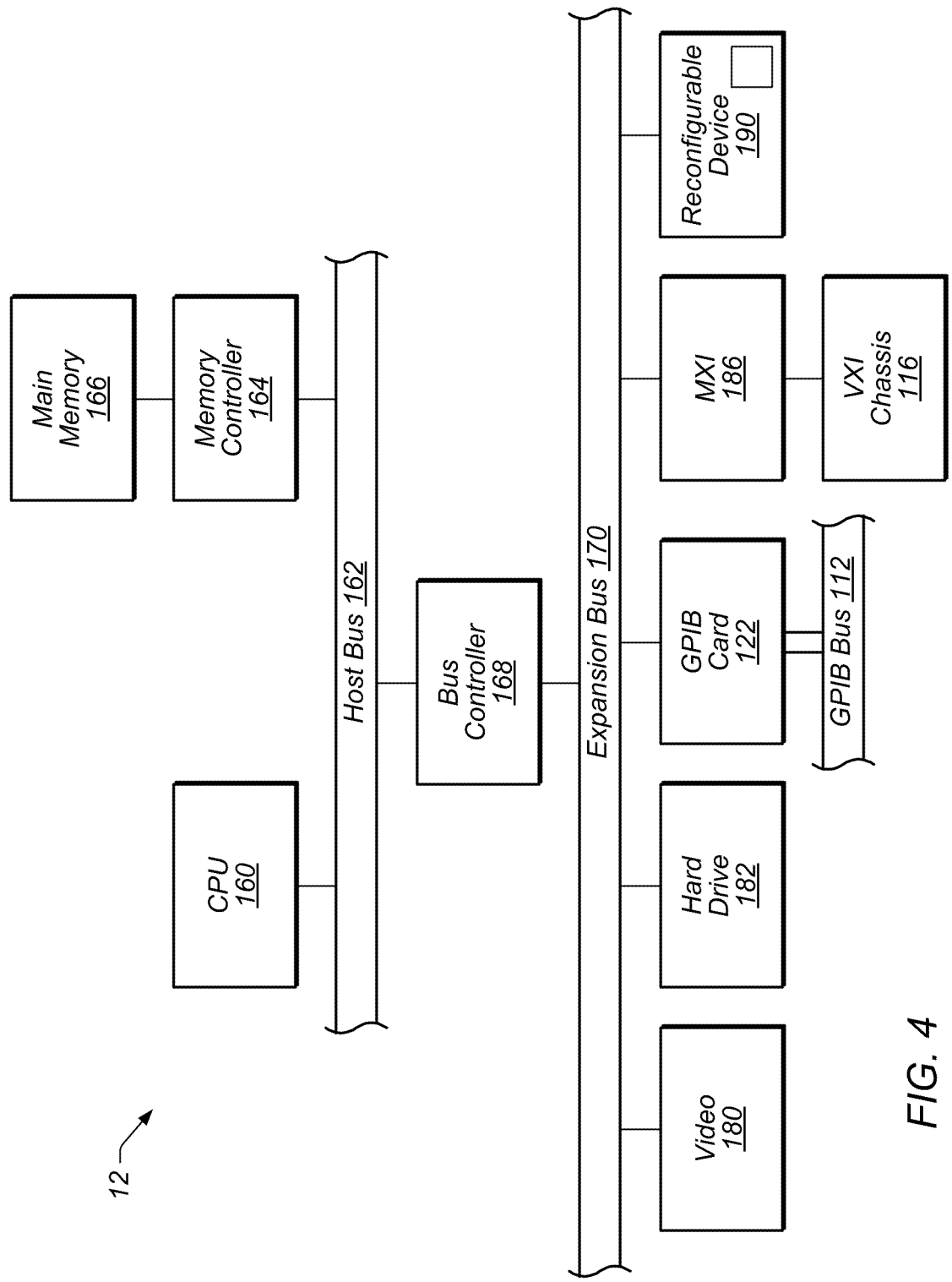
FIG. 4 is an exemplary block diagram of the computer systems of FIGS. 1A, 1B, 2A and 2B and 3B.

FIG. 4—Computer System Block Diagram

FIG. 4 is a block diagram representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. In some embodiments, the CPU 160 may be a multi-core processor that includes a plurality of processing cores for concurrent execution of program instructions. A memory medium, typically comprising RAM and referred to as main memory, 166 is coupled to the host bus 162 by means of memory controller 164. The main memory 166 may store program instructions implementing embodiments of the present invention, including, for example, a graphical program development environment and one or more graphical programs. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170.

As shown, a device 190 may also be connected to the computer. The device 190 may include a processor and memory which may execute a real time operating system. The device 190 may also or instead comprise a programmable hardware element. The computer system may be configured to deploy a graphical program to the device 190 for execution of the graphical program on the device 190. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Figure 5:
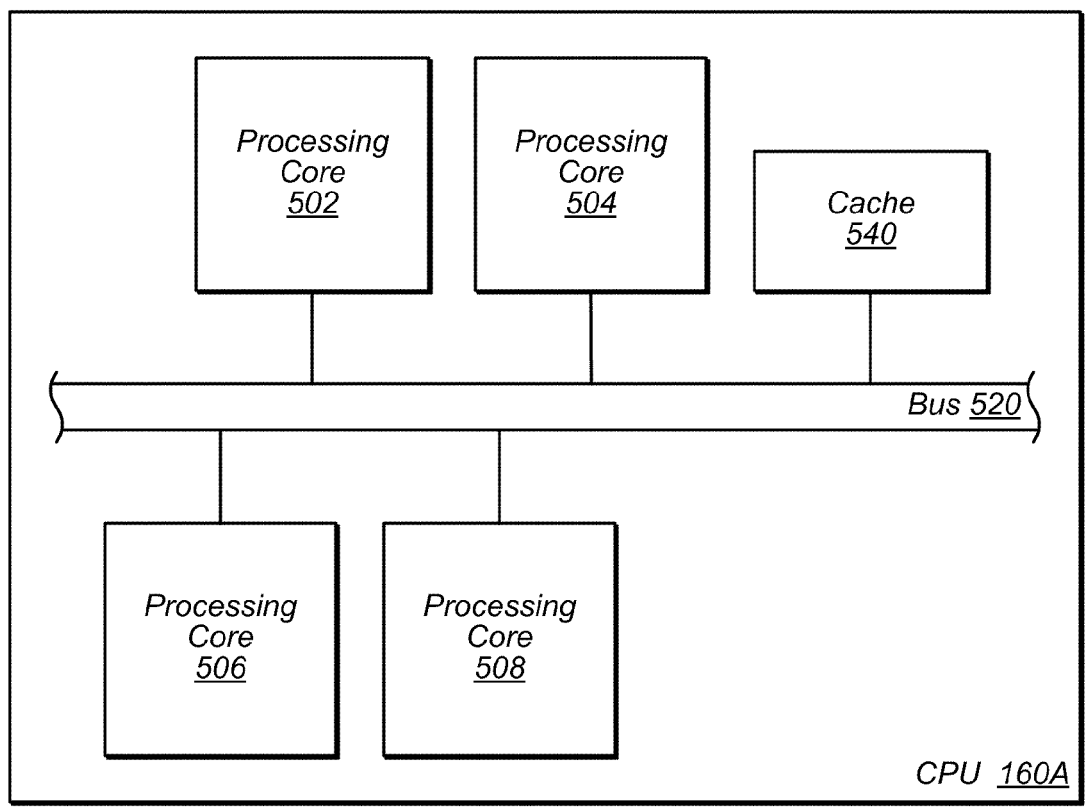
FIG. 5 illustrates a multi-core computer system, according to one embodiment.

FIG. 5—Multi-Core System

FIG. 5 illustrates a multi-core processing system, according to one exemplary embodiment. As may be seen, in this embodiment, the multi-core processing system is a multi-core processor (e.g., a multi-core CPU) 160A with four processing cores 502, 504, 506, and 508, and memory cache 540, all coupled together via a bus 520. Note that while in the embodiment shown a single cache is shared by all the processing cores, in other embodiments, one or more, or each, of the cores may have its own cache, or groups of the cores may share respective caches, and so forth, as desired.

While the multi-core processing system shown in FIG. 5 is an exemplary target execution platform for embodiments of the present invention, it should be noted that other platforms are also contemplated. For example, in various embodiments, the target execution platform may be or include one or more multi-core processors, one or more multi-processor computers, and/or two or more networked computers. In other words, the target platform maybe any kind of computing system that includes multiple processing elements, be they processing cores, processors, or even networked processing devices.

Overview of Loop Parallelization

As indicated above, parallelization of iterative program code can provide numerous performance benefits over serially iterative program code.

Figure 6A:
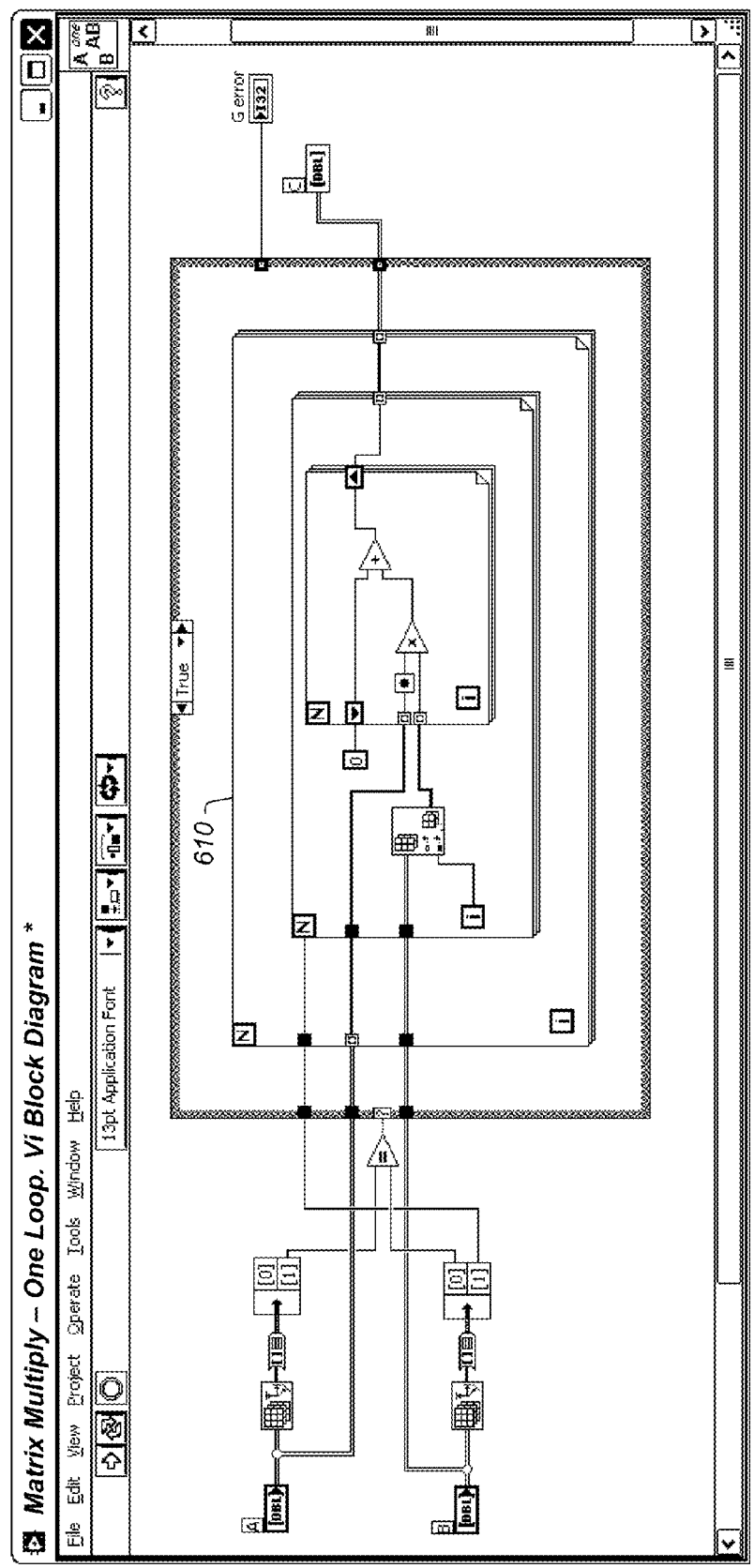
FIG. 6A-6B illustrate manual parallelization of a graphical loop structure, according to the prior art.

FIG. 6A illustrates an exemplary graphical data flow program that includes a graphical iterative structure, e.g., a graphical FOR loop 610, used to implement a matrix multiplication. Note that in the embodiment shown, the graphical FOR loop 610 has a boundary or border that forms or demarcates an interior portion within which graphical data flow code may be placed, i.e., one or more graphical program nodes to be executed iteratively may be included within the interior of the structure, where the graphical FOR loop specifies iterative execution of this contained graphical program code. Note further that in this example, the FOR loop 610 contains two further FOR loops, i.e., nested FOR loops, although for brevity only the outer loop 610 is considered herein.

In prior art approaches to parallelization of such a FOR loop, e.g., by implementing M, e.g., 2 or 4, concurrent looping structures, the developer would have to do their own analysis to determine if parallelization is safe and reliable, then copy the loop M (e.g., 2 or 4) times and modify the surrounding code, which is labor intensive and prone to error.

Figure 6B:
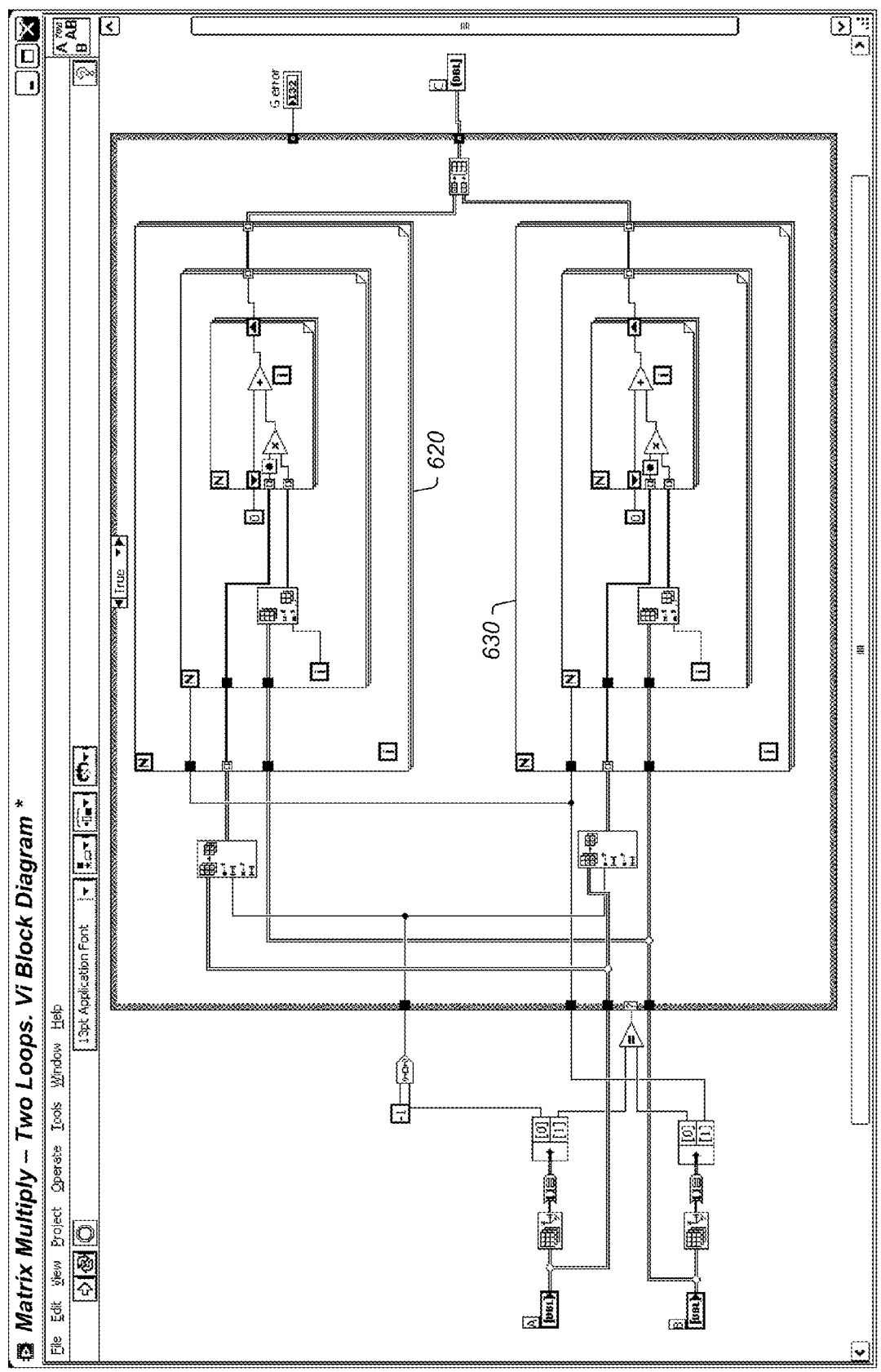

FIG. 6B illustrates an exemplary graphical data flow program that implements parallelization of the graphical program of FIG. 6A by (manually) constructing two concurrent loops 620 and 630, where each concurrent loop operates to perform a respective portion of the iterations specified for the original loop 610. Such manual parallelization of loop 610 requires significant effort. Moreover, subsequent to the (manual) parallelization, there may be a requirement to scale the parallelization up to 16 processors, but still maintain efficient execution on 2 or 4 processors, which would necessitate manually re-implementing the parallelization. One prior art approach that attempts to address this issue is the use of a case structure with respective cases specified for each parallelization case, e.g., 2, 4, 16, and so on. However, this approach is also error prone, difficult to write/maintain, and results in program code that is not aesthetically pleasing. Note that FIG. 6B illustrates the concept of parallelization, but that some embodiments of the automatic parallelization techniques disclosed herein may not display the generated parallel loops, i.e., the generated second data flow program portions. In other words, the implementation of the parallel "sub-loops" may be transparent to users.

Various embodiments of methods for automatically parallelizing iterative data flow program structures, e.g., FOR loops, are described below. Generally, the user may specify which loops should become parallel loops. Then, for each of these loops, an analysis pass may be made to see if there are any parallelism-breaking dependences. If the analysis determines that each iteration of the loop is actually independent of the other iterations, a transform, e.g., an index set splitting transform, may be performed to split the loop's iteration space, i.e., to parallelize it, so that the iterations will run in parallel. This can dramatically improve performance on multi-processor (e.g., multi-core) systems if the amount of computation per iteration outweighs the multi-threading/parallelization overhead.

Figure 7:
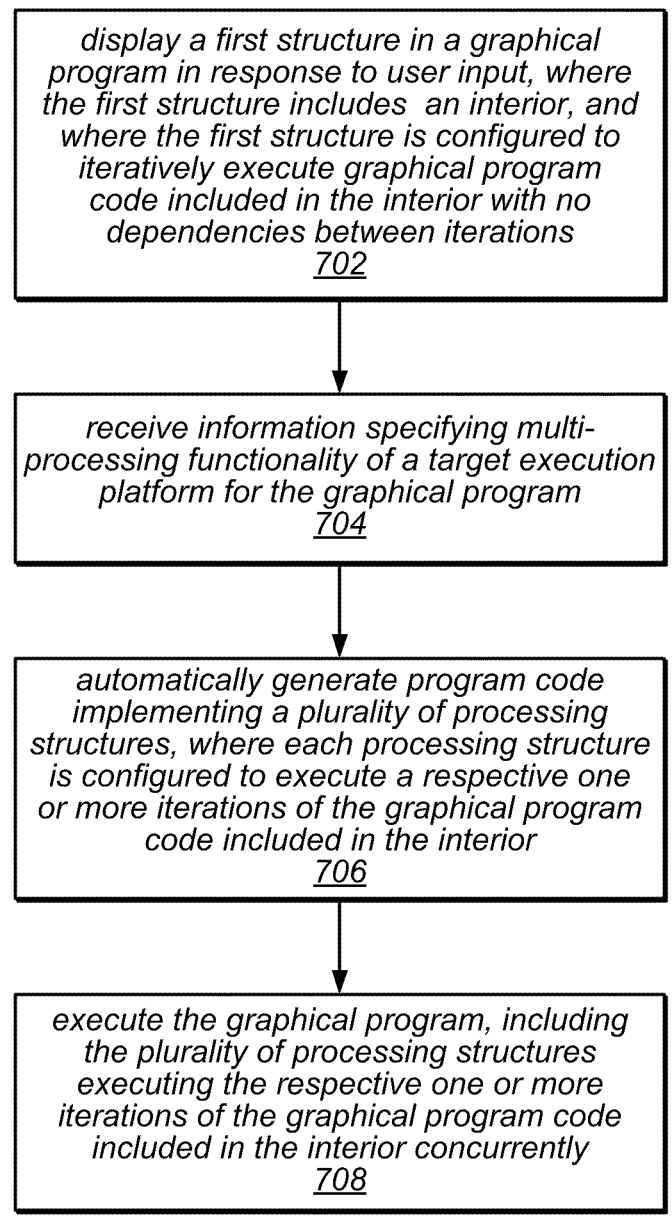
FIG. 7 is a flowchart diagram illustrating one embodiment of a method for automatically parallelizing data flow program code.

FIG. 7—Flowchart of a Method for Modifying a Data Flow Program for Concurrent Execution FIG. 7 is a flowchart of a method for modifying a data flow program for concurrent execution, according to one embodiment. The method shown in FIG. 7 may be used in conjunction with any of the computer systems or devices shown in the above figures, among other devices. In various embodiments, some of the method elements shown may be performed concurrently, in a different order than shown, or may be omitted. Additional method elements may also be performed as desired. As shown, this method may operate as follows.

First, in 702, a data flow program may be stored, e.g., in a memory medium, where the data flow program has a first data flow program portion, and where the first data flow program portion is iterative. In other words, the first data flow program portion comprises an iterative processing structure or code that specifies or implements iterative execution of data flow program code. For example, in one embodiment, the first graphical data flow program portion may be or include a loop graphical program structure. Note that in various embodiments, the data flow program may be a text-based data flow program, or may be a graphical data flow program.

For example, in one embodiment, the data flow program is a graphical data flow program that may be displayed on a display device, e.g., a computer monitor of a computer system, and that includes a plurality of interconnected nodes that visually indicate functionality of the graphical data flow program. The graphical data flow program thus has a first graphical data flow program portion, where the first graphical data flow program portion is iterative. For example, the first graphical data flow program portion may be or include a loop graphical program structure.

In graphical data flow program embodiments, the first graphical data flow program portion, e.g., the graphical program loop structure preferably includes an interior, and is configured to iteratively execute graphical program code comprised in the interior. In some embodiments, the first graphical data flow program portion, e.g., the graphical program loop structure, may be a graphical program node, e.g., a graphical loop node. For example, the node may include an icon with a loop border that encloses the interior (and any graphical program code contained therein). The loop border, which may be referred to simply as the "loop", along with its contained code, may be referred to as the body of the loop node or structure. In preferred embodiments, the first graphical data flow program portion may be or include a FOR loop, and the node may be a FOR loop node, although other types of parallel iterative processing nodes are also contemplated. For example, in cases where the loop is a "while loop", but where the total number of iterations to be performed may be determined prior to runtime, the while loop may be automatically converted to a FOR loop node, according to embodiments described herein.

Moreover, in some embodiments, the FOR loop may be a parallel FOR loop, which denotes a FOR loop that is either marked for (attempted) automatic parallelization, or in some embodiments, that has already been parallelized. Similarly, the graphical FOR loop may be or include a parallel graphical FOR loop, e.g., a parallel graphical program loop structure. In some embodiments, a parallel FOR loop may include additional elements, structures, or configuration/interface functionality, e.g., border nodes, as described below.

For example, in some embodiments, the graphical data flow program may include a graphical indicator that specifies to a compiler that the compiler is to attempt to automatically generate data flow program code that parallelizes a specified portion of the graphical data flow program for concurrent execution, e.g., the first portion of the graphical data flow program. In some embodiments, the graphical indicator may be used by the developer to specify such parallelization. Further details regarding embodiments of the graphical indicator are presented below.

Note, however, that the structures, elements, indicators, or nodes described herein may be referred to by any names desired, so long as the functionality described herein according to various embodiments is implemented.

The graphical data flow program may be created on the computer system 82 (or on a different computer system). The graphical program may be created or assembled by the user arranging on a display a plurality of nodes or icons and then interconnecting the nodes to create the graphical program. In response to the user assembling the graphical program, data structures may be created and stored which represent the graphical program. The nodes may be interconnected in a data flow format, and may comprise a block diagram and may also include a user interface portion or front panel portion. Where the graphical program includes a user interface portion, the user may optionally assemble the user interface on the display. As one example, the user may use the LabVIEW graphical programming development environment to create the graphical program.

In an alternate graphical embodiment, the graphical program may be created in 702 by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired. The graphical program may implement a measurement function that is desired to be performed by the instrument. More generally, in various embodiments, the graphical program may be configured to perform one or more of: an industrial automation function, a process control function, or a test and measurement function, among others. Various examples of graphical data flow programs according to embodiments of the present invention are provided below in the Further Embodiments section.

The data flow program may be deployable to a target execution platform with concurrent processing capabilities. For example, the target execution platform may include one or more of: one or more multi-core processors, one or more hardware multi-threaded processors, one or more multi-processor computers, or two or more networked computers.

In 704, the data flow program may automatically be analyzed. As noted above, it is important that there be no dependences between iterations, i.e., that the iterations may be performed independently of one another. Thus, in some embodiments, automatically analyzing the data flow program may include automatically performing dependence analysis of the first data flow program portion. Dependence analysis refers to analysis of dependences (or dependencies) between program elements, including dependences between iterations of iterative program code.

In one embodiment, dependence analysis and reduction operation analysis of the data flow program may be automatically performed, e.g., via software executing on the computer system, i.e., programmatically. Reduction operation analysis refers to analysis regarding operations that collect and combine or merge results from separate processes, e.g., concurrent processes, program portions, etc., to generate reduced or merged results, and may include dependence analysis regarding the reduction operations. However, it should be noted that reduction operation analysis may involve more than just data/order dependence analysis. It may also require interpreting operations performed by particular program elements, e.g., data flow nodes, to determine if they are reduction operations, and to infer or otherwise determine the appropriate initialization values for particular reduction operations.

Performing dependence analysis and reduction operation analysis of the data flow program may include determining that the first data flow program portion cannot be parallelized as specified, and indicating one or more errors preventing parallelization or one or more warnings regarding parallelization. In one embodiment, indicating the one or more errors may include indicating data flow program code that caused the determined errors or warnings. For example, the data flow program code that caused the errors or warnings may be indicated by providing location or address information specifying the offending code, or the offending data flow program code may itself be displayed, among other indication means.

In some embodiments, user input selecting at least one error of the one or more errors or at least one warning of the one or more warnings may be received, and the data flow program code may be indicated in response, i.e., in response to the user input selecting at least one error of the one or more errors or at least one warning of the one or more warnings. In other words, the user may select an error or warning, e.g., with a pointing device such as a mouse, and the corresponding data flow program code (that caused the error or warning) may be indicated, e.g., displayed.

Example errors may include, but are not limited to, errors indicating conditions regarding: breaking a loop condition, use of shift registers (e.g., except for simple reduction operations and non-overlapping array accesses), array accesses to the same element on different iterations, where at least one access is a write, event structures, and/or controls or indicators, among others. Exemplary warnings may include, but are not limited to, warnings indicating conditions regarding: non-reentrant and/or non-functional subVIs (subroutines or subprograms), property or invoke nodes, primitive nodes with side effects (e.g., not "functional"), e.g., notifiers, queues, FIFO, timing, file I/O, DAQ, TCP/UDP, etc., among others.

Note that some of these conditions may be qualified. For example, in typical looping structures, shift registers (specified memory) may be used to communicate information from one iteration to another, e.g., between successive iterations, such as a running sum, etc., and thus the use of shift registers typically precludes parallelization of the iterations. However, in some cases the shift registers may be used safely, e.g., access (reads/writes) to the shift register may be possible without disturbing the parallelization of the iterations. For example, in some embodiments, parallelism may be permitted in the presence of safe (disjoint) read/writes on an array in a shift register. In one embodiment, analysis, e.g., an Omega test, described below, may allow parallelization in the presence of safe (disjoint) reads/writes on an array whether in a shift register or tunneled in otherwise.

Additionally, in some embodiments, user input modifying the data flow program code may be received in response to the one or more errors preventing parallelization or one or more warnings regarding parallelization. Said another way, in response to the error(s) or warning(s), the user may modify the data flow program, e.g., the offending data flow program code that caused the error or warning, although it should be noted that in some cases, the user may, additionally, or instead, modify some other portion of the data flow program to resolve the error or warning.

Moreover, further dependence analysis and reduction operation analysis of the data flow program may be performed after such modifying. In other words, once the data flow program has been modified, the modified data flow program may be analyzed again. In some embodiments, any modification of the data flow program may cause or invoke further dependence analysis and reduction operation analysis, because the modifications may or may not have resolved the errors or warnings, or may have introduced new conditions that might generate further errors or warnings.

Thus, more generally, the dependence analysis and reduction operation analysis of the data flow program may be performed in an iterative manner, where each time the program is modified, the analyses may be performed.

Such dependence analysis and reduction operation analysis may be directed to any of various aspects of the data flow program, e.g., the first data flow program portion. For example, in one embodiment, the analyses may include automatically determining any side effects of the data flow program included in the first data flow program portion, where, side effects refer to (usually untended) consequences of program code execution not explicitly generated or intended as a program result. Thus, it may be the case that the explicit results are correct or reliable, but there may be side effects that may render the implementation invalid or undesirable. Alternatively, the side effects may simply be something the user should be aware of, and may or may not be acceptable.

As another example, the analyses may include detection of cross-iteration dependences that would prevent parallelization, i.e., dependences between iterations of the first data flow program portion. For example, it may be the case that each iteration (except the first) depends upon the results of the previous iteration, and so none of the iterations can be performed concurrently.

As a further example, performing dependence analysis of the data flow program may include recognizing an early termination condition that prevents parallelization. For example, it may be the case that the execution of certain iterations depends on whether the termination condition in a previous iteration was met, causing a dependence between iterations.

In yet another embodiment, performing dependence analysis of the data flow program may include determining any conflicting array accesses across iterations of the first data flow program portion. For example, determining conflicting array accesses across iterations of the first data flow program portion may include determining an integer linear programming problem (ILP) that corresponds to each pair of array accesses in the first data flow program portion, then determining whether there is a feasible solution to each ILP, where if there is no feasible solution to any of the ILPs, then there are no conflicting array accesses across iterations of the first data flow program portion.

In one embodiment, the data flow program may include one or more array access operations, and determining conflicting array accesses across iterations of the first data flow program portion may include analyzing each array access operation. More specifically, for each array access operation, a source set of operations may be determined, comprising the set of operations that define some or all input values for the array access operation. A destination set of operations may also be determined for the array access operation, comprising the set of operations that use some or all output values of the array access operation. Automatically performing dependence analysis and reduction operation analysis of the data flow program may include analyzing each of the one or more array access operations, including the source set of operations and the destination set of operations for each array access operation.

More specifically, in one embodiment, determining any conflicting array accesses across iterations of the first data flow program portion may include: for each array access operation, determining a list of one or more read expressions representing a set of array elements from which the array access operation may read, and determining a list of one or more write expressions representing a set of array elements to which the array access operation may write. Performing dependence analysis and reduction operation analysis of the graphical data flow program may then include analyzing each of the one or more array access operations, including the one or more read expressions and the one or more write expressions for each array access operation.

Similarly, in embodiments where the data flow program is a graphical data flow program, such array access operations may be implemented and performed via array nodes. In other words, the graphical data flow program may include one or more array nodes configured to perform array access operations. In these embodiments, determining any conflicting array accesses across iterations of the first graphical data flow program portion may include: for each array node, determining a source set of nodes, comprising the set of nodes that define some or all input values for the array node, and determining a destination set of nodes, comprising the set of nodes that use some or all output values of the array node. Performing dependence analysis and reduction operation analysis of the graphical data flow program may then include analyzing each of the one or more array nodes, including the source set of nodes and the destination set of nodes for each array node.

More specifically, determining any conflicting array accesses across iterations of the first graphical data flow program portion may include: for each array node, determining a list of one or more read expressions representing a set of array elements from which the array node may read, and determining a list of one or more write expressions representing a set of array elements to which the array node may write. As above, performing dependence analysis and reduction operation analysis of the graphical data flow program may include analyzing each of the one or more array nodes, including the one or more read expressions and the one or more write expressions for each array node.

It should be noted that a single array write operation may conflict with itself across different iterations of a loop, and so in some cases, the above analysis may be directed to, or may detect, a single array access operation.

In 706, program code implementing a plurality of second data flow program portions may be generated, e.g., automatically generated, based on the first data flow program portion, where each of the second data flow program portions is configured to execute a respective one or more iterations. In one embodiment, the program code implementing a plurality of second data flow program portions may be generated based on the first data flow program portion and the analysis (or analyses) described above. Note that as used herein, "automatic" means that the action is performed by software, i.e., programmatically, and thus does not require direct user involvement, although the action may (or may not) be invoked or configured by the user.

In one embodiment, each of the second data flow program portions is a modified version of the first data flow program portion. Thus, in some embodiments where the data flow program is a graphical data flow program, each of the second data flow program portions may be a modified version the first graphical data flow program portion. However, it should be noted that in some embodiments, these modified versions of the first graphical data flow program portion may not be displayed.

In graphical data flow embodiments where the graphical data flow program includes a graphical indicator specifying that parallelization is to be attempted, the automatic generation of program code implementing the plurality of second data flow program portions may be performed based on the graphical indicator. Further details of the graphical indicator and its functionality according to various embodiments are provided below.

The plurality of second data flow program portions may be configured to execute at least a portion of iterations concurrently during execution of the data flow program. Moreover, execution of the plurality of second data flow program portions may be functionally equivalent to sequential execution of the iterations of the first (possibly graphical) data flow program portion. In other words, the cumulative results of executing the plurality of second data flow program portions may be the same as results that would have been produced by sequential iterative execution of the first data flow portion. Note that as used herein, "concurrently" means that at least a portion of the concurrent processes overlap in time, i.e., at least one of the instances must execute at least one iteration while another instance executes another iteration.

The method may further include executing the data flow program, including each of the second data flow program portions executing the respective one or more iterations, where the plurality of second data flow program portions collectively execute all iterations specified for the first data flow program portion.

Note that the program code implementing the plurality of second data flow program portions may be automatically generated in response to there being no detected conditions preventing parallelization of the first data flow program portion. In other words, the program code may be automatically generated contingent upon the parallelization being feasible, i.e., reliably implementable. The absence of such conditions (preventing parallelization) may be determined via analysis of the data flow program, as described in more detail below.

Further Embodiments

Below are provided further details regarding embodiments of the method described above with reference to FIG. 7. It should be noted that the various embodiments described below are meant to be exemplary, and are not intended to limit the elements described to any particular features, functions, or appearances.

Received Information

In some embodiments, information may be provided or received that may aid in the analyses and/or code generation described above. For example, in one embodiment, information specifying parallelism for the data flow program may be received, where the program code implementing a plurality of second data flow program portions is automatically generated based on the first data flow program portion and the received information. For example, the information specifying parallelism for the data flow program may specify one or more of: data flow program portions to parallelize, number of second data flow program portions to generate, or an iteration scheduling strategy specifying how the index blocks of iterations are to be distributed among the plurality of second data flow program portions.

Note that the scheduling strategy may affect how the code is generated, and how the parallelism is implemented. For example, in one embodiment, the iteration scheduling strategy may be specified as a static schedule, where each second data flow program portion is statically assigned a respective one or more index blocks of the iterations. Examples of static scheduling include blocked and blocked cyclic scheduling. In blocked scheduling, each second data flow program portion, which may be referred to herein as a "worker" for brevity, is allocated one block (of 0+ iterations), such that for P workers, there are P blocks scheduled, e.g., evenly divided, to cover all of the iterations. In blocked-cyclic scheduling, the iteration block size is specified, then the blocks are distributed in round-robin fashion (statically scheduled at compile-time) to each of the workers. Thus, for N iterations, P workers, and a block size of C, there may be N/C blocks distributed among the P workers (as allowed by the values of N, C, and P), and each worker will be allocated N/(P*C) blocks (rounded up or down), or, N/P iterations on average.

As indicated above, in another embodiment, the iteration scheduling strategy may be specified as a dynamic schedule, where each second data flow program portion is dynamically assigned a respective one or more index blocks of the iterations during runtime in an opportunistic manner. Further details of static and dynamic scheduling are provided below Thus, in some embodiments, the number of second data flow program portions to generate may be determined dynamically at runtime, and so may not need to be specified by this information. However, in one embodiment, such information (specifying the number of second data flow program portions to generate) may be used to set a maximum parallelism limit for the dynamic allocations, i.e., may specify an upper bound for the number of second data flow program portions to generate.

In one embodiment, user input specifying one or more constraints on the multi-processing functionality may be received, and the iteration scheduling strategy may be executed subject to the user specified one or more constraints. For example, the user may constrain the number of second data flow program portions to generate, as mentioned above. As a slightly more sophisticated example, the user may specify that the number of second data flow program portions to generate should be the minimum of a statically specified number and a dynamically determined number. Further examples of such user-specified constraints include specifying a fixed or minimum blocksize for [C], e.g., fixed for a static schedule or fixed-size dynamic schedule, and minimum for the dynamic decreasing schedule (e.g., down to a minimum C).

In some embodiments, information specifying multi-processing functionality of an execution platform for the graphical data flow program may be received, where the program code implementing a plurality of second data flow program portions distributes iterations among the second data flow program portions based on inputs to the first graphical data flow program portion and the received information. Examples of inputs (used to distribute iterations) include input to [N] and incoming array data, which may help determine the number of actual iterations to execute.

Exemplary items that may be specified by the information specifying multi-processing functionality of the execution platform include one or more of: number of processing cores of the execution platform (or more generally, number of processing elements), number of hardware execution threads per processing core, a number of second data flow program portions to use at run-time, or a minimum index block size for iteration scheduling, among others. More generally, the information may specify any attribute germane to the multi-processing functionality of the execution platform, as desired. In some embodiments, the method may include querying the execution platform, and receiving the information specifying multi-processing functionality of the execution platform from the execution platform in response to the query. Additionally, or instead, the query may be made to a database of such information.

The information may then be used to allocate iteration index blocks among the second data flow program portions. For example, the number of logical processors available for executing iterations concurrently may be determined by multiplying the number of processing cores of the execution platform times the number of hardware execution threads per processing core. Note that in some embodiments, some of these items will not typically be specified together. For example, the received information may not specify both the number of processing cores and the number of execution threads, since the number of processing elements may determine the number of threads, and the user can specify T blocks of iterations (where T is an integer), e.g. splitting an array into T chunks or blocks, and one or more processing structures, e.g., threads, may be assigned to each processing element, which will consume the T blocks as determined by the schedule.

In one embodiment, the user may explicitly provide as input, e.g., "wire in", a positive (non-zero) integer specifying the execution thread count, i.e., the number of execution threads, although other means of specifying this number are also contemplated, as will be discussed below. For example, the user may wish to assign half the available processing elements to each of two parallel loops in the graphical program, and so may specify this explicitly via an input wire to the loop node. While in some embodiments, the number of threads may be equal to the number of processing elements, e.g., by default, in other embodiments, this may not be the case, although the number of threads allowed may have a specified maximum, e.g., equal to the number of processing elements, or some multiple of this value, e.g., 4×the number of processing elements, etc., as desired.

It should be noted that the term "thread" is used herein in its generic sense, and is intended to refer to any of various execution mechanisms whereby operations or tasks maybe performed or executed in parallel, i.e. concurrently in a controlled fashion. As used herein, a "block" refers to a contiguous set of iterations of a loop that may be allocated to a processor for execution. Similarly, the term "array block" may be used to refer to a corresponding array subset, e.g., a contiguous subset of a data structure used to store data for and/or of these iterations. Note that, as indicated above, in various embodiments, the target execution platform may be or include one or more of: one or more multi-core processors, one or more multi-processor computers, or two or more networked computers. In other words, the target platform maybe any kind of computing system that includes multiple processing elements, be they processing cores, processors, or processing devices.

The allocation portion of the iterations, which may be referred to as block size, i.e., how many contiguous iterations to dole out at a time, may be explicitly specified by the user. Thus, for example, for 4 threads operating on an array of 100 floats, the user could specify that each thread take on blocks of 8 elements at a time (e.g., perhaps based on the size of a cache line, thereby yielding better cache locality), instead of, say, a default of 25 elements/iterations per thread. Alternatively, the elements/iterations could be blocked so that the data for each block fits inside a single processing element's cache. In some embodiments, the block size may be a minimum block size or alignment parameter, such that the distributed blocks are actually a multiple of the (minimum) block size. This may accommodate alignment concerns without naively using unnecessarily small blocks and thus creating excessive overhead.

As indicated above, there are various ways in which the information described above may be received. For example, in one embodiment, user input specifying the multi-processing functionality may be received, e.g., via a graphical user interface (GUI) of the program development environment, where, for example, the user may provide the input to a dialog box or wizard, or by wiring inputs to the node, among other input techniques. Alternatively, or in addition, in one embodiment, receiving information specifying multi-processing functionality of a target execution platform may include querying the execution target platform (or some other resource, e.g., a database of execution platform information), and receiving the information specifying multi-processing functionality of the target execution platform from the execution target platform in response to the querying. As another example, the method may involve simply retrieving default information specifying multi-processing functionality of a target execution platform for the graphical program, where, for example, a user or subsequent process may modify or override this information.

Figure 8A:
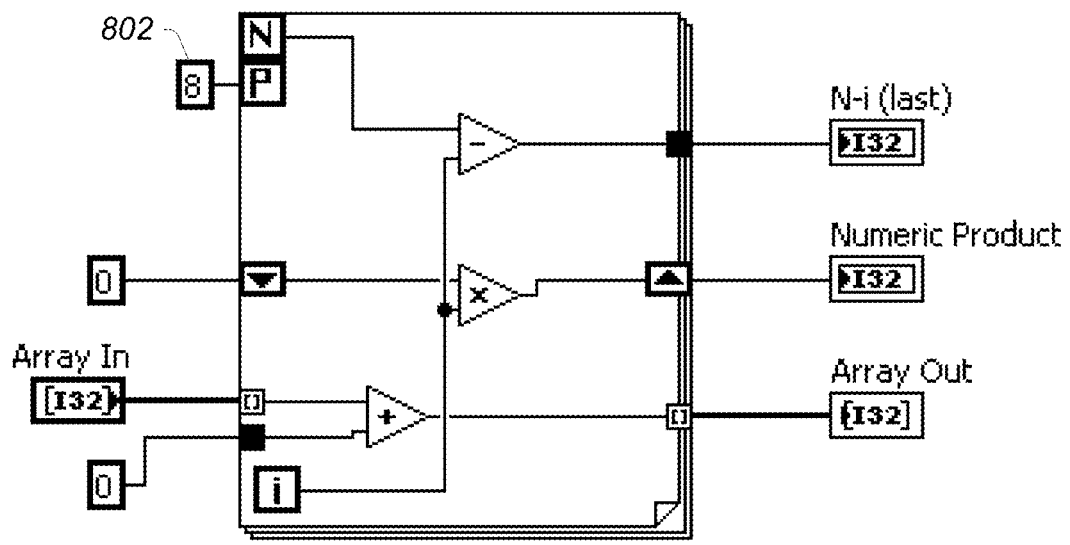
FIGS. 8A and 8B illustrate exemplary embodiments of border nodes.
Figure 8B:
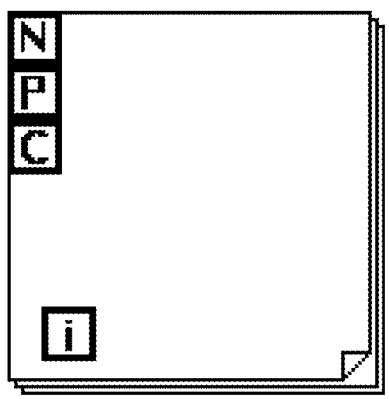

FIGS. 8A-8B—Border Nodes

In some embodiments, border nodes may be implemented for specifying and/or denoting parallelization attributes or parameters of FOR loops, where the term "border node" refers to the placement of the node (or terminal) on the border of a graphical FOR loop. However, it should be noted that the functionality of any of the graphical elements disclosed herein may be implemented in other forms, e.g., a textual program elements.

FIG. 8A illustrates an exemplary FOR loop that includes a border node 802 whereby parallelization may be specified for the FOR loop. In the embodiment shown, the border node 802, denoted "P" in the figure, is situated on the upper left edge of the FOR loop just under the loop counter N, and includes an outer terminal to which the user can explicitly wire a positive (nonzero) integer to specify the number of workers (second data flow program portions) to implement for concurrent execution of loop iterations. For example, the user may need to allocate half of available processing elements (e.g., processors) among two parallel FOR loops. As may be seen, in this case, the value wired to the outer terminal is 8. This parameter may be useful for scalability testing.

The border node may also include a static upper bound parameter via which the user may specify an upper bound on the number of workers to be implemented, e.g., at compile time. In one embodiment, the user may specify the upper bound at compile-time on a per-loop basis through a configuration dialog box, e.g., via a Number of Generated Parallel Loop Instances in the For Loop Iteration Parallelism Configuration Dialog, possibly with a global default value (e.g., 4 or 8) set by an INI (initialization) token. To prevent excessive compilation time, the value of this upper bound may itself have an upper bound, e.g., 128.

The border node may also include an inner terminal whereby the actual worker count may be denoted or specified. For example, this value may be set to the minimum of the dynamic user-specified value (if wired) and the static upper bound, and may be rounded up to 1 if the user specifies a value less than 1.

Thus, for example, consider a scenario where the target platform is a machine with 8 cores/processors, and there are two FOR loops, e.g., parallel FOR loops, on the same diagram, not nested, arranged next to each other "in parallel". Each FOR loop may be configured to generate 8 loop instances (workers). If [P] is left unwired (e.g., unspecified), the default behavior may be to use the number of processors available at runtime (8) as the value to give [P], and thus 16 worker instances (8 from each FOR loop) may be implemented, which will attempt to operate concurrently. However, since there are only 8 processors available (not 16), this arrangement may result in extra thread overhead and suboptimal performance. A preferred solution for this kind of scenario may be to utilize a primitive, e.g., a CPU Info primitive, to query the number of processors available at runtime (8), then divide that value by the number of FOR loops on this diagram (2), and wire the result (4) to the [P] node on each of the FOR loops. Then, even though 8 worker instances have been generated for each of the FOR loops, only 4 will be used by each, resulting in 8 total worker instances executing in parallel, matching the available parallelism on the machine and yielding better performance than the oversubscribed (8+8) version.

In one embodiment, a [C] border node, which may also be referred to as a [C] terminal, may be used with or on the FOR loop, e.g., under the [P] border node (or terminal). Note that some border nodes may include multiple terminals, e.g., an external terminal for wiring elements, e.g., values, from outside the FOR loop, and an internal terminal for wiring a value to or from an element inside the FOR loop.

More generally, a border node is a node that lives on a structure (e.g., a FOR loop) between its inner diagram(s) and the structure's parent diagram outside, and may have input and output terminals. For example, the [N] border node specifies the number of iterations to be performed by the structure. The [P] border node has one input terminal coming from the loop's parent diagram, outside of the loop, and one output terminal that feeds into the loop's inner diagram, and is related to parallelization, as described herein. The [i] border node shown has only an output terminal feeding into the loop's inner diagram, and relates to the loop counter.

For the dynamic fixed blocks schedule, [C] may be used to specify the block size(s). For the dynamic decreasing blocks schedule, [C] may be used as a minimum block size, e.g., with a value of 1 as a default. The output of [C] may be the actual blocksize of the block containing the current iteration. FIG. 8B illustrates a simplified FOR loop with [P] and [C] (and [N]) border nodes, although this example loop has no inner nodes, and may thus not compute any results.

In one exemplary embodiment, there may be three phases regarding multi-processing information and its use:

Edit-time: If not otherwise specified, the host, i.e., editing/developing, user's machine may be queried for its number of logical processors, and this value may be used as the default value for the number of workers to generate for the initial configuration of iteration parallelism by the user. Subsequently, the last value specified may be used. Note that each first data flow program portion (if there are more than one in the data flow program) may save its personal copy of the value specified.

Compile-time: Each first data flow program portion's saved number-of-workers-to-generate is used to generate that many workers (second data flow program portions) in the executable code for that first data flow program portion.

Run-time: The statically (edit time) specified number of workers are represented in the instruction code for the first data flow program portion, and if the user did not encode another value in the program, e.g., by "wiring" a specified value to the first data flow program portion, the execution platform may be queried for its number of logical processors, and the minimum of the static and dynamic values may specify the number of workers to be used at runtime.

Data Flow Intermediate Representation

In some embodiments, an intermediate representation (DFIR) of the data flow program may be utilized in the analysis and/or the code generation portions of the method. For example, in one embodiment, the method may include automatically generating a DFIR of the data flow program. The automatically performing dependence analysis and reduction operation analysis of the data flow program may include automatically analyzing the data flow intermediate representation of the data flow program. Similarly, automatically generating program code implementing the plurality of second data flow program portions may include generating executable code based on the data flow intermediate representation. In other words, rather than generating the program code implementing the second data flow program portions directly, intermediate structures (DFIR structures) may be generated, then the program code may be generated from these intermediate structures. Thus, in some embodiments, a DFIR (or multiple DFIRs) may be used to perform at least a portion of the methods described herein.

Dependence Analysis

As discussed above, a FOR loop cannot be parallelized if it contains any side effects or cross-iteration dependences, and so a dependence analysis may be performed on the FOR loops to determine if such dependences (including side effects) exist. Errors may be generated if properly executable code cannot be generated because of a detected problem, while warnings may be generated if properly executable code may be generated but its correctness may not be guaranteed e.g. there may be side effects that are out of order, i.e., that do not preserve the transparency of the parallelization. In preferred embodiments, the dependence analysis occurs at edit-time/type propagation, so the user can receive immediate feedback. In various embodiments, the analysis may be performed by the development environment, or by a separate tool, described in more detail below.

The analysis techniques that may be used to determine whether or not parallelism of a FOR loop is possible are numerous and varied, any of which may be used as desired. In some embodiments, the dependence analysis may include determining any conflicting array accesses across iterations of the graphical program code comprised in the interior, where if there are conflicting array accesses across iterations of the graphical program code comprised in the interior, the iterations of the graphical program code are not parallelizable.

Figure 9:
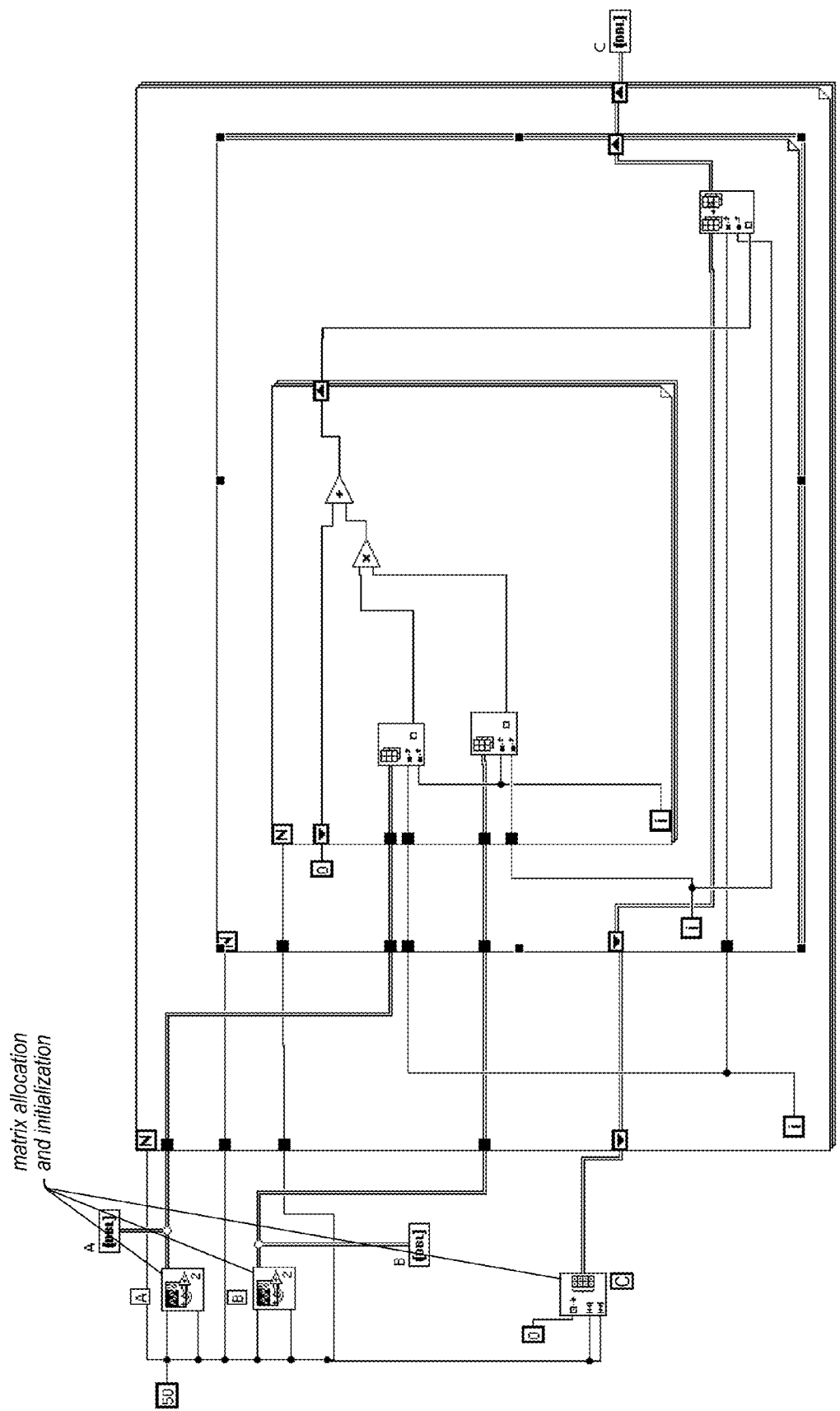
FIG. 9 illustrates an exemplary graphical program for matrix multiplication that includes three nested FOR loops, according to one embodiment.

FIG. 9 illustrates an exemplary graphical program for matrix multiplication that includes three nested FOR loops. As shown, matrices A, B and C are pre-allocated outside of the loop by respective graphical program nodes labeled accordingly (in boxed text), and passed into the computation loops by tunnels and shift registers. Note that this implementation utilizes shift registers; more specifically, an inplace algorithm inplaces the shift registers across the loops. There are no extra memory copies of the array inside the triple-nested loops, but because of the usage of shift registers, initial analysis may suggest that the loops are therefore non-parallelizable. However, from basic knowledge of linear algebra, it is clear that all three loops can be parallelized. Note, however, that while any of the three loops can be parallelized, the outermost loop may be preferred because it provides the highest-granularity for the parallelism. For example, parallel inner loops would have to synchronize at the end of each of their outer loop's iterations, which may leading to less scalable parallelism. The following describes details of an analysis technique that can properly determine the parallelizability of such FOR loops and others.

Embodiments of the data flow and array disambiguation analysis described herein may enable automatic discovery of parallelizable loops, and in some embodiments, parallelization of them, thereby freeing developers from the tedious and error prone process of manual analysis and/or parallelization. The developers can focus their efforts on algorithm development in sequential order, then the analysis and transformation tools described herein can take over the sequential code and automatically detect the parallelizable loops and parallelize them. Note that these tools may facilitate automatic parallelization of legacy codebases.

As discussed above, a core idea of the analysis is to determine whether there exist any conflicting accesses of the array elements across the loop iterations. If there are conflicting array accesses, the loop does not allow parallelism. Otherwise, the loop may or may not allow parallelism, depending on other attributes of the program.

Figure 10:
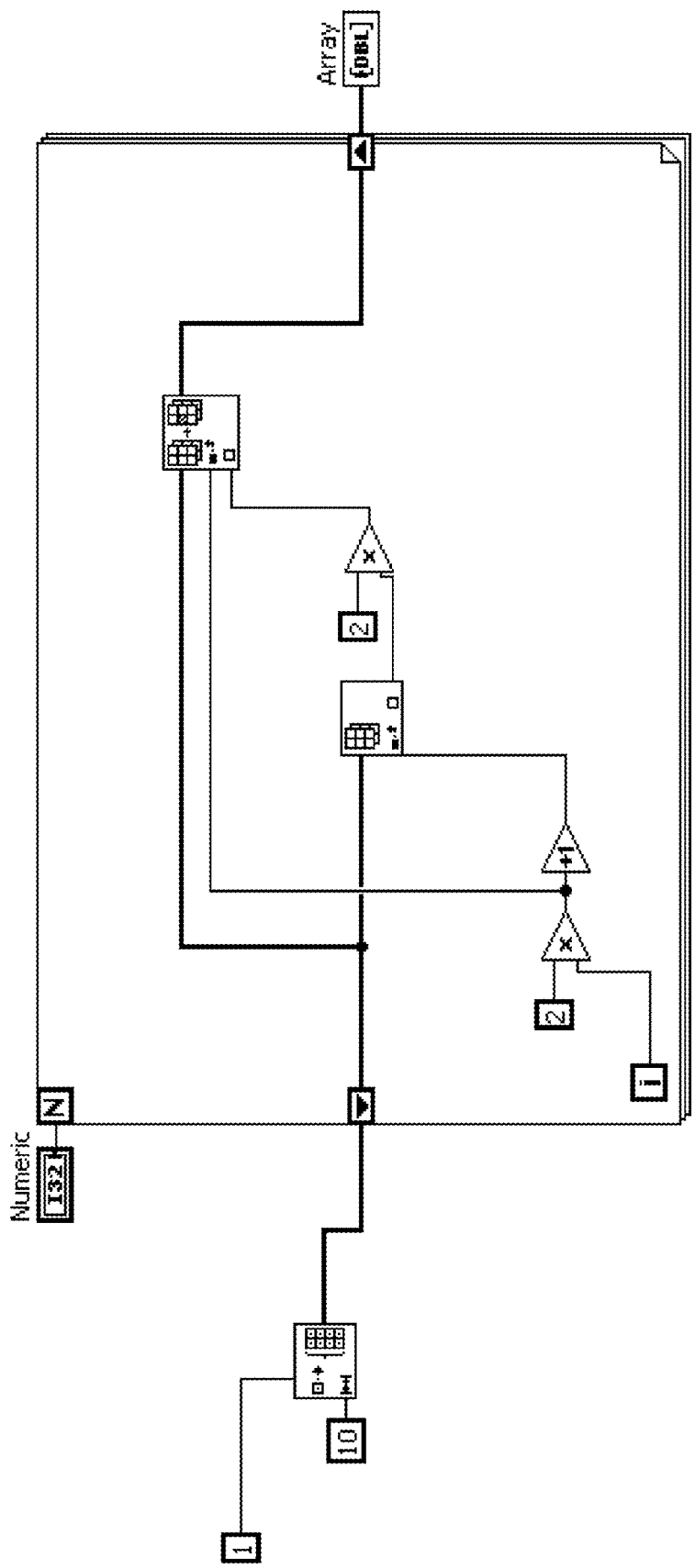
FIG. 10 illustrates an exemplary parallelizeable loop, according to one embodiment.
Figure 11:
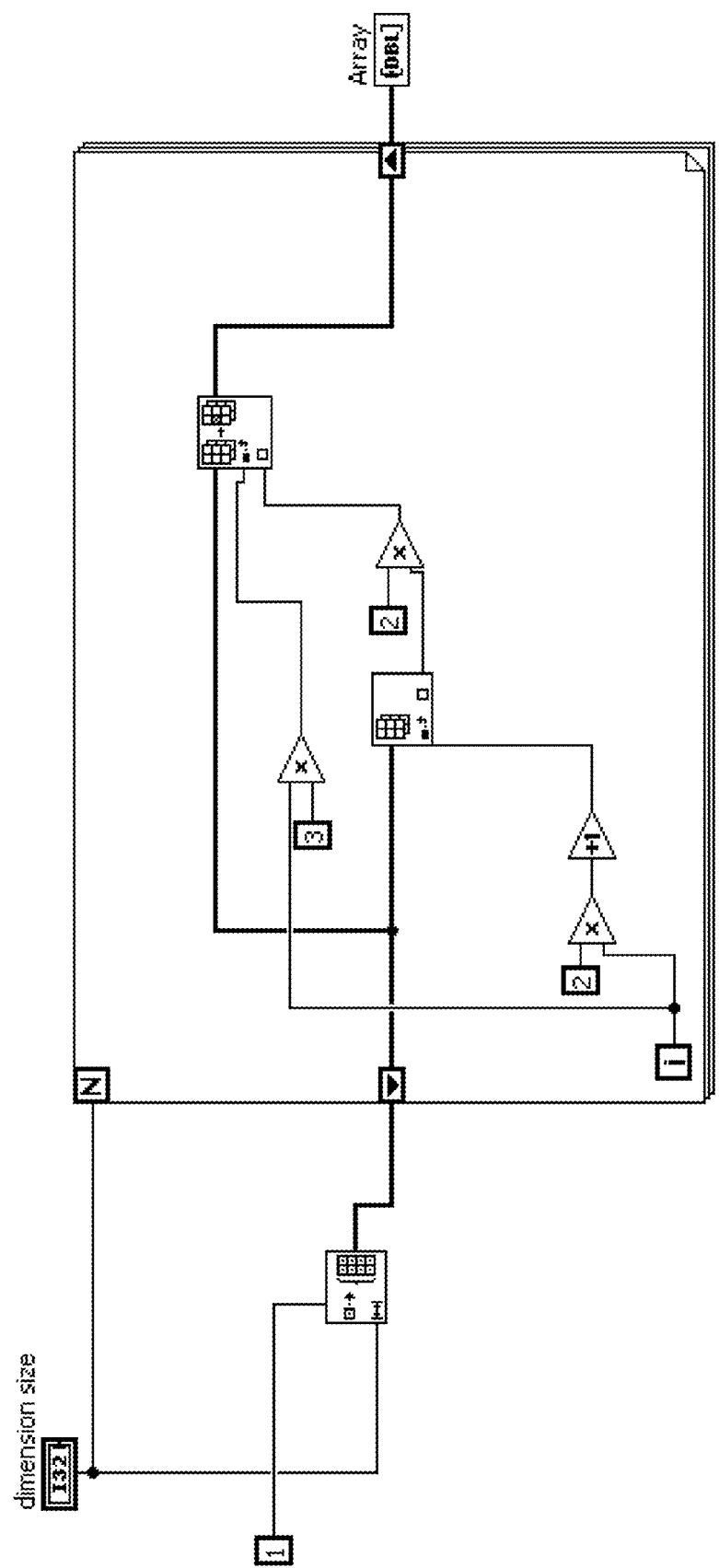
FIG. 11 illustrates an exemplary non-parallelizeable loop, according to one embodiment.

Two simple yet illustrative diagrams are shown in FIG. 10 and FIG. 11. FIG. 10 shows an example of a parallelizable loop. For every iteration in the loop (FIG. 10), the array index node reads the $(2*i+1)^{th}$ element and the array replace element node writes to the $(2*i)^{th}$ element. The problem of deciding whether there are any conflicting array accesses may be approached as a problem of determining whether there is a feasible solution to an Integer Linear Programming Problem (ILP), as discussed briefly above.

For example, for the loop in FIG. 10, the underlying ILP problem is:

1+2*x2=2*x1, subject to the following constraints:
0<=x1
0<=x2
x2!=x1

Straightforward analysis indicates that there is no feasible solution to this ILP. Therefore, the loop may be parallelizable, depending on other factors.

FIG. 11 shows an example of a non-parallelizable loop. For every iteration in the loop, the array index node reads the $(2*i+1)^{th}$ element and the array replace element node writes to the $(3*i)^{th}$ element. The underlying ILP for this loop is:

3*x2=1+2*x1, subject to the following constraints:
0<=x1
0<=x2
x1!=x2

This problem is feasibly solvable. For example, (x2=3, x1=4) is a solution, indicating that the result produced at the 3rd iteration is used at the 4th iteration. Therefore, this loop is not parallelizable.

From the above examples, it can be seen that the essential approach underlying the array disambiguation analysis is to test whether there is a feasible solution to an ILP. Any of various algorithms for solving such underlying ILPs may be used as desired. In one embodiment, William Pugh's Omega test algorithm (using branching-bounding approaches) may be used to solve the underlying ILP. The details of one embodiment of this algorithm follow:

Pugh's Omega Test (1) Choose a variable in ILP to eliminate. The algorithm uses the Fourier-Motzkin variable elimination method, although other methods may be used as desired. The idea is to apply substitution and simplification on the original ILP so that the range of linear coefficients in the new ILP is decreased compared to the original (or previous) ILP. An example of this variable elimination is shown in Table 1 below. In step 1, variable x is substituted away. Note that the maximum absolute value of the coefficient in the original ILP is 31 and the maximum absolute value of the coefficient in the new ILP is decreased to 24.

(2) Eliminate the variable and calculate the real and dark shadows of the set of constraints along that dimension. A real shadow is the relaxed region that covers the true solution region. A dark shadow is a constrained region that lies within the true solution region.

(3) If the real and dark shadows are the same, there is a feasible solution for the original problem if and only if there is an integer solution to the problem in the shadow.

Figure 12:
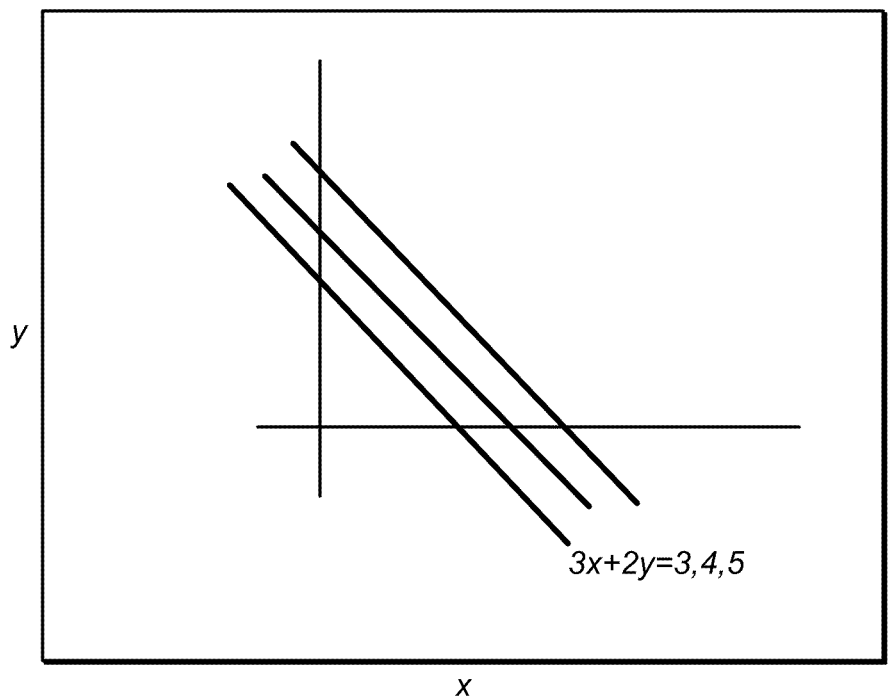
FIG. 12 illustrates exemplary constraints for solving an integer linear programming problem, according to one embodiment.

(4) Otherwise:
 (a) If there are no integer solutions in the real shadow, there is no solution to the original problem.
 (b) If there are integer solutions in the dark shadow, there is a solution to the original problem.
 (c) Otherwise, it is known that if there exists an integer solution, it must be closely nested in the upper bound and lower bound of the eliminated variable. Therefore, the original problem may be replaced with a set of sub-problems, and the sub-problems may be tested. The sub-problems may enumerate every possible value between the dark shadow and real shadow. There is no feasible solution if and only if there is no solution to any problems in the set. In other words, in (c), the original problem may be transformed into a set of new problems. This is the most computationally expensive case, which may result in an exponential number of problems to solve. However, this rarely happens in real applications. Essentially, the inequality constraint is replaced by equality constraints that enumerate every possible value that lies in between the dark and real shadows. For example, consider a case where the real shadow of a 2D constraint is 3x+2y<=3 and the dark shadow of the 2D constraint is 3x+2y<=5. Then, three new problems may be created with equality constraints {3x+2y=3, 3x+2y=4, 3x+2y=5}, respectively. These new constraints are illustrated as 3 lines in FIG. 12. A high level intuitive description of the algorithm is as follows: If a solution can't be found in the real shadow (relaxed problem), there is no solution. If a solution is found in the dark shadow (constrained problem), there is a solution. When a solution is found in the real shadow but not in the dark shadow, determination of whether there is a solution or not requires further tests. In such case, the problem may be broken down into a set of sub-problems and the sub-problems checked. In the graph of FIG. 12, the sub-problems are the lines to check, i.e., checks are made as to whether there are solutions on those 3 lines.

TABLE 1

| Omega Test Example | |
|---|---|
| Substitution | Problem |
| Original problem | 7x + 1y + 31z = 17 |
| | 3x + 5y + 14z = 7 |
| | 1 <= x <= 40 |
| | −50 <= y <= 50 |
| X = −8a − 4y − z − 1 | −7a − 2y + 3z = 3 |
| | −24a − 7y + 11z = 10 |
| | 1 <= −8a − 4y − z − 1 <= 40 |
| | −50 <= y <= 50 |
| Y = a + 3b | −3a − 2b + z = 1 |
| | −31a − 21b + 11z = 10 |
| | 1 <= −1 − 12a − 12b − z <= 40 |
| | −50 <= a + 3b <= 50 |
| Z = 3a + 2b + 1 | 2a + b = −1 |
| | 1 <= −2 − 15a − 14b <= 40 |
| | −50 <= a + 3b <= 50 |
| b = −2a − 1 | 1 <= 12 + 13a <= 40 |
| | −50 <= −3 − 5a <= 50 |
| Final result | 0 <= a <= 2 (feasible) |

Exemplary Implementation:

As indicated above, in some embodiments, the array analysis may be implemented in a DFIR of the data flow program. For example, the analysis may be performed just after the data flow program, e.g., the graphical data flow program, is lowered or transformed into a DFIR graph. The result of the analysis may then be available for subsequent compilation, transformation, and optimization, e.g., loop transformations, inplace algorithm, etc. The analysis may also be used as a feedback tool to the end user. In one embodiment, the detected parallelizable loops may be displayed graphically to the user. For non-parallelizable loops, visualization of the analysis result may include showing the programmer the exact conflict array accesses that disallow the parallelization. With this information, the user may be able to restructure those non-parallel loops and make them parallel. In some embodiments, this analysis may be provided or implemented in a program analysis tool or toolkit to provide an analysis tool for parallel loop detection.

In one embodiment, the array analysis process or tool may be implemented by or include the following components or modules, where the parallel loop detection component may be the main application module that uses the other components. Note, however, that the particular organization of the functionality (and possibly portions of the functionality itself) is meant to be exemplary only, and that any other arrangements or architectures may be used as desired.

(1) Loop annotation: This component annotates some basic loop information for linear expression system and parallel loop detection, e.g., the ID of the loop, the set of induction variables in the loop, the nesting level of the loop, and the range of the induction variables, among others. It should be noted that the annotations described herein may be included in the programs themselves, in DFIRs of the programs, or in separate data structures, e.g., distinct from the programs or DFIRS, as desired. Moreover, in some embodiments, while each of these items of information may be required to perform the analysis, some or all of this information may be "built-in" to the programs or intermediate representations thereof, and so may not necessarily have to be computed or annotated.

(2) Expression formation/propagation: This component constructs and propagates the linear expression in the DFIR graph. For example, the linear expression may be represented as a std::map, which may contain the variable ID and its coefficient pair.

(3) Data flow algorithm for source/destination array set: This component propagates the array data flow information in DFIR. For each array node, it may annotate the "source" set and the "destination" set. The "source" set is the set of nodes which define some or all the values for the current node. The "destination" set is the set of nodes which use some or all the values produced by the current node. The source and destination sets plus the array access expression constructed by component 2 may be used together for the detection of array access conflicts in the parallel loop detection module.

(4) Omega test: This module solves the ILP, using the Omega test algorithm described above to decide whether there is a feasible solution to the ILP or not. As noted above, other embodiments may use other algorithms to perform this test, as desired.

(5) Parallel loop detection: This is the main application module for parallel loop detection, and may analyze each loop in the diagram individually. More specifically, it may collect all the array accesses within the loop, build up the ILP problems for every possible pairs of array accesses, and run the Omega test to determine whether there is any array accesses conflict. If no conflict array accesses are detected, the loop may be safe to parallelize; otherwise the loop is non-parallelizable.

It may be instructive to describe a walk-through of the algorithm as applied to a graphical data flow program, e.g., an example LabVIEW diagram. Consider an LU matrix decomposition as the example. As is well known, LU decomposition is used in numerical analysis to solve systems of linear equations or calculate a determinant. More specifically, LU decomposition computes: A=LU, where L and U are the lower triangular and upper triangular matrices, respectively.

Figure 13A:
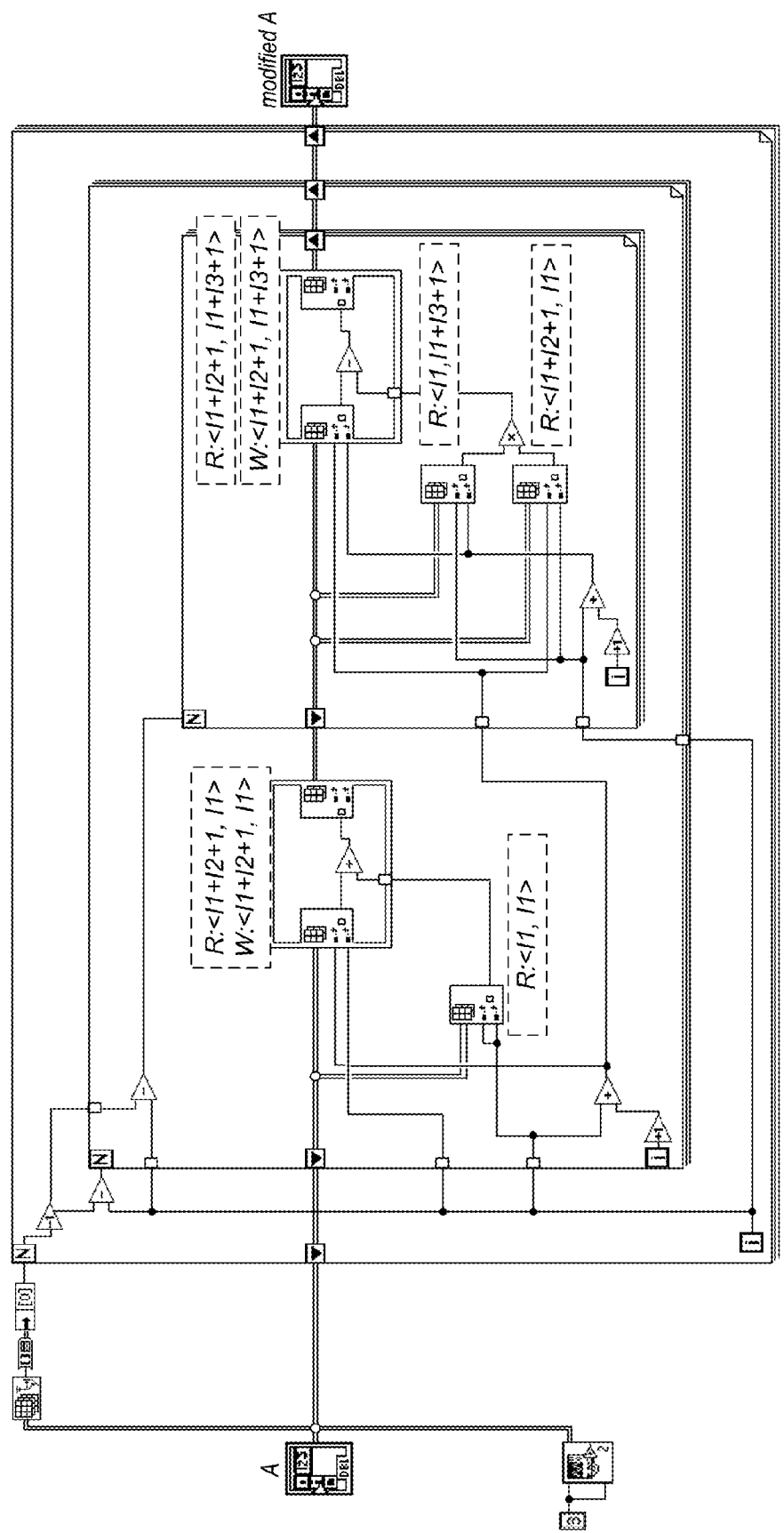
FIGS. 13A-13D illustrate array analysis of an LU decomposition diagram, according to one embodiment.
Figure 13B:
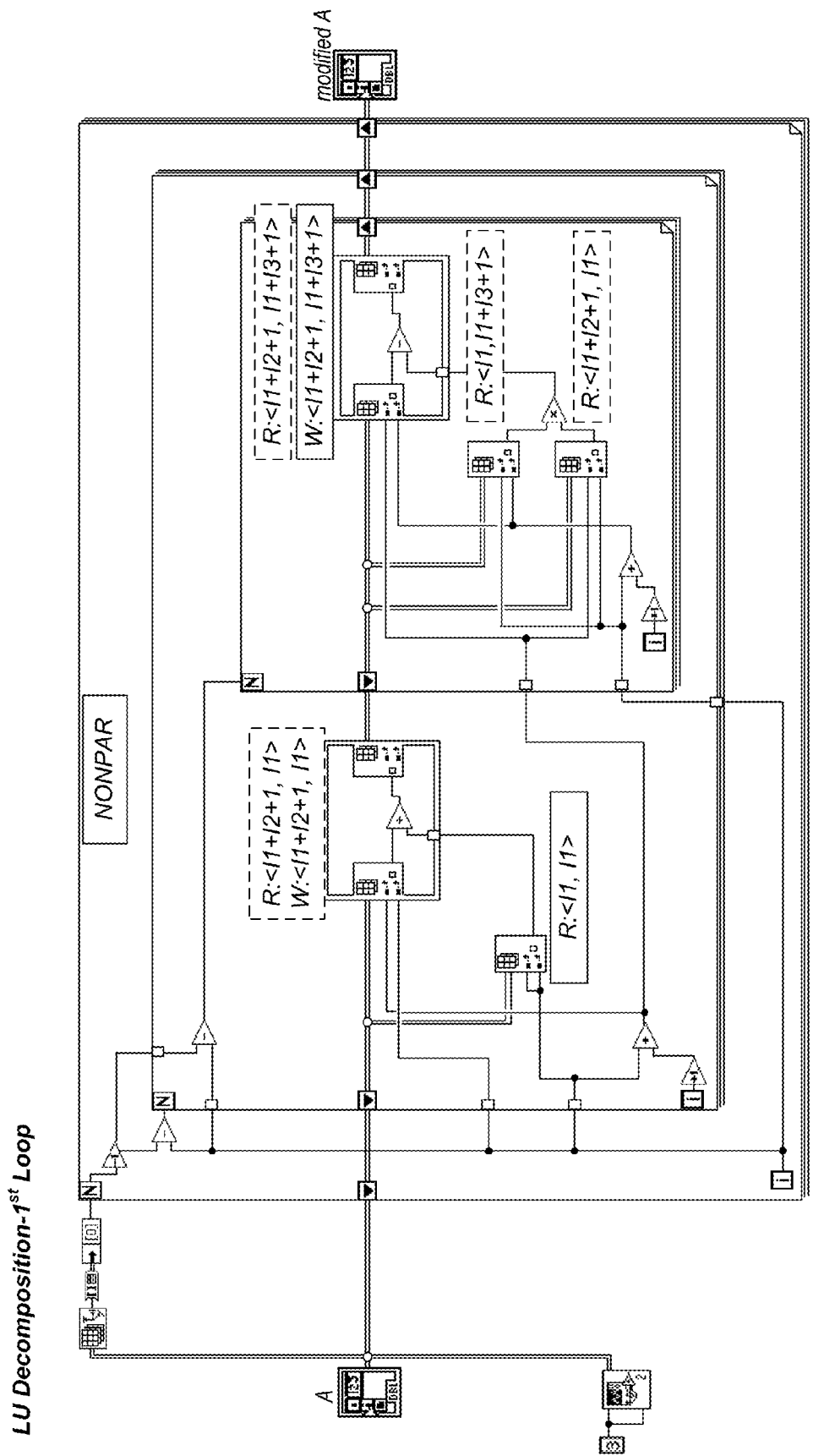
Figure 13C:
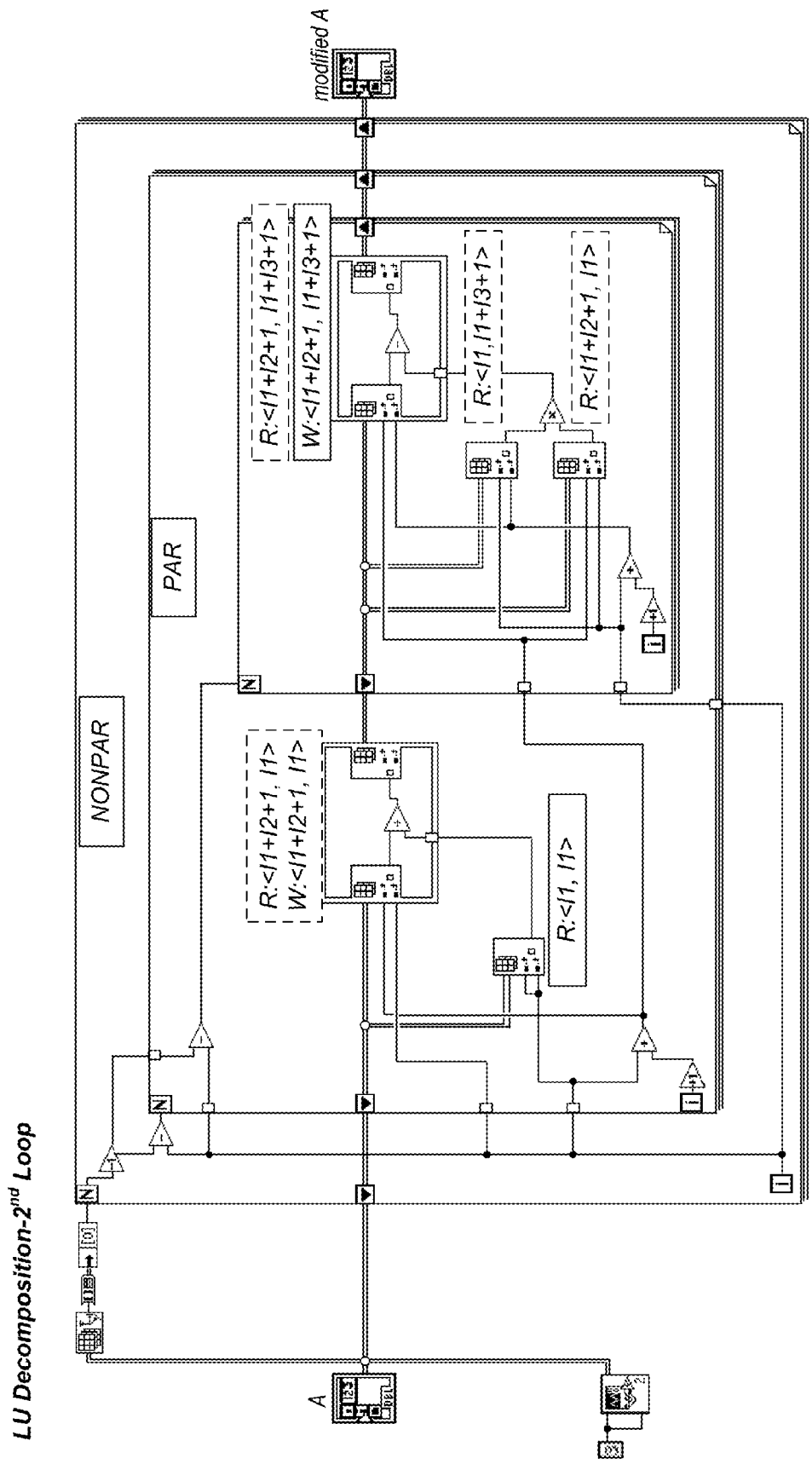
Figure 13D:
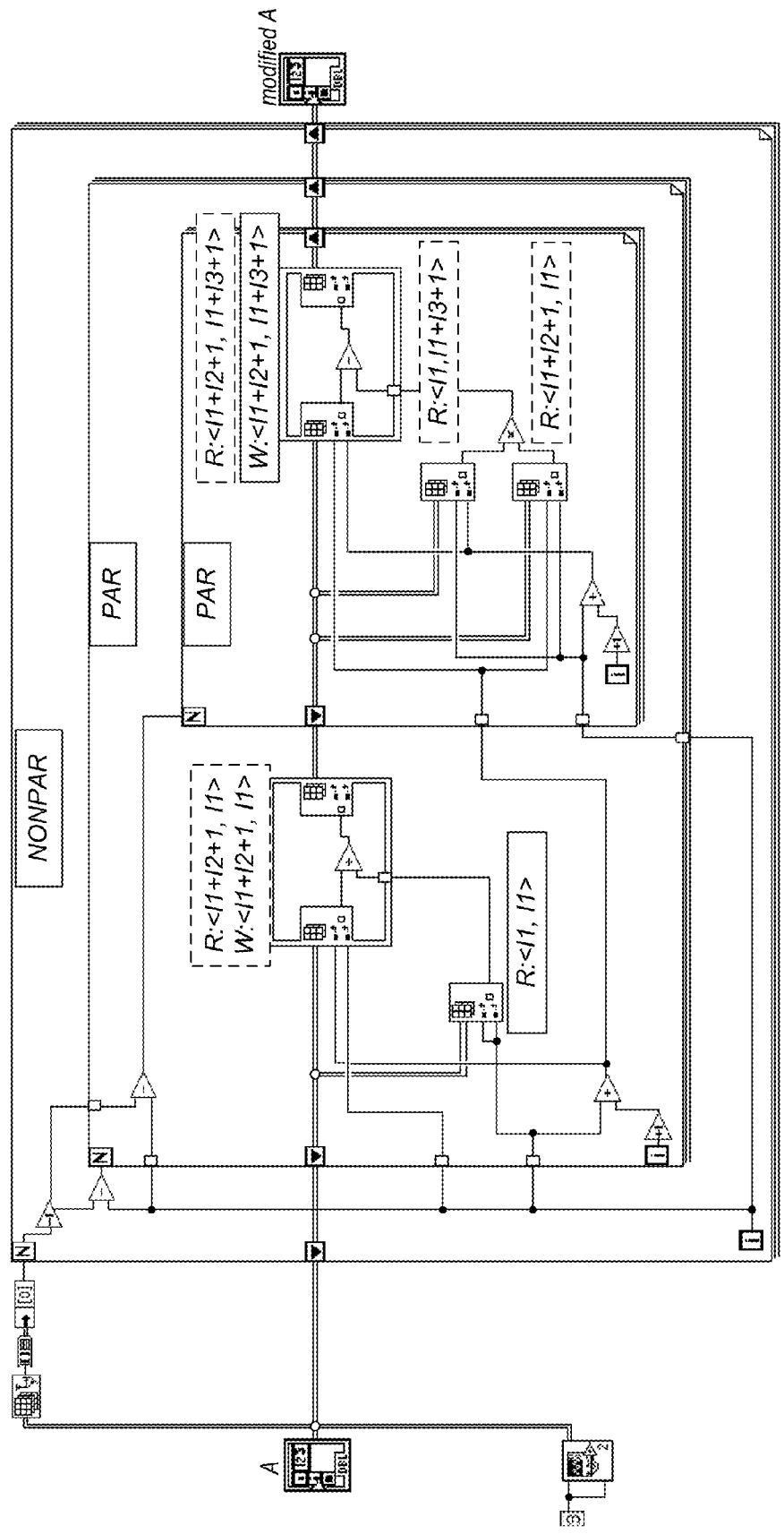

FIG. 13A illustrates an exemplary diagram to compute the L matrix, and shows the annotation array access expressions in the loop. In this embodiment, L is stored to the lower triangular of A (L\A) and the multipliers computed for the row subtraction are stored in the upper triangular of A (A\M). The decomposition algorithm starts from the upper-left of the matrix and walks towards the bottom-right of the matrix. FIGS. 13A-13D illustrate steps of one embodiment of array analysis performed on the diagram of FIG. 13A, i.e., the work flow of array analysis on the LU decomposition diagram of FIG. 13A. FIGS. 13B-13D show the example ILP and the analysis applied to the 3 nested loops individually. The dashes boxes in each figure show the array read/write access expressions from which the ILP is constructed. Example ILPs constructed for one pair of array accesses for each diagram are described with each figure.

FIG. 13B illustrates application of the Omega test and parallel loop detection for the outermost loop. The example ILP for FIG. 13B is:

$<I_1''+I_2''+1, I_1''+I_3''+1> == <I_1', I_1'>?$

Subject to the constraints:
$0<=I_1''<N; 0<=I_1'<N;$
$0<=I_2''<N-I_1''-1; 0<=I_2'<N-I_1'-1;$
$0<=I_3''<N-I_1''-1; 0<=I_3'<N-I_1'-1;$
$I_1'!=I_1'.$ A feasible solution for this ILP is:
$I_1''=I_1'-1;$
$I_2'=0;$
$I_3''=0.$ Thus, the outer loop has array access conflicts, and cannot be parallelized, as indicated by the label "NONPAR" at the top of the outer loop.

FIG. 13C illustrates application of the Omega test and parallel loop detection for the middle loop. The example ILP for FIG. 13C is:

$<I_1''+I_2''+1, I_1''+I_3''+1> == <I_1', I_1'>?$

Subject to the constraints:
$0<=I_1''<N; 0<=I_1'<N;$
$0<=I_2''<N-I_1''-1; 0<=I_2'<N-I_1'-1;$
$0<=I_3''<N-I_1''-1; 0<=I_3'<N-I_1'-1;$
$I_1''=I_1'.$ There is no feasible solution for this ILP.

Thus, there are not conflicting array accesses, and so the middle loop may still be parallelizable, as indicated by the label "PAR" at the top of the middle loop.

FIG. 13D illustrates application of the Omega test and parallel loop detection for the inner loop. The example ILP for FIG. 13D is:

$<I_1''+I_2''+1, I_1''+I_3''+1> == <I_1', I_1'>?$

Subject to the constraints:
$0<=I_1''<N; 0<=I_1'<N;$
$0<=I_2''<N-I_1''-1; 0<=I_2'<N-I_1'-1;$
$0<=I_3''<N-I_1''-1; 0<=I_3'<N-I_1'-1;$
$I_1''=I_1';$
$I_2''=I_2'.$ There is no feasible solution for this ILP.

Thus, there are no conflicting array accesses, and so the inner loop may still be parallelizable, as indicated by the label "PAR" at the top of the inner loop.

Thus, the Omega test gives a yes/no answer regarding the feasibility of the ILPs for each loop. Note that the 2 inner loops are (possibly) parallelizable and the outer loop is not parallelizable because the read/write array access conflict.

Scheduling

There are numerous ways in which the scheduling of iteration execution may be implemented, details of which are now presented.

Static Schedule

As noted above, in various embodiments, the execution schedule may be specified as a static schedule, where each execution thread is statically assigned a respective subset of the iterations, or a dynamic schedule, where each execution thread is dynamically assigned respective successive subsets or blocks of the iterations during runtime in an opportunistic manner.

Note that in the case of a static schedule, which in some embodiments may be the default scheduling strategy, each thread may be assigned specific blocks of elements or iterations to operate on, distributed round-robin to each of the threads. Static scheduling means that each thread knows exactly which iterations it will execute on startup and thus does not need to coordinate with other threads to operate.

Note that the subset of elements or iterations assigned to a thread may include multiple disjoint subsets, i.e., the elements or iterations of the subset may not all be contiguous. For example, a subset may include multiple blocks, each of which may have contiguous elements/iterations, but which may or may not be contiguous with respect to each other.

Said another way, in a static scheduling strategy, which may be denoted as Static(P,C), the iteration set and input arrays may be split into blocks of C elements to operate on, with blocks distributed round-robin to each of the P workers. Thus, if the user does not specify c then a simple block distribution may be used; otherwise a block-cyclic distribution may be used, with blocks of size C.

Note that simple (static) block distribution allocates the iterations among P workers by dividing the iterations into P contiguous blocks, which can result in inefficiencies due to the fact that all iterations may not perform the same amount of work, and thus require more or less time to execute. Thus, partitioning the iterations based on simple block distribution may not balance the computational load efficiently among the workers. Nor does this strategy allow users to divide the iterations for better cache locality. In other words, static scheduling approaches where each worker is assigned a fixed-sized block of contiguous iterations from the original FOR loop, and each worker executes the same number of iterations, balances the work between iterations when the iterations take the same amount of time to execute and the workers are not interrupted. However, this static approach does not balance the work when the iterations contain variable amounts of work or when the processing environment is unpredictable, e.g., this scheduling solution is not able to adapt if some of the iterations take longer than others or if some of the workers don't execute as quickly as others.

Figures 14, 15:
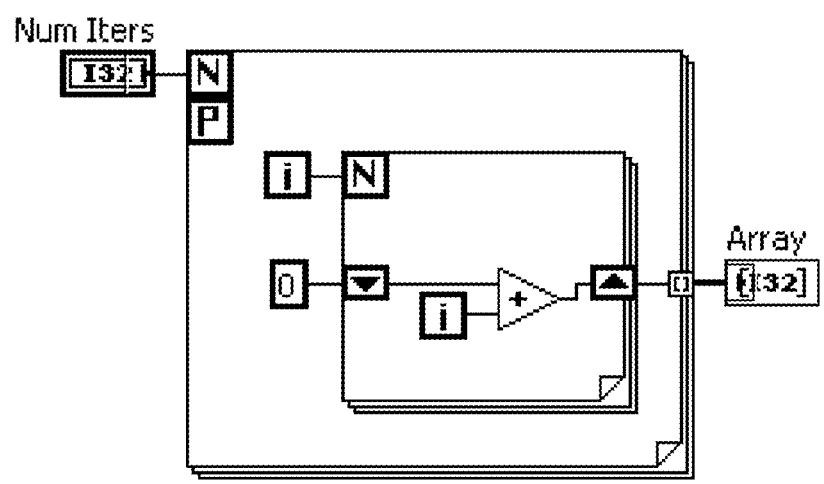
FIG. 14 illustrates exemplary partitioning of sixteen iterations among four processors when index blocksize is two, according to one embodiment.
FIG. 15 illustrates an exemplary data flow program where computational load is not balanced among iterations, according to one embodiment.

In contrast, block cyclic distribution splits iterations across workers dynamically, allocating blocks of iterations to each worker at runtime. More specifically, with a block cyclic schedule, which is a static schedule, the iterations may be divided into blocks or chunks of C iterations, where the user may provide C. The blocks may be distributed among the workers in a round robin manner. FIG. 14 shows how sixteen iterations may be divided among four processors when C is two, according to one embodiment. As may be seen, in this example each worker executes two blocks of two iterations each. Note that in one embodiment, for block cyclic distribution, each worker loop may be wrapped in another loop that iterates through the blocks for this worker, feeding the blocksize and offset into the inner worker loop.

Thus, in one embodiment, the user may explicitly specify the number of iterations to dole out at a time. For example, for 4 workers operating on an array of 100 floating point values, the user may specify that each worker process blocks of 8 elements at a time (perhaps the size of a cache line, thereby yielding better cache locality), instead of the default simple block distribution where each of the 4 workers consumes one chunk of 25 elements. Alternatively, the data could be blocked or chunked so that each block fits inside a single processor's cache. In some embodiments, the blocksize may be a minimum blocksize or alignment parameter, such that the distributed blocks are actually a multiple of the blocksize, allowing consideration of alignment concerns without naively choosing unnecessarily small blocks and creating excessive overhead. In one embodiment, the value C may be specified via a border node, described below under the section "Border Nodes".

One variation of a static scheduling strategy is a static (bounded) allocation strategy, in which a fixed number of workers equal to the static upper bound K are allocated or implemented, but where the iterations, i.e., the work, may be divided such that only P_actual of the workers are utilized, where P_actual is the minimum of P and the upper bound K (discussed above). Note that this approach still suffers from a waste of space when K>P and an inability to scale up to more than K processors. However, for a sufficiently large K, this may affect the parallelism on very few machines.

Another variation of a static scheduling strategy uses a static schedule with dynamic allocation of iteration blocks. In one embodiment of this approach, each worker (second data flow program portion) may be contained in an automatically generated wrapper, e.g., a subVI. Thus, for each worker, a wrapper may be automatically generated that contains a blockable or chunkable version of the original FOR loop. The calling code can loop through and call this wrapper a specified number of times, e.g., P times, with appropriate inputs for each call. In one embodiment, the wrappers may be reentrant, thus allowing for concurrent invocation and execution. Moreover, each wrapper may use an in-place structure to keep inputs/outputs in-place to each other. Additionally, input and output arrays may be sub-arrays.

Note that the wrapper implementation may suffer from poor performance; however, the code duplication alternative would cause considerable code bloat. Thus, benchmarking may be used to determine which strategy is appropriate for a given application. Further details regarding use of wrappers for the workers are provided below.

Dynamic Schedule

In contrast to static scheduling, in dynamic scheduling, which may be denoted by Dynamic(P,C), each thread may be assigned a block of elements or iterations to operate on, then, whenever a worker needs more work, it is dynamically assigned a next block of elements/iterations. Note that this dynamic assignment scheme does not proceed in round-robin order as the static schedule does. Thus, dynamic scheduling may be implemented to help balance the load between workers. With dynamic schedules, the iterations are divided into blocks or chunks, and when a worker finishes its current block, it is assigned another block from the pool. This allows workers that finish early to get additional work. For example, with 4 threads, if thread 3 completes its (say) 8-element block before thread 2, thread 3 may ask the scheduler for the next available block instead of simply grabbing a statically pre-designated next block. Dynamic scheduling may thus be particularly beneficial in certain types of applications.

A simple example of such an application is shown in FIG. 15. As may be seen, a static block schedule would not perform well for the loop shown below, since each iteration of the outer loop requires more computation than the previous iteration, and so the workers that received the last blocks of iterations would need to perform much more computation than the first. The workers with less work would thus sit idle waiting for the other instances to complete.

Figure 16:
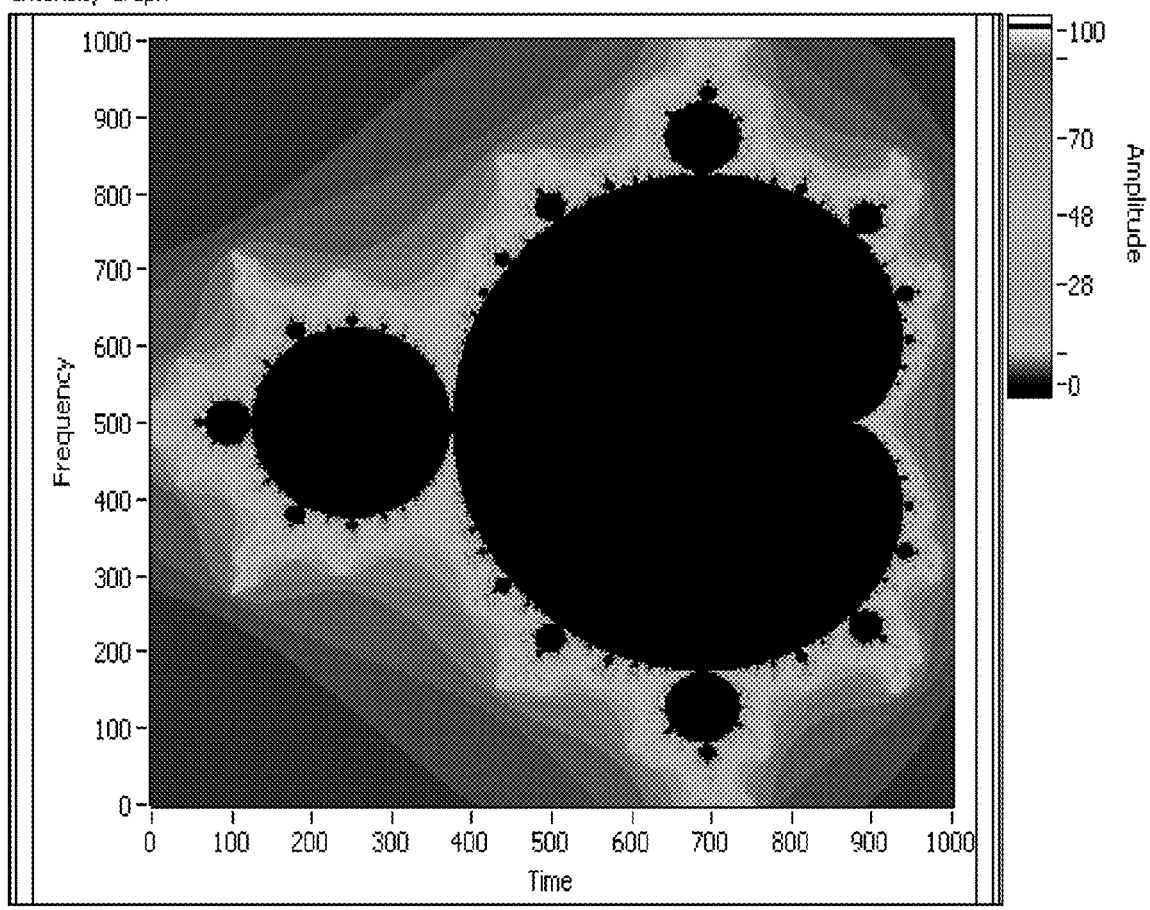
FIG. 16 illustrates output from an exemplary data flow program for computing the Mandelbrot set, according to one embodiment.

Computing the Mandelbrot set is another example of an algorithm where some loop iterations take longer than others. FIG. 16 illustrates exemplary output from such an application. The algorithm iterates over points in a 2D space to determine whether each point is in the set and colors the point black if it is in the set. The computation requires more steps (iterations) if the point is in the set. Thus, if the points (pixels) of the left side of the space (image) were computed in parallel with those of the right side, the right half of the image would take longer to process since more of those points are black.

With a dynamic schedule, the iterations may be assigned to workers when they request work. Each loop worker requests a block, computes the iterations, and then requests another block. With this type of schedule, the workers that get more CPU time or blocks with less work execute more iterations of the original loop.

Three exemplary types of dynamic schedule that may be implemented include: Dynamic Fixed Blocks, Dynamic Decreasing Blocks, and User-Specified Partitioning, among others. The primary difference between these strategies is in how the sizes of the blocks are determined. The rest of the support code may be identical. These exemplary dynamic scheduling strategies are now described.

Dynamic Fixed Blocks

In one embodiment of this form of dynamic scheduling, the iterations may be divided into constant-sized blocks (with the possible exception of the last block, which may contain fewer iterations). The user may specify the block size. In some embodiments, the default value may be one (1). In other embodiments, the block size may be computed based on the data size and cache sizes.

Said another way, in one embodiment, a static number of parallel calls may be allocated to each reentrant worker wrapper instance. Every block may be pushed onto the block queue, and each worker wrapper instance may dequeue a block, execute the FOR loop over the block, and output its results (e.g., to another queue), then fetch another block from the input queue. After the worker wrappers have consumed all blocks and each has completed and returned its results, the caller (e.g., program, VI/diagram) may reconstruct the results from the output queue.

In one embodiment, for the dynamic schedule, the FOR loop may be converted into a scheduler element wrapping multiple calls to the worker wrapper holding the modified (split) original loop body, i.e., the second data flow program portion. The scheduler may manage array splitting, memory copies, multiple parallel invocations, and passing the loop inputs and iteration schedule to each worker wrapper. Each split loop may runs over the scheduled iteration block using the given input. The scheduler may wait for all iterations to finish and join/resolve the output (e.g., via reduction and/or merge operations).

Thus, in this strategy, the iteration set is split into blocks of c iterations to operate on, and each block is queued up in the scheduler queue. Each of the P workers pulls a block of iterations from the queue and executes those iterations, using the appropriate blocks of the input arrays and outputting associated results. When a worker finishes its block and needs more work, it gets the next block of iterations. Note that this allocation does not necessarily proceed in round-robin order (as the static schedule does). For example, with 4 workers, if worker 3 completes its current block before worker 2, it asks the scheduler for the next available block instead of just grabbing its statically predesignated next block.

Dynamic Decreasing Blocks

In one embodiment of dynamic decreasing blocks scheduling, iterations may be divided into increasingly, e.g., exponentially, linearly, etc., smaller blocks, e.g., where each next block size is equal to the (number of remaining iterations)/[P], and where P is the number of workers. This approach makes the last blocks smaller to minimize the chance of a worker being assigned a large set of work at the moment when most of the workers are finished processing. Note that the user does not need to specify a block size for this schedule. However, if a value is specified, e.g., by wiring the value to a border node [C], the value may be used to specify a minimum block size.

Thus, for example, in a dynamic decreasing blocks or guided schedule, which may be denoted Guided(P, C), each thread may be assigned a large block or subset (e.g., a multiple of c if wired) on a first pass, and an increasingly smaller block/subset on each following pass, e.g., down to some limit of c elements/iterations. The block size may be dynamically computed as needed (usually as N-remaining/T, where N-remaining denotes the remaining elements/iterations, and T denotes the number of execution threads). Thus, this approach is similar to the dynamic schedule, but with a decreasing block size. This type of schedule may be most appropriate for load-balancing, especially if each iteration can take a variable amount of time. In one embodiment, in both the dynamic and guided scheduling cases, the method may include (a thread process) querying a scheduler to dynamically determine the next subset or block of iterations to execute, and claiming that subset/block with the scheduler.

User-Specified Partitioning

In one embodiment of a dynamic schedule in which the user specifies partitioning of the iterations, a user may provide a set of integers specifying a series of block sizes, e.g., the user may wire an array of integers to the [C] border node to specify a series of block sizes. This approach may be useful for experimenting with new (or existing) partitioning/scheduling strategies.

Note, however, that in this approach, cases where the user specifies too few or too many block sizes may need to be handled. For example, if there are too many, the extra block sizes may be ignored. If there are too few, the last block size in the array may be used for all remaining blocks (or 1 may be used for all block sizes if the array is empty). Similarly, block sizes less than 1 may be upped to 1.

Another variant of the dynamic scheduling strategy uses dynamic scheduling with dynamic allocation. In this strategy, dynamic allocation is performed based on K (determined at edit or compile time) or a user specified value T (determined at run-time). In one embodiment, the correct number of workers to implement may be determined dynamically (at run-time).

Note that a static schedule may outperform a dynamic schedule for large numbers of loop instances, because requesting blocks of iterations may cause a bottleneck. However, a dynamic schedule may outperform a static schedule when the work cannot be balanced easily.

It should also be noted that for at least some of these schedule types, a processing structure, e.g., an execution thread, can be assigned multiple (disjoint) subsets of the iterations, i.e., multiple blocks that may not be contiguous with respect to each other. Note also that in the dynamic and guided scheduling cases, the method may also include querying a scheduler to dynamically determine the next subset of iterations to execute, and claiming that subset with the scheduler.

Summarizing the above: a static block schedule may be appropriate for algorithms where the work is divided evenly among iterations; a static block cyclic schedule may be appropriate for algorithms where some parts of the iteration space contain more work and sampling across the iteration space will balance the work; a dynamic fixed blocks schedule may be appropriate for algorithms where the work cannot be divided evenly using a block cyclic partitioning, and the user has found a more efficient block size than the adaptive partitioning dynamic decreasing blocks provides; a dynamic decreasing blocks schedule may be appropriate for algorithms where the work may vary across the iteration space, and the user does not want to take the time to find a good block size; and a user-defined partitioning schedule may be appropriate for algorithms where the user wants to provide a specific partitioning, which may involve or require specialized knowledge.

Exemplary Schedule Performance Comparison

As mentioned above, computation of the Mandelbrot set is a good example of an application with substantial imbalances in the work performed per pixel/point, and thus, per iteration or iteration block.

Figure 17:
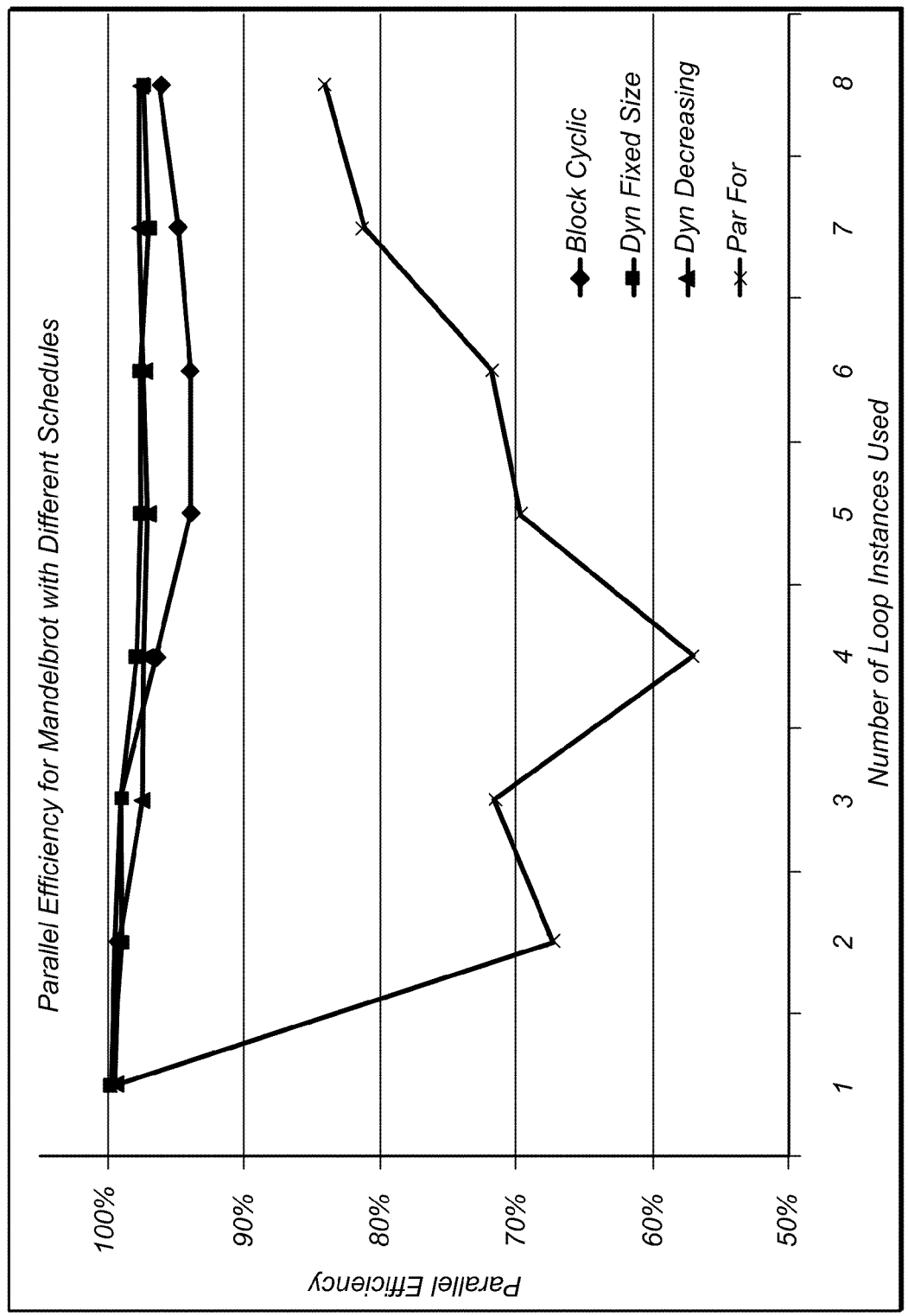
FIG. 17 illustrates performance differences between exemplary graphical programs for computing the Mandelbrot set according to various scheduling strategies, according to one embodiment.

FIG. 17 illustrates performance differences between exemplary graphical programs for computing the Mandelbrot set according to various scheduling strategies, specifically, according to a static block schedule, labeled "Par For", a static block cyclic schedule, labeled "Block Cyclic", a dynamic fixed blocks schedule, labeled "Dyn Fixed Size", and a dynamic decreasing blocks schedule, labeled "Dyn Decreasing".

As may be seen, FIG. 17 shows how much more effective the static block cyclic, dynamic fixed blocks, and dynamic decreasing blocks schedules are than the static block schedule for this type of problem. Note that the parallel efficiency for the static block schedule (Par For) drops with additional worker/loop instances since this strategy is not load balancing.

In this example, the dynamic fixed size schedule gives the best performance; however, achieving that performance requires selecting the best block size for each number of worker/loop instances. The dynamic decreasing schedule also performs well, and it doesn't require configuration by the user (the minimum block size used was 1, which is the default). The block cyclic schedule also does well, but it doesn't perform quite as well when there are more than four worker/loop instances.

Correctness Issues

It should be noted that out-of-order computation may produce different results for serial vs. parallel code when using fixed or floating point operations, which may have bearing on implementations using programmable hardware elements, e.g., on implementations using field programmable gate arrays (FPGAs).

Auto-Chunking

Array ordering between an input and output array should be maintained. Such ordering may be achieved via "autochunking", where "chunk" refers to a block of array elements, i.e., an array block, e.g., a "block". Since the worker rank and the blocksize/schedule are known, where in the larger array a subArray block should go is also known. It may also be possible to inplace everything if cache/memory conflicts can be avoided. This knowledge may also be used to build similarly ordered arrays from associated scalar outputs from each iteration.

Multiple Auto-chunked Arrays: If two arrays of different sizes are piped into a parallel FOR loop, the smaller array may be used to determine the blocksize, and the extra elements of the larger array may be ignored.

Inplaceness: In some embodiments, an attempt may be made to use subarrays to do all processing in place, if possible. Chunks (array blocks) may be aligned to cache line boundaries to reduce cache conflicts.

Reduction Operation Analysis

Regarding reduction operation analysis, discussed briefly above, in some embodiments, performing reduction operation analysis of the graphical data flow program may include automatically detecting reduction operations, such as, for example, one or more of: add, multiply, min, max, AND, OR, or XOR operations, among others, and analyzing the detected reduction operations. Note that these operations may be used to collect and merge results from different iterations or iteration blocks, and thus, for example, may also be appropriate for use in merging results from the plurality of second data flow program portions. Further exemplary reduction operations may include first, last, build-array, string-concatenation, or error-merge, among others.

In some embodiments, information specifying a merging or reduction operation for the second data flow program portions may be received, and automatically generating program code implementing a plurality of second data flow program portions may include automatically generating program code implementing the merging or reduction operation. Execution of the plurality of second data flow program portions may produce a plurality of result portions, and a merging or reduction operation (possibly generated automatically, as noted above) may be executed (as part of the data flow program execution) to merge the plurality of result portions into a merged result.

It should be noted that many, if not most, uses of shift registers result in cross-iteration dependences that prevent parallelization. However, many associative (but not necessarily commutative) operations feeding from a left shift register and feeding into the corresponding right shift register are actually reduction operations. Since the order of operations is irrelevant, each processing structure may locally accumulate its value and the parallel FOR loop can join (i.e., reduce) each of these values into a single scalar using the same reduction operation. In one embodiment, the following basic reduction operations may be supported: add, increment, multiply, max, min, AND, OR, XOR, first, last, build-array, string-concatenation, or error-merge, among others.

In one embodiment, the above analyses may be performed by a separate tool, e.g., a standalone software program or tool, that may be used or invoked by or from within a development environment, or independent from such an environment. The tool may be configured to analyze the data flow program and to determine parallelizable loops in the data flow program. Further details regarding embodiments of such a tool are provided below.

There are various ways in which the plurality of second data flow program portions may be implemented. For example, in one embodiment, automatically generating program code implementing the plurality of second data flow program portions may include generating the plurality of second data flow program portions, and generating program code that is executable to perform index set splitting to partition the iterations of the first data flow program portion into respective index blocks for respective execution by the second data flow program portions concurrently. The generated program code may also be executable to use the iteration partitions to divide any input data into respective data portions for respective use by the second data flow program portions, execute at least a subset of the plurality of second data flow program portions using the respective data portions as input, and merge any respective sets of results from execution of the second data flow program portions into a merged set of results for further use by the data flow program. Note that the merged set of results is preferably functionally equivalent to results which would have been produced by the first data flow program portion.

Wrappers

The above-described implementation that makes copies of the FOR loop, where each copy performs a distinct subset of the original loop iterations may entail substantial compilation time, since there is more code to analyze in later compilation stages, and increases the size of the generated code. For large numbers of "generated parallel loop instances", the compilation time is significant. Additionally, the parallelism is limited to the number of loop copies generated at compilation time, and so users can not increase the parallelism without recompiling. This may cause users to specify large numbers of "generated parallel loop instances", e.g., workers or second data flow program portions; however, having unused loop copies causes unnecessary compile and runtime overhead. Note that even though the extra loop copies execute zero iterations, there may still be some overhead from computing the number of iterations to perform and producing default outputs.

Thus, in some embodiments, automatically generating program code implementing a plurality of second data flow program portions may comprise including a modified version of the first data flow program portion in a wrapper invocable by multiple callers for concurrent execution, thereby implementing the plurality of second data flow program portions, e.g., via reentrant invocation of the same function. The wrapper may be invocable to execute the modified version of the first data flow program portion with one or more parameters specifying the respective one or more iterations to be executed by the second data flow program portion. Moreover, to implement the plurality of second data flow program portions executing the respective one or more iterations concurrently, a number of invocations of the wrapper to make for concurrent execution of the second data flow program portions may be determined, the wrapper may be invoked the determined number of times with respective values for the one or more parameters to execute the respective one or more iterations concurrently. It should be noted that in various embodiments, the number of invocations to make may be determined at compile time (static) or at runtime (dynamic), as desired.

In another embodiment, automatically generating program code implementing a plurality of second data flow program portions may include determining a number of modified versions of the first data flow program portion to generate for concurrent execution of the second data flow program portions, and generating a plurality of modified versions of the first data flow program portion for concurrent execution based on the determined number, thereby implementing the plurality of second data flow program portions, where, as noted above, each second data flow program portion may be configured with one or more parameters specifying the respective one or more iterations to be executed by the second data flow program portion. Thus, implementation the plurality of second data flow program portions executing the respective one or more iterations concurrently may include executing the plurality of second data flow program portions with respective values for the one or more parameters to execute the respective one or more iterations concurrently.

Thus, with dynamic allocation of instances (refer to this document), the number of instances requested at runtime are allocated dynamically, i.e., at runtime. The user is thus no longer required to specify a limit on the amount of parallelism available. This approach may be implemented by asynchronously calling the reentrant wrapper (e.g., subVI) in a loop that executes P iterations, passing in the appropriate inputs to each call to specify which subset of the iterations to execute. The wrapper may then place its results into queues (or some other data structure), and the calling code may reconstruct the results from each wrapper.

FIGS. 18A-18D—Exemplary Wrapper for Static Allocation

FIGS. 18A-18D illustrate use of an exemplary wrapper for implementing static allocation of workers, i.e., instances of the second data flow program portions. More specifically, these figures are directed to a graphical implementation where the wrapper is a subVI, e.g., a graphical subprogram that is callable by a graphical program (VI).

Figure 18A:
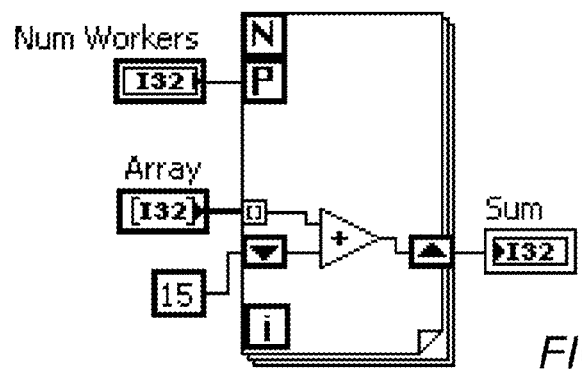
FIGS. 18A-18D illustrate use of an exemplary wrapper for implementing static allocation of workers, according to one embodiment.

FIG. 18A illustrates an original graphical program (VI) that includes a FOR loop, in this case, a parallel FOR loop, i.e., a FOR loop specified for parallelism. As may be seen, this loop iterates some specified number of times, adding the value of each element from an input array to an initial value of 15, and outputting the sum. As also shown, the number of instances or workers to implement may be wired into the [P] border node (described below).

Figure 18B:
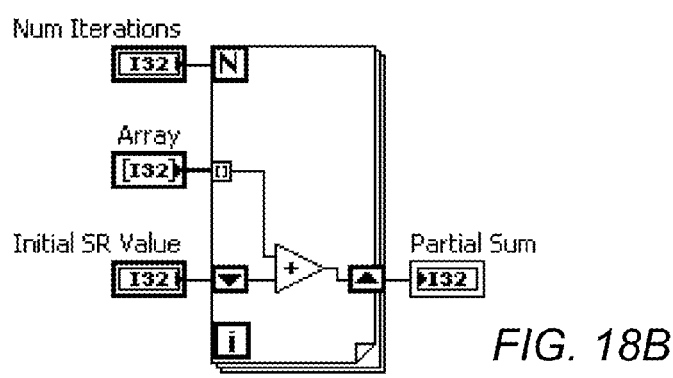

FIG. 18B illustrates exemplary graphical program code for a worker, i.e., a corresponding second data flow program portion, e.g., a sub-FOR loop. As FIG. 18B shows, the worker code is similar to the original FOR loop, but allows specification of a portion of the iterations to process, and generates a partial sum as output, which may then be merged with results from other wrapper invocations. Note that SR stands for "shift-register", where shift registers are denoted in the diagram by the up down arrow border nodes. When the FOR loop of FIG. 18B is wrapped, e.g., in a subVI, the value 15 will be passed in as the "initial shift-register value" on the first wrapper invocation, and the value 0 is passed on subsequent invocations. The shift-register will then accumulate the value from the array's auto-indexed element each iteration, producing a sum of all array values (plus the initial value 15) once the loop has completed all iterations.

Figure 18C:
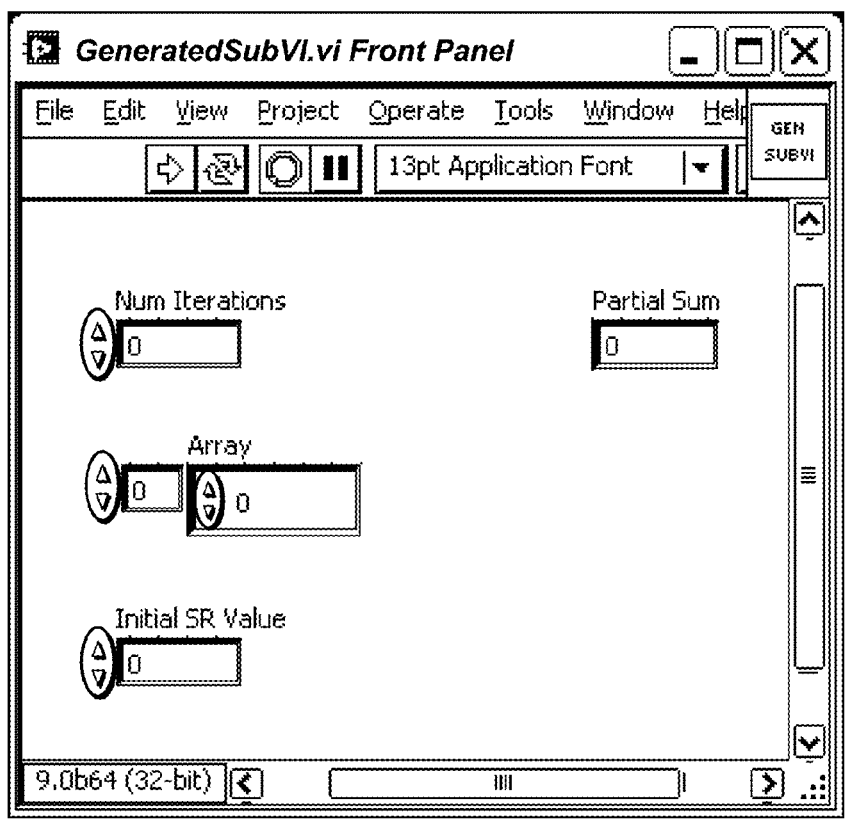

FIG. 18C illustrates a graphical user interface (GUI), specifically, a front panel, for the worker code of FIG. 18B, that includes fields for the number of iterations, the input array, the initial SR value, and the partial sum (output). Thus, the input parameters for the worker may be specified via this GUI, and the output may be displayed. It should be noted, however, that in some embodiments, each worker may not, in fact, have such a GUI.

Figure 18D:
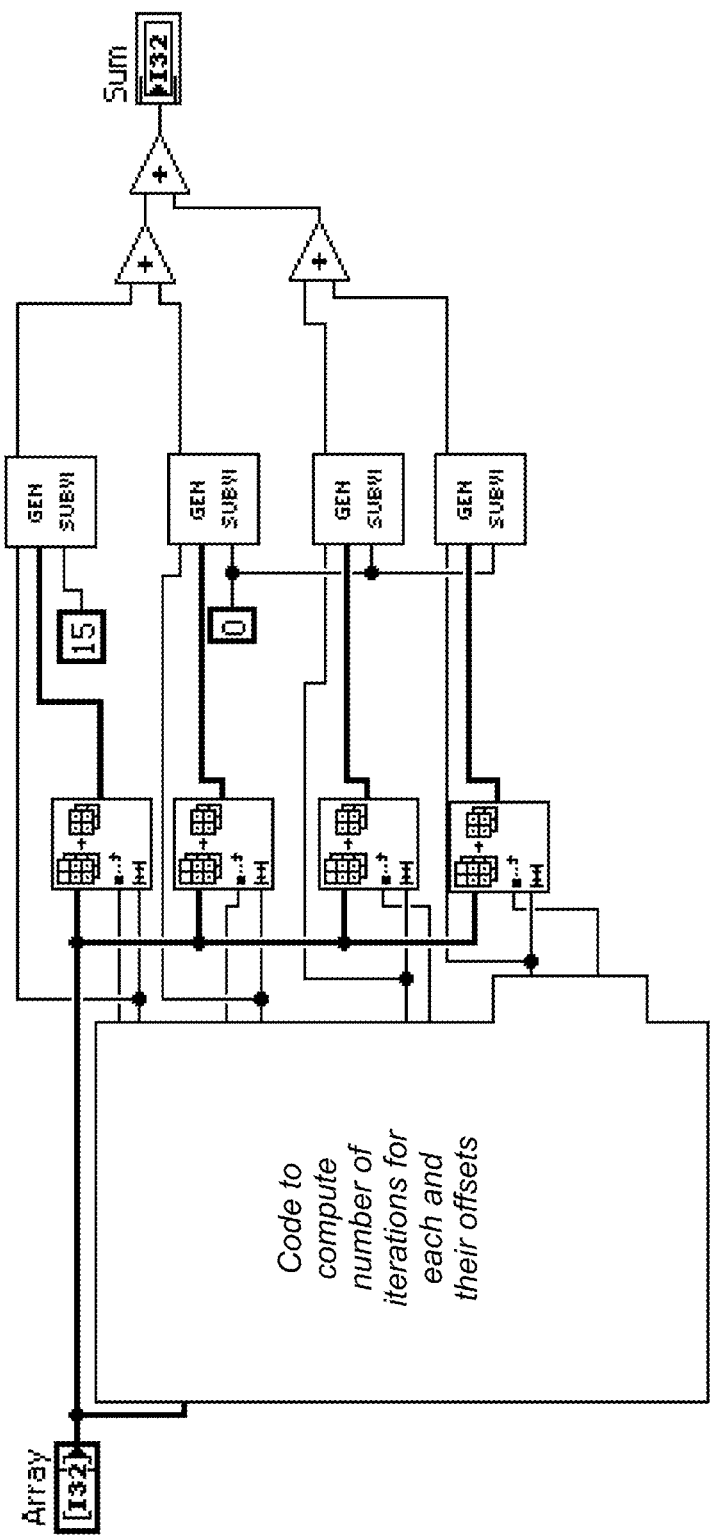

FIG. 18D illustrates an exemplary implementation of the parallelized version of the FOR loop of FIG. 18A using the generated worker code of FIG. 18B with wrappers (in this case, subVIs). As shown, code to compute the number of iterations and the index offset for each worker may generate sub arrays from the input array accordingly, and each sub array may be passed as input to a corresponding wrapper that includes respective worker code (FIG. 18B), where each wrapper is labeled "GEN SUBVI". Note that code is also provided or generated to receive the outputs from each wrapper and generate the final resulting sum, denoted "Sum".

Note that while in the example of FIGS. 18A-18D allocation of the instances is static, in other embodiments, the determination and allocation of the instances may be dynamic, e.g., may be made at runtime.

Index Splitting

In general, automatically generating program code implementing the plurality of second data flow program portions includes generating some sort of infrastructure that facilitates parallel execution of blocks of iterations, and partitioning these iterations into blocks for such concurrent execution. For example in one embodiment, automatically generating program code implementing the plurality of second data flow program portions may include applying an index set splitting transform. Such a transform may take a traditional serial for loop and logically split the iterations (index set) into blocks to be scheduled out to multiple processing elements in parallel. The transform may operate to safely split auto-indexed input arrays (ideally inplace) and branch input variables before each of the workers (second data flow program portions), as well as join output arrays, resolve output variables, and create a synchronization barrier after the worker loops to ensure that all iterations complete before moving on. Note that values can be joined at the end of the loop using a reduction operation (+, −, *, max, min, first, last, err, etc.). Note that the result of a reduction can also be an array or cluster of values. In some embodiments, auto-indexed arrays can be "auto-chunked" into/out-of the structure, splitting an array into a block (sub-array) for each block of iterations and merging the blocks in order upon completion.

Note that this transform may be beneficial only for sizable computations (since it must overcome splitting overhead), and may be subject to the requirement that there must be no cross-iteration (loop-carried) dependences. Note further that this transform may only be applied after a successful dependence analysis, i.e., after the first data flow program portion has been shown to be parallelizeable.

Parallel Loop Analyzer

In various embodiments, any of the techniques and functionalities disclosed herein may be implemented as part of a development environment. However, as mentioned above, in some embodiments, the above analyses (and any other functionalities disclosed herein) may be performed by a separate tool, e.g., a standalone software program or tool, that may be used or invoked by or from within a development environment, or independent from such an environment. For example, in one embodiment, the tool may be provided by, or even executed on, a server. In one embodiment, the tool's functionality may be implemented as an API (application programming interface), which may be utilized or otherwise invoked or called by a GUI, e.g., of the separate tool, or, in other embodiments, of the development environment, or even another program. More generally, while in some embodiments, the tool may be specifically directed to analyzing data flow programs to determine whether they can be parallelized, in various embodiments, the tool may be further executable to perform any of the various techniques and functionalities disclosed herein.

Thus, in one embodiment of the method of FIG. 7, the method may include storing a data flow program that includes one or more iterative data flow program portions, and automatically analyzing the data flow program, including performing dependence analysis for each of the one or more iterative data flow program portions, thereby determining whether each of the one or more iterative data flow program portions is parallelizable. More generally, any of the techniques disclosed herein regarding analysis or parallelization of the first data flow program portion discussed with respect to FIG. 7 may be applied to each or any of the one or more iterative data flow program portions.

An indication of each of the one or more iterative data flow program portions that is parallelizable may be stored, where the indications are then useable to parallelize the data flow program. As noted above, in various embodiments, the analysis of the data flow program, embodiments of which are described herein, may be performed by a standalone software tool, performed by a development environment, or invoked under a development environment.

An indication of each of the one or more iterative data flow program portions that is parallelizable may be displayed. For example, in one embodiment, each of the one or more iterative data flow program portions that is parallelizable may be displayed. In some embodiments, each of the one or more iterative data flow program portions that is not parallelizable may be indicated, e.g., program code that prevents parallelization for each of the one or more iterative data flow program portions that is not parallelizable may be indicated.

As discussed above, in some embodiments, user input modifying at least one of the iterative data flow program portions may be received, and the modified at least one of the iterative data flow program portions may be analyzed to determine whether the modified at least one of the iterative data flow program portions is parallelizable. This process may be repeated until the at least one of the iterative data flow program portions is parallelizable, or until it is decided that parallelization is not to be attempted.

In one embodiment, the method may include: for each of the one or more iterative data flow program portions, determining one or more of: an identifier for each of the one or more iterative data flow program portions, a set of induction variables for each of the one or more iterative data flow program portions, a range of the induction variables for each of the one or more iterative data flow program portions, or a nesting level of each of the one or more iterative data flow program portions. Note that, as indicated above, in some embodiments, the data flow program is or includes a graphical data flow program that includes a plurality of interconnected nodes that visually indicate functionality of the data flow program. Thus, the one or more iterative data flow program portions may be graphical iterative structures or elements, e.g., graphical FOR loops.

As described above with respect to the method of FIG. 7, in some embodiments, the method may include parallelizing the data flow program, including parallelizing each of at least a subset of the one or more iterative data flow program portions that is parallelizable. Moreover, in some embodiments, parallelizing the data flow program may include generating a data flow intermediate representation of the data flow program, and parallelizing the data flow intermediate representation of the data flow program.

Note that the techniques described herein may not only be applied to a single data flow program portion, or to a plurality of such program portions, but may also be applied to multiple programs. In other words, in some embodiments, the above storing a data flow program, automatically analyzing, and storing an indication, may be performed for each of a plurality of data flow programs, e.g., the plurality of data flow programs may be included in a project or program hierarchy. The method may include receiving input indicating the project or program hierarchy, and the performing the storing a data flow program, automatically analyzing, and storing an indication for each of the plurality of data flow programs may be performed in response to the input indicating the project or program hierarchy.

In some embodiments, various of the techniques or method elements disclosed herein may be invoked or performed via a graphical user interface (GUI), e.g., of the program development environment, or of the separate tool, mentioned above. The following presents various exemplary embodiments of such a GUI, and is particularly directed to a user-level tool that analyzes graphical program, e.g., VIs, to find FOR loops that can be safely parallelized. In some embodiments, the tool displays the parallelizable loops to users, allowing them to easily find and enable parallelism on loops. Note that while the embodiments described are presented in terms of LabVIEW VIs (Virtual Instruments), e.g., LabVIEW graphical programs, the techniques disclosed are broadly applicable to other types of graphical programs, as well. Note further that the embodiments described and illustrated are exemplary only, and are not intended to limit the GUI or tool to any particular form, function, or appearance.

Simple GUI

Figure 19A:
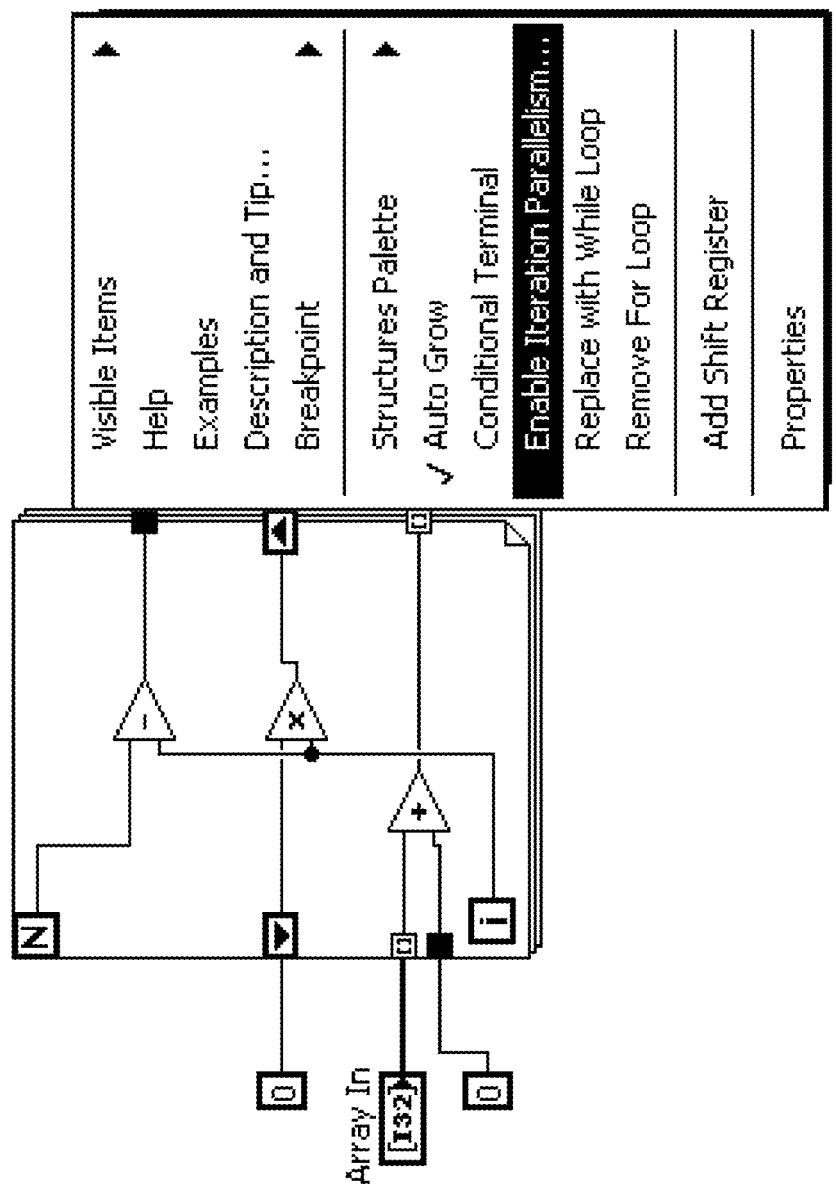
FIGS. 19A and 19B illustrate an exemplary simple GUI for specifying or determining whether parallelism is to be considered for a graphical program loop, according to one embodiment.
Figure 19B:
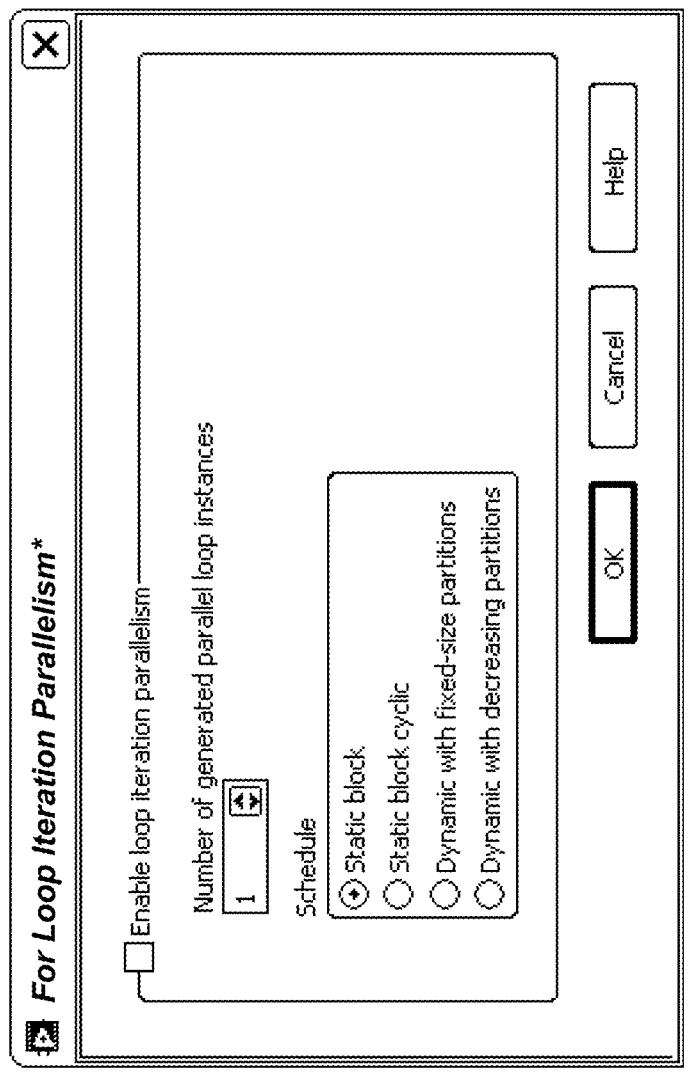

FIGS. 19A and 19B illustrate an exemplary simple GUI for specifying or determining whether parallelism is to be considered for a graphical program loop. In this embodiment, a user may "right-click" on a FOR loop in a graphical program to invoke a menu whereby the user may specify whether to enable parallelism for the loop, as indicated in FIG. 19A.

In response to enabling the parallelism for the loop, a FOR loop iteration parallelism configuration dialog may be displayed, whereby the user may configure the parallelism desired, as indicated by FIG. 19B. An embodiment of this dialog may allow the user to configure the parallel FOR loop via one or more of the following options:

1) Enable Loop Iteration Parallelism: Specifies that parallelism is to be applied to the FOR loop, if possible.

2) Parallel Scheduling Strategy: Allows the user to specify a scheduling strategy, such as blocked, blocked cyclic, dynamic self-scheduled, or guided self-scheduled, among others.

3) Number of Generated Parallel Loop Instances: Specifies the number of workers (i.e., processing structures) to allocate at compile time (e.g., subject to a static upper bound).

More Complex GUIs

In other embodiments, the GUI (tool interface) may be more complex. FIGS. 20A-20G are directed to exemplary GUIs for specifying and controlling parallel FOR loops and their analysis. In one embodiment, the tool may be configured to automatically detect FOR loops that can be safely parallelized. For example, the tool may analyze all of the FOR loops in a current hierarchy or project to determine which can be parallelized. For each loop in a graphical program, the results window may list the FOR loops and indicate whether they are safe to parallelize and whether the user has already enabled parallelism on the loops.

Double-clicking on a loop in the list may open the graphical program and highlight the loop. If the loop is parallelizable and the user decides that the loop contains enough work to be worth parallelizing, the user may right-click on the displayed FOR loop and enable iteration parallelism.

In one embodiment, specific functions may be invoked by the user via the GUI. For example, a detector may be invoked from a toolbar (or other GUI means), where, when launched from the toolbar of a project, the detector may analyze all of the graphical programs in the project and their subprograms. Alternatively, when launched from a graphical program (e.g., VI), the detector may analyze the current graphical program and its subprograms.

Figure 20A:
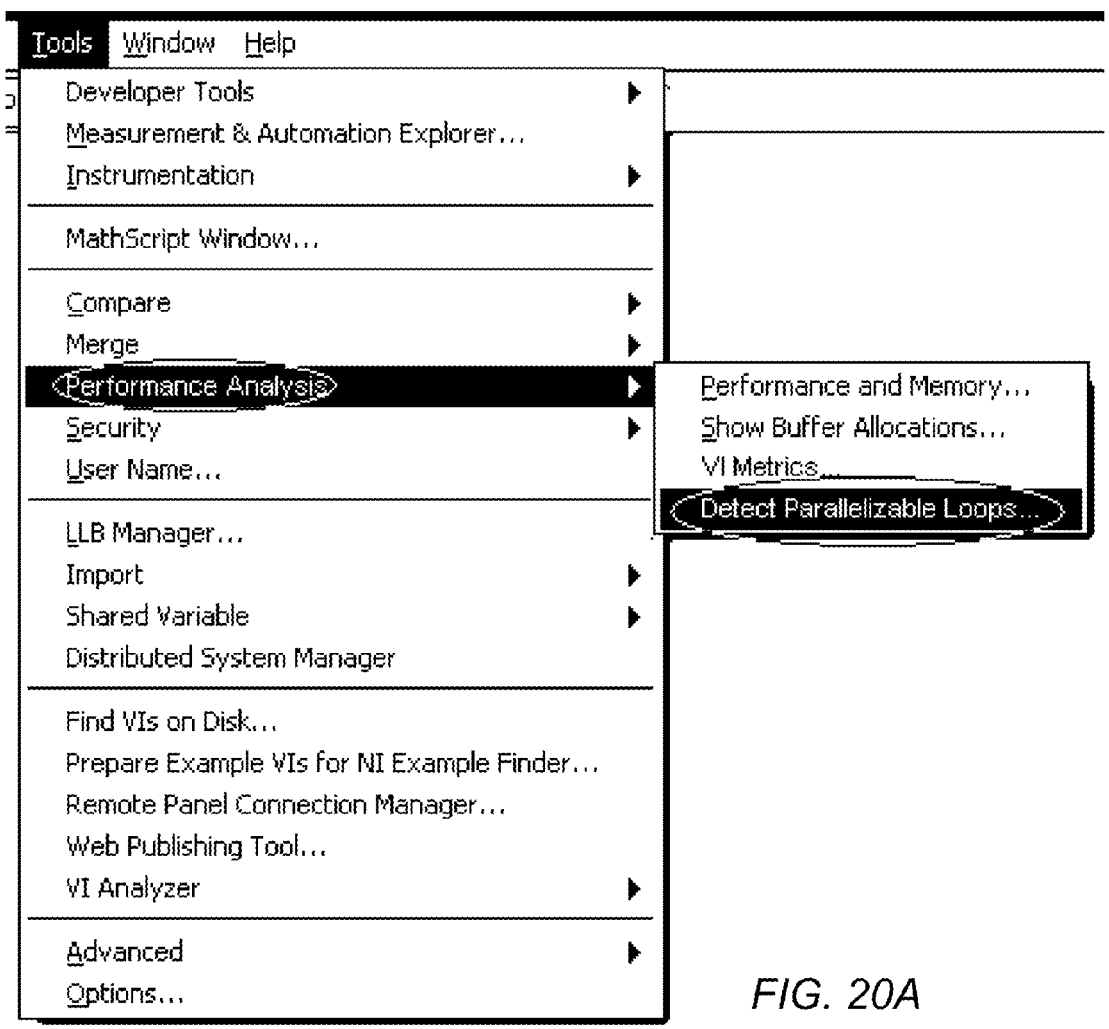
FIGS. 20A-20G illustrate exemplary graphical user interfaces (GUIs) for parallelizing iterative data flow programs, according to various embodiments.
Figure 20B:
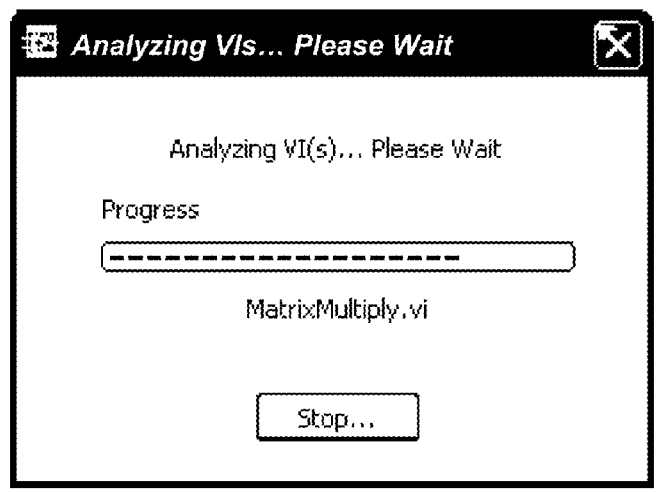

FIG. 20A illustrates one embodiment of a GUI whereby the user may invoke the detector. As may be seen, in this exemplary GUI, the invocation may be made via a "Detect Parallelizable Loops" menu item, which is under a "Performance Analysis" submenu under a more general "Tools" menu on the toolbar. In one embodiment, when the detector is selected from the menu, a progress window may be displayed showing the percent of graphical programs that have been analyzed. The user may stop the analysis from the progress window, and the results window may display the information collected thus far. When the detector is chosen from a project, the progress of loading the graphical programs into memory may be displayed first. FIG. 20B illustrates one embodiment of such a progress indicator.

Figure 20C:
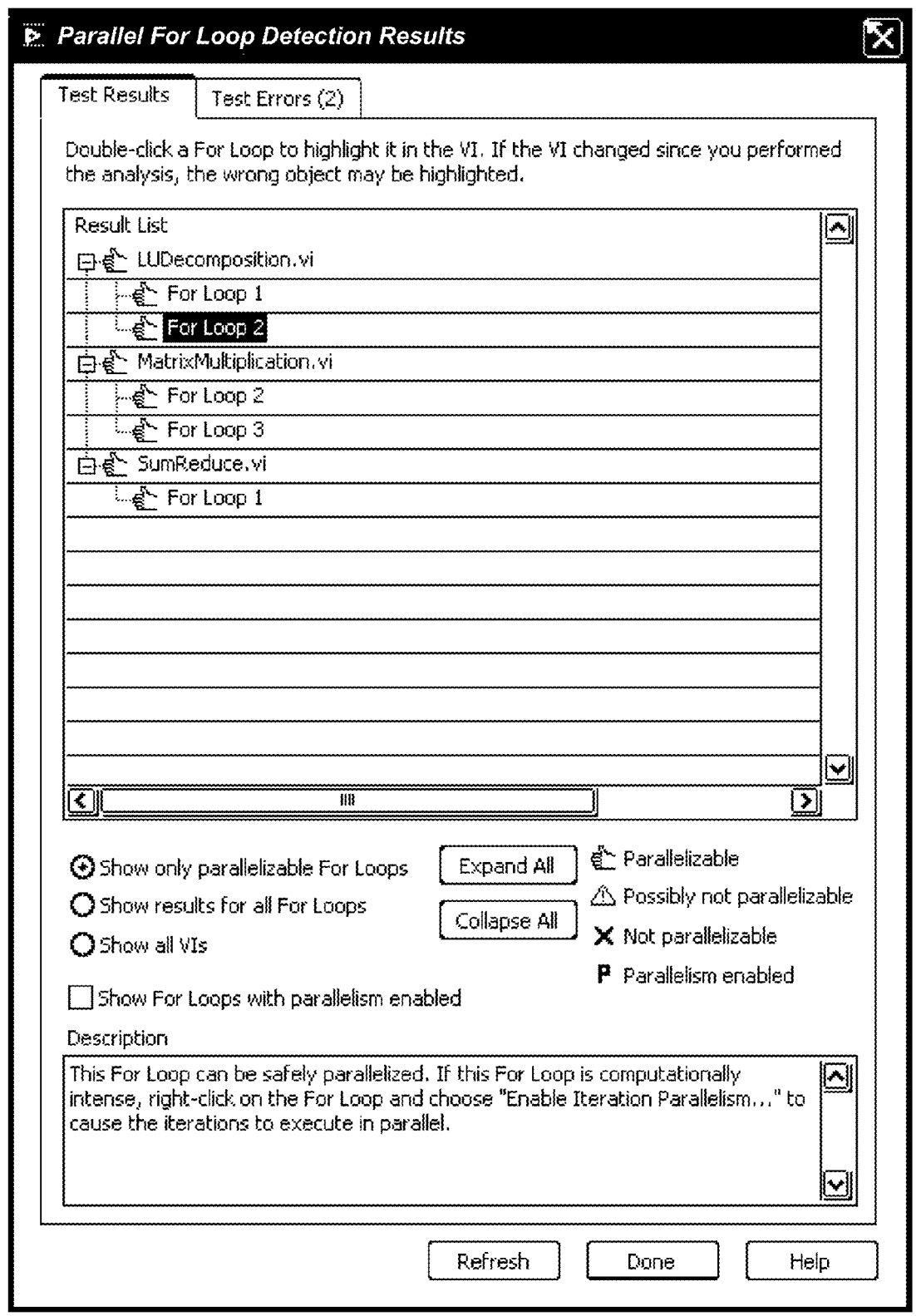

When the analysis is complete, a results window may list the FOR loops that can safely be parallelized. FIG. 20C illustrates one embodiment of an exemplary results window that displays FOR loops for each of a plurality of VIs (graphical programs).

In one embodiment, the user may double-click on a FOR loop in the list to open the graphical program and highlight the loop. For example, the user may right-click on the loop and select "Configure Iteration Parallelism . . . " (or equivalent) to enable parallelism. Note that because it may be desirable for users to consider whether each loop is worth parallelizing, in some embodiments, enabling parallelism on loops may not be invoked from this window; there is overhead associated with the parallelism, and on loops with little computation, enabling parallelism can degrade performance. It would be undesirable for users to enable parallelism on all of their loops at once and then feel cheated if their application slows down.

In one embodiment, the results window may only reflect changes made to the loops when a "Refresh" button is clicked, which may invoke the analysis again and repopulate the results window.

In this embodiment, a glyph next to each FOR loop represents whether it is safe to parallelize, where "Safe for parallelism" is represented with a "thumbs up" icon, warnings are represented with a (yellow) caution symbol, and errors are represented with an (red) x. If the loop already has parallelism enabled, there a (green) P is displayed on the glyph. Note that the glyphs shown are exemplary only, and that any other glyphs, icons, labels, or symbols may be used as desired, e.g., including, for example, "transparent" icons. Such glyphs may be referred to more generally as parallel FOR loop indicators, and are described in more detail below.

In this example, the symbol next to the graphical program indicates the most "promising" result of all loops inside the graphical program. The following is an exemplary order of denotations or parallelizability, ranked from most to least reliable.

1. Safely Parallelizable.
2. Already Parallelized.
3. May Be Safely Parallelizable (has warning).
4. Already Parallelized with Warnings.
5. Not Safely Parallelizable (has errors).
6. Already Parallelized with Errors.

The loops may be listed with their labels. Most loops may have the default "For Loop" label. The loops may be labeled (numbered) with the default label to help users distinguish the loops ("For Loop #"), but the numbers may be somewhat arbitrary. It may be confusing to users if the numbers/labels changed when the results were refreshed, and so the assigned label may be fixed.

In one embodiment, the results window may display the graphical program name, and a "tip strip" may display the graphical program's full path. In one embodiment, the graphical programs may be primarily sorted by graphical program name and secondarily sorted by path.

Figure 20D:
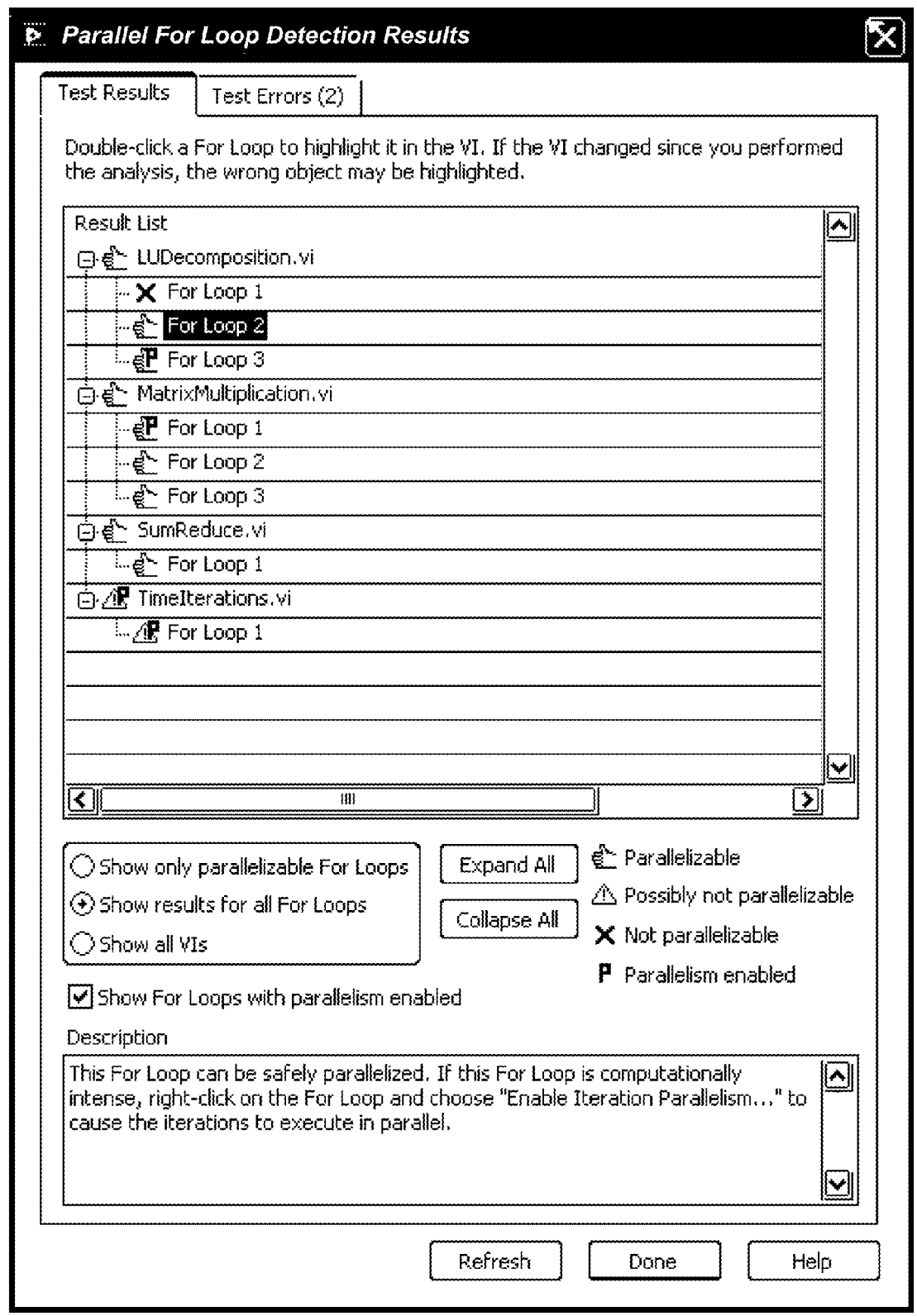

As may be seen in FIG. 20D, a "description" box may be presented (see bottom of GUI) wherein the results for the selected FOR loop may be explained. The description box may explain how to enable parallelism, state that the loop is already parallelized, or list the potential errors and warnings, among other information.

Figure 20E:
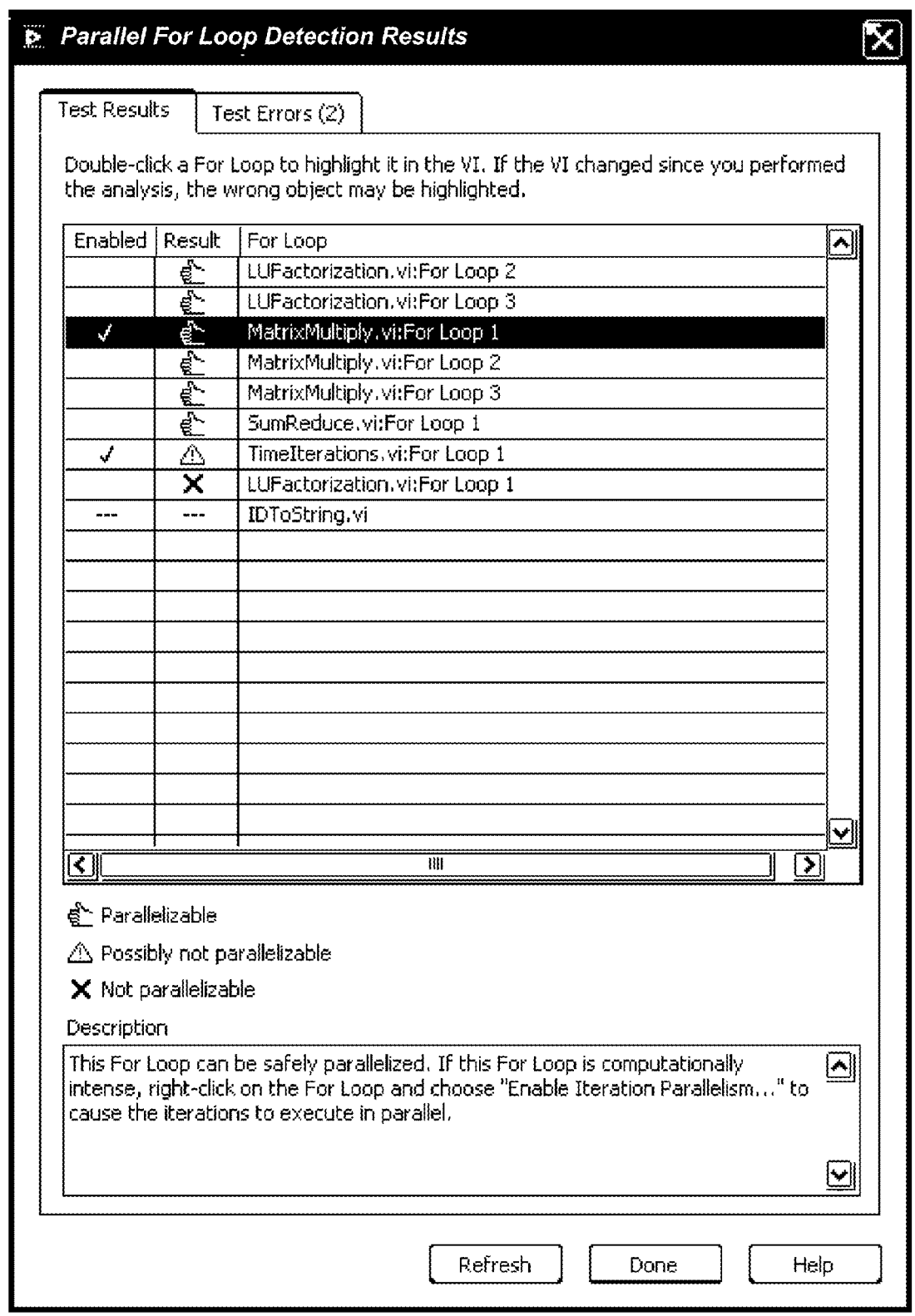

As illustrated in FIG. 20E, in one embodiment, the results window may be simplified by using a list box that the user can sort. The user may be allowed to focus on different types of loops by sorting the results. In one embodiment, the icons may invert their colors if selected, or only the FOR loop column may be shown as selected.

Figure 20F:
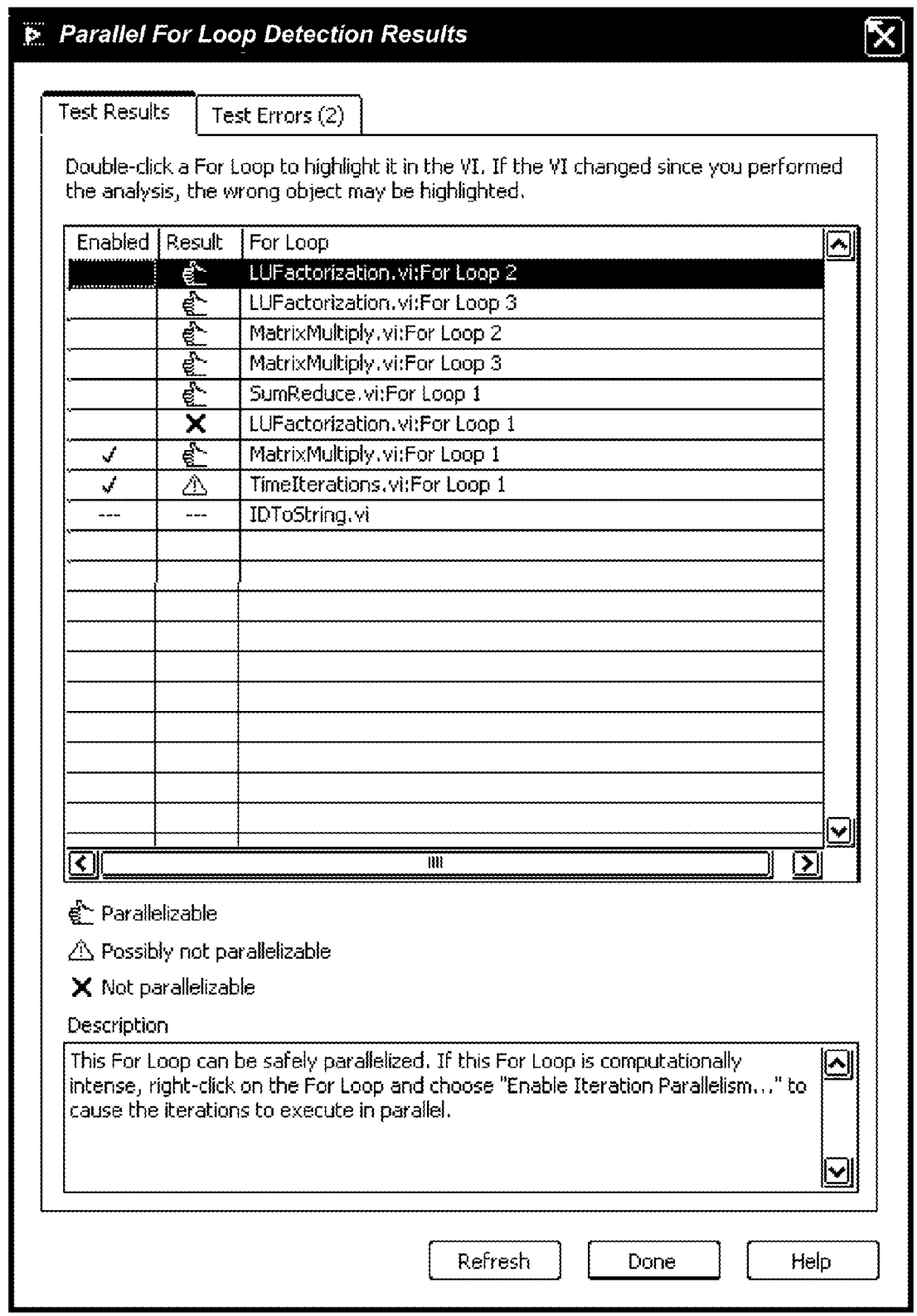

By default, the columns may be sorted by result first, then by graphical program name, and then by whether parallelism has already been enabled. With this sort, users can easily view all of the FOR loops that can be parallelized. If users do not want to look at the loops they have already parallelized, they may click the top of the "Enabled" column to put the already parallelized loops at the bottom, as illustrated in FIG. 20F.

If users want to examine particular graphical programs, they may sort by the graphical program name primarily (not shown).

Figure 20G:
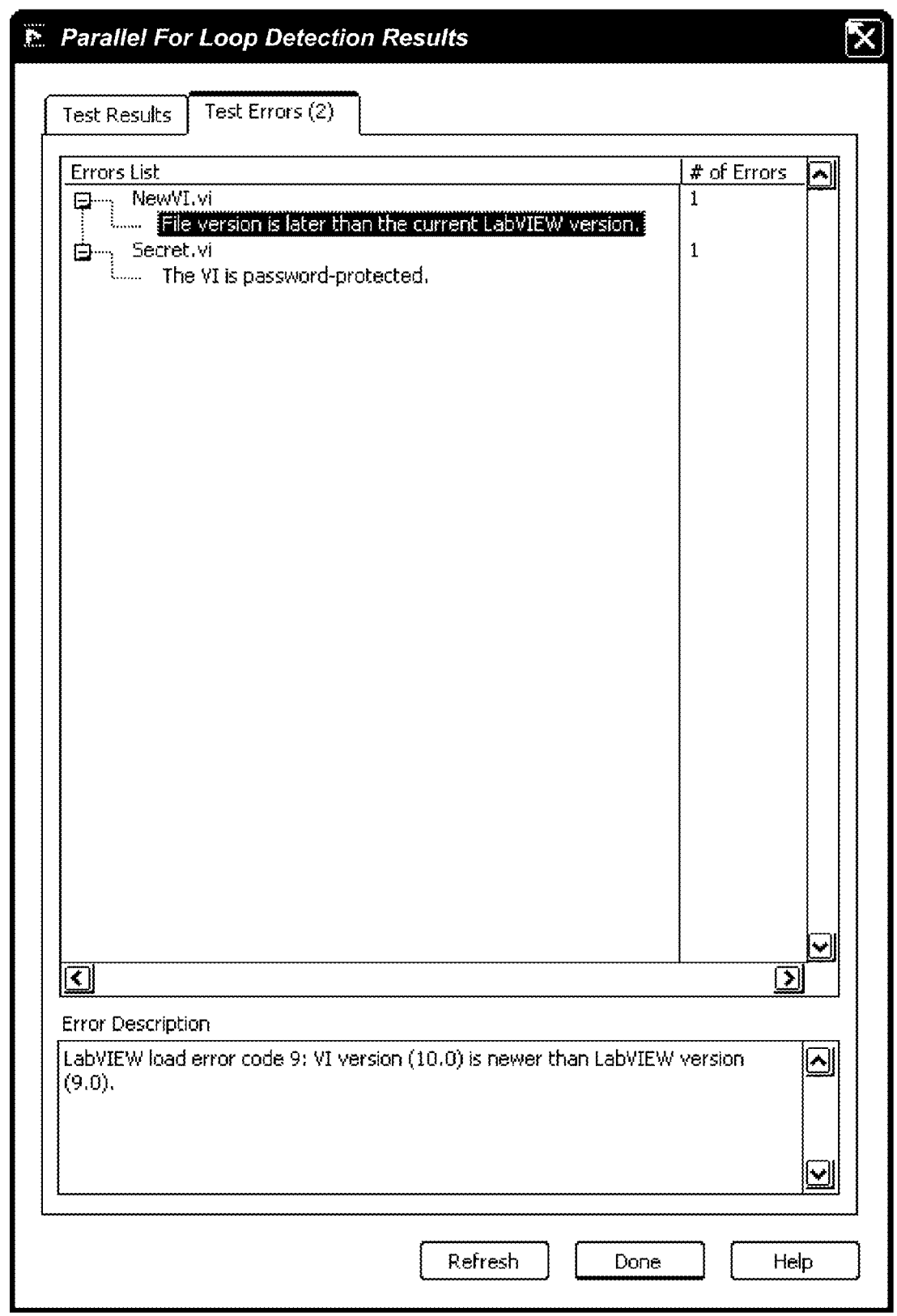

As shown in FIG. 20G, a "Test Errors" tab of the results window may list any errors encountered during the analysis (e.g., "not able to load VI", "the VI is password protected", etc.). As Figure G also shows, an error description box may be provided that explains the errors, e.g., in response to user selection of an error. Of course, in other embodiments, errors may be displayed in any manner desired.

Figure 21:
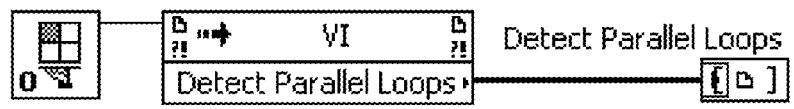
FIG. 21 illustrates a simple graphical parallel loop detection function that does not support errors or warnings, according to one embodiment.

In one embodiment, a simple parallel loop detection function (or function node) may simply return a list of parallelizable loops. FIG. 21 shows an exemplary call to such a function. Note, however, that this simple function (node) does not support errors or warnings.

Figure 22:
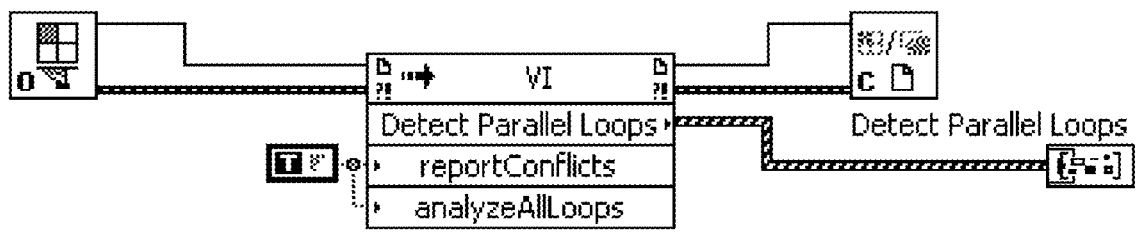
FIG. 22 illustrates a more complex graphical parallel loop detection function that supports errors and warnings, according to one embodiment.

In another embodiment, a more complex parallel loop detection function (or function node) may be provided that returns all FOR loops with their parallelization errors and warning, as illustrated in FIG. 22. Note that in this exemplary embodiment, the function takes two Booleans as input: a "report conflicts" input that specifies whether the function should find the reasons that a loop cannot be parallelized instead of simply saying that it cannot; and an "analyze all loops" input that specifies whether the analysis should visit all loops or just visit the loops where parallelism has been enabled by the user. In some embodiments, the tool or GUI may set both inputs to true, e.g., by default.

Figure 23:
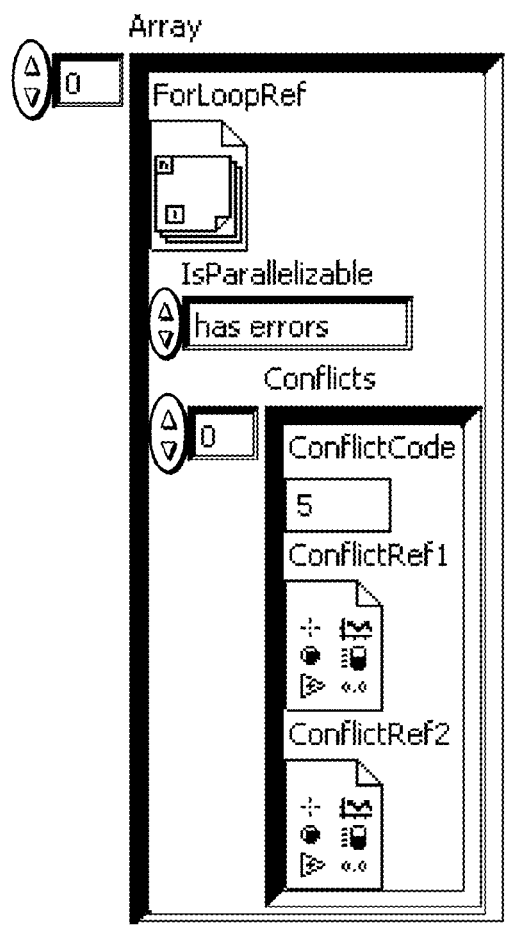
FIG. 23 illustrates exemplary output from the function of FIG. 22, according to one embodiment.

The output of this more complex function may be an array of clusters. As indicated in FIG. 23, the output may be presented via an indicator or GUI element that identifies each FOR loop, its conflicts, if any, and/or whether the loop is safely parallelizable, e.g., via an enum that contains "invalid", "parallelizable", "has warnings", and "has errors". An enum may similarly be defined for conflicts.

In one embodiment, the tool/GUI may provide the following functionality:

A. Preparation for Analysis
1) Get the paths of all graphical programs in the hierarchy.
2) From a project, traverse the list of graphical programs.
3) Avoid analyzing a graphical program more than once if it appears in multiple hierarchies of a project.

B. Analysis Engine (Progress Window)
1) Collect errors and pass them to the results window.
2) If a graphical program is broken, the detector function may mark all loops it cannot analyze with "has errors". The results window may explain in the description box that these loops could not be analyzed.
3) Update the progress window after the analysis of each graphical program.
4) Monitor the Stop button during the analysis.

C. Results Window
1) Hide the list and show a dummy list while populating the results. Defer panel updates while the list is populating.
2) Store a mapping from item tag in the tree to FOR loop Reference to know which FOR loop is selected in the list tree.
3) Call a helper program to highlight a FOR loop.
4) Close references when the window is closed.

Graphical Indicator

As discussed above, in some embodiments, a graphical indicator may be used to indicate whether a specified portion of the graphical data flow program, such as the first data flow program portion described above, is to be (attempted to be) parallelized. For example, in some embodiments of the method described above with respect to FIG. 7, e.g., in which the data flow program is a graphical data flow program, the graphical data flow program may be displayed in response to user input, where the graphical data flow program may include a graphical indicator that specifies to a compiler that the compiler is to attempt to automatically generate data flow program code that parallelizes a specified portion of the graphical data flow program for concurrent execution, e.g., the first portion of the graphical data flow program.

In one embodiment, the specified portion of the graphical data flow program is or includes an iterative graphical program element configured to iteratively execute associated graphical data flow program code, e.g., a FOR loop. For example, the iterative graphical program element may be or include a graphical loop structure with an interior, where the associated data flow program code is contained in the interior of the iterative graphical program element. A FOR loop that includes or is coupled to such a graphical indicator may be referred to as a parallel FOR loop, because it is slated for parallelization. In some embodiments, the iterative graphical program element, e.g., FOR loop, may include the graphical indicator. In other words, the graphical indicator may be attached to, or part of, the iterative graphical program element. For example, the graphical indicator may be or include a configurable graphical element on the iterative graphical program element.

Embodiments of such a graphical indicator are illustrated in FIGS. 8A, 8B, 15, and 18A, where the indicator is implemented as a "P" border node or terminal on the graphical FOR loop in each block diagram. The graphical indicator, which may be denoted as [P], may visually show the user when they (or perhaps the automatic parallelization analysis) have selected a loop to attempt to parallelize. The dependence/reduction operation analysis may then be performed at edit-time on all loops marked with this indicator, and errors/warnings reported if necessary. In one embodiment, if the analysis passes, e.g., if no errors or warnings preventing parallelization are discovered, then parallelization may proceed. The compiler may then transform any loops marked as parallel (since they must have passed the analysis for compilation to be allowed) and generate the appropriate parallel code, possibly in response to user input invoking the compilation.

In various embodiments, the configurable graphical element on the iterative graphical program element may indicate that parallelization is to be attempted via any of various characteristics, e.g., color, shape, or label, among others. Note that in some embodiments, the graphical indicator may not be displayed (or possibly even included in the program) when the loop is not marked for parallelization.

In one embodiment, the graphical indicator may include an appearance of the iterative graphical program element that indicates parallelization of the specified portion of the graphical data flow program is to be attempted. For example, the appearance of the iterative graphical program element that indicates parallelization of the specified portion of the graphical data flow program is to be attempted may include one or more of: color of the iterative graphical program element, shape of the iterative graphical program element, line style of the iterative graphical program element, or labeling of the iterative graphical program element, among others. Thus, a user may be able to determine whether parallelization is to be attempted based solely on the appearance of the graphical loop structure.

As indicated above, in other embodiments, the graphical indicator may be separate from, but coupled to, the iterative graphical program element. For example, the graphical indicator may be or include a node or terminal that is wired to the iterative graphical program element.

In some embodiments where the graphical indicator is configurable, the graphical indicator may be configurable to indicate whether or not parallelization of the specified portion of the graphical data flow program is to be attempted. Thus, a user (or software) may specify whether or not parallelization of the specified portion is to be attempted. If the program portion has already been determined to be parallelizable, configuring the indicator to specify that parallelization is not to be attempted may thus prevent the compiler from parallelizing the program portion. If the analysis has not yet been performed, configuring the indicator to specify an attempt to parallelize may specify or invoke the analysis to be performed.

The graphical indicator may thus be configured to receive input specifying whether or not parallelization is to be attempted, e.g., input from a user or from an analysis process or tool. Moreover, in some embodiments, an appearance of the graphical indicator may be modified in accordance with the input. Similarly, in one embodiment, if the specified portion of the graphical data flow program is determined to not be parallelizable, the appearance of the graphical indicator may be modified to indicate that the specified portion of the graphical data flow program is not parallelizable. In some embodiments, the graphical data flow program may be displayed in a graphical program development environment configured to receive such input specifying whether or not parallelism is to be attempted, and the appearance of the graphical indicator may be modified in accordance with the input, where, as noted above, the input may be user input, or may be received from a loop analyzer tool (whether separate, or included in the development environment) configured to determine whether or not the specified portion of the graphical data flow program is parallelizable.

As mentioned above, if the specified portion of the graphical data flow program is determined to not be parallelizable, or a warning condition is detected, one or more errors regarding why the specified portion of the graphical data flow program is not parallelizable, or one or more warnings regarding parallelization of the specified portion of the graphical data flow program, may be presented. For example, a description of the one or more errors or one or more warnings may be displayed, offending program code may be highlighted or shaded, suggested modifications to the data flow program may be displayed, or the appearance of the graphical indicator may be changed. The one or more errors or one or more warnings may be received from a loop analyzer tool in response to the loop analyzer tool analyzing the graphical data flow program. Various embodiments of such a tool are described above. Note that the generation or display of such errors and warnings may or may not be associated with the graphical indicator.

Thus, a graphical indicator may be used to indicate and/or specify whether or not to attempt parallelization of an iterative program element in a graphical data flow program.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer accessible memory medium that stores program instructions executable by a processor to:
   store a data flow program, wherein the data flow program comprises one or more iterative data flow program portions, wherein each iterative data flow program portion comprises data flow program code configured to execute repeatedly in an iterative manner;
   automatically analyze the data flow program, including performing dependence analysis for each of the one or more iterative data flow program portions, thereby determining whether each of the one or more iterative data flow program portions is parallelizable, wherein said performing dependence analysis comprises determining whether output from a first subset or iteration of data flow program code of the iterative data flow program portion is required by a second subset or iteration of the data flow program code of the iterative data flow program portion; and
   store an indication of each of the one or more iterative data flow program portions that is parallelizable, wherein the indications are useable to parallelize the data flow program.

2. The non-transitory computer accessible memory medium of claim 1, wherein to automatically analyze the data flow program, the program instructions are executable to determine that at least one of the one or more iterative data flow program portions cannot be parallelized as specified, wherein the program instructions are further executable to:
   indicate one or more errors preventing parallelization or one or more warnings regarding parallelization.

3. The non-transitory computer accessible memory medium of claim 2, wherein to indicate one or more errors preventing parallelization or one or more warnings regarding parallelization, the program instructions are further executable to:
   indicate data flow program code that caused the determined errors or warnings.

4. The non-transitory computer accessible memory medium of claim 3, wherein the program instructions are further executable to:
   receive user input selecting at least one error of the one or more errors or at least one warning of the one or more warnings;
   wherein the data flow program code is indicated in response to the user input selecting at least one error of the one or more errors or at least one warning of the one or more warnings.

5. The non-transitory computer accessible memory medium of claim 2, wherein the program instructions are further executable to:

receive user input modifying the data flow program code in response to the one or more errors preventing parallelization or one or more warnings regarding parallelization.

6. The non-transitory computer accessible memory medium of claim 1, wherein to automatically analyze the data flow program, the program instructions are further executable to:
automatically determine any side effects of the data flow program comprised in the one or more iterative data flow program portions.

7. The non-transitory computer accessible memory medium of claim 1, wherein to automatically analyze the data flow program, the program instructions are executable to automatically perform reduction operation analysis of the one or more iterative data flow program portions.

8. The non-transitory computer accessible memory medium of claim 1, wherein to perform dependence analysis, the program instructions are further executable to:
detect cross-iteration dependences that would prevent parallelization.

9. The non-transitory computer accessible memory medium of claim 8, wherein to perform dependence analysis, the program instructions are executable to:
recognize an early termination condition that prevents parallelization.

10. The non-transitory computer accessible memory medium of claim 8, wherein to
perform dependence analysis, the program instructions are executable to:
determine any conflicting array accesses across iterations of the one or more iterative data flow program portions.

11. The non-transitory computer accessible memory medium of claim 10, wherein to determine whether there are any conflicting array accesses across iterations of each of the iterative data flow program portions, the program instructions are executable to:
for each of the one or more iterative data flow program portions:
determine an integer linear programming problem (ILP) that corresponds to each pair of array accesses in the iterative data flow program portion; and
determine whether there is a feasible solution to each ILP, wherein if there is no feasible solution to any of the ILPs, then there are no conflicting array accesses across iterations of the iterative data flow program portion.

12. The non-transitory computer accessible memory medium of claim 10, wherein the data flow program comprises one or more array access operations, wherein to determine any conflicting array accesses across iterations of the one or more iterative data flow program portions, the program instructions are further executable to:
for each array access operation,
determine a source set of operations, comprising the set of operations that define some or all input values for the array access operation; and
determine a destination set of operations, comprising the set of operations that use some or all output values of the array access operation;
wherein to automatically analyze the data flow program, the program instructions are further executable to:
analyze each of the one or more array access operations, including the source set of operations and the destination set of operations for each array access operation.

13. The non-transitory computer accessible memory medium of claim 12, wherein to automatically analyze the data flow program, the program instructions are further executable to:
for each array access operation,
determine a list of one or more read expressions representing a set of array elements from which the array access operation may read; and
determine a list of one or more write expressions representing a set of array elements to which the array access operation may write;
wherein to automatically analyze the data flow program, the program instructions are further executable to:
analyze each of the one or more array access operations, including the one or more read expressions and the one or more write expressions for each array access operation.

14. The non-transitory computer accessible memory medium of claim 1, wherein to automatically analyze the data flow program, the program instructions are further executable to:
generate a data flow intermediate representation of the data flow program; and
analyze the data flow intermediate representation.

15. The non-transitory computer accessible memory medium of claim 1, wherein the program instructions are further executable to:
parallelize the data flow program, including parallelizing each of at least a subset of the one or more iterative data flow program portions that is parallelizable.

16. The non-transitory computer accessible memory medium of claim 15, wherein to parallelize the data flow program, the program instructions are further executable to:
generate a data flow intermediate representation of the data flow program; and
parallelize the data flow intermediate representation of the data flow program.

17. The non-transitory computer accessible memory medium of claim 1, wherein the automatic analysis of the data flow program is performed by a standalone software tool.

18. The computer accessible memory medium of claim 1, wherein the automatic analysis of the data flow program is performed by a development environment.

19. The non-transitory computer accessible memory medium of claim 1, wherein the automatic analysis of the data flow program is invoked under a development environment.

20. The non-transitory computer accessible memory medium of claim 1, wherein the program instructions are further executable to:
display an indication of each of the one or more iterative data flow program portions that is parallelizable.

21. The non-transitory computer accessible memory medium of claim 20, wherein to display an indication of each of the one or more iterative data flow program portions that is parallelizable, the program instructions are further executable to:
display each of the one or more iterative data flow program portions that is parallelizable.

22. The non-transitory computer accessible memory medium of claim 1, wherein the program instructions are further executable to:
indicate each of the one or more iterative data flow program portions that is not parallelizable.

23. The non-transitory The computer accessible memory medium of claim 22, wherein to indicate each of the one or more iterative data flow program portions that is not parallelizable, the program instructions are further executable to:
indicate program code that prevents parallelization for each of the one or more iterative data flow program portions that is not parallelizable.

24. The non-transitory computer accessible e memory medium of claim 1, wherein the program instructions are further executable to:
receive user input modifying at least one of the iterative data flow program portions; and
analyze the modified at least one of the iterative data flow program portions to determine whether the modified at least one of the iterative data flow program portions is parallelizable.

25. The non-transitory computer accessible memory medium of claim 1, wherein the program instructions are further executable to:
for each of the one or more iterative data flow program portions, determine one or more of:
an identifier for each of the one or more iterative data flow program portions;
a set of induction variables for each of the one or more iterative data flow program portions;
a range of the induction variables for each of the one or more iterative data flow program portions; or
a nesting level of each of the one or more iterative data flow program portions.

26. The non-transitory computer accessible memory medium of claim 1, wherein the
data flow program comprises a graphical data flow program comprising a plurality of interconnected nodes that visually indicate functionality of the data flow program.

27. The non-transitory computer accessible memory medium of claim 1, wherein the
program instructions are further executable to:
perform said storing a data flow program, said automatically analyzing, and said storing an indication for each of a plurality of data flow programs.

28. The non-transitory computer accessible memory medium of claim 27, wherein the plurality of data flow programs are comprised in a project, wherein the program instructions are further executable to:
receive input indicating the project;
wherein said performing said storing a data flow program, said automatically analyzing, and said storing an indication for each of the plurality of data flow programs is performed in response to the input indicating the project.

29. The non-transitory computer accessible memory medium of claim 27, wherein the plurality of data flow programs are comprised in program hierarchy, wherein the program instructions are further executable to:
receive input indicating the program hierarchy;
wherein said performing said storing a data flow program, said automatically analyzing, and said storing an indication for each of the plurality of data flow programs is performed in response to the input indicating the program hierarchy.

30. A computer implemented method, comprising utilizing a computer to perform:
storing a data flow program, wherein the data flow program comprises one or more iterative data flow program portions, wherein each iterative data flow program portion comprises data flow program code configured to execute repeatedly in an iterative manner;
automatically analyzing the data flow program, including performing dependence analysis for each of the one or more iterative data flow program portions, thereby determining whether each of the one or more iterative data flow program portions is parallelizable, wherein said performing dependence analysis comprises determining whether output from a first subset or iteration of data flow program code of the iterative data flow program portion is required by a second subset or iteration of the data flow program code of the iterative data flow program portion; and
storing an indication of each of the one or more iterative data flow program portions that is parallelizable, wherein the indications are useable to parallelize the data flow program.

31. The method of claim 30, wherein said automatically analyzing the data flow program comprises determining that at least one of the one or more iterative data flow program portions cannot be parallelized as specified, the method further comprising:
indicating one or more errors preventing parallelization or one or more warnings regarding parallelization.

32. The method of claim 31,
wherein said indicating one or more errors preventing parallelization or one or more warnings regarding parallelization comprises:
indicating data flow program code that caused the determined errors or warnings.

33. The method of claim 32, further comprising:
receiving user input selecting at least one error of the one or more errors or at least one warning of the one or more warnings;
wherein the data flow program code is indicated in response to the user input selecting at least one error of the one or more errors or at least one warning of the one or more warnings.

34. The method of claim 30, wherein said performing dependence analysis comprises:
determining any conflicting array accesses across iterations of the one or more iterative data flow program portions.

35. The method of claim 34, wherein said determining any conflicting array accesses across iterations of each of the iterative data flow program portions comprises:
for each of the one or more iterative data flow program portions:
determining an integer linear programming problem (ILP) that corresponds to each pair of array accesses in the iterative data flow program portion; and
determining whether there is a feasible solution to each ILP, wherein if there is no feasible solution to any of the ILPs, then there are no conflicting array accesses across iterations of the iterative data flow program portion.

36. A system, comprising:
means for storing a data flow program, wherein the data flow program comprises one or more iterative data flow program portions, wherein each iterative data flow program portion comprises data flow program code configured to execute repeatedly in an iterative manner;
means for automatically analyzing the data flow program, including performing dependence analysis for each of the one or more iterative data flow program portions, thereby determining whether each of the one or more iterative data flow program portions is parallelizable, wherein said performing dependence analysis comprises determining whether output from a first subset or iteration of data flow program code of the iterative data flow program portion is required by a second subset or iteration of the data flow program code of the iterative data flow program portion; and means for storing an indication of each of the one or more iterative data flow program portions that is parallelizable, wherein the indications are useable to parallelize the data flow program.

\* \* \* \* \*